(12) United States Patent
Roumi et al.

(10) Patent No.: US 9,831,043 B2
(45) Date of Patent: Nov. 28, 2017

(54) ELECTROCHEMICAL ENERGY STORAGE SYSTEMS AND METHODS

(75) Inventors: Farshid Roumi, Irvine, CA (US); Jamshid Roumi, Irvine, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 1538 days.

(21) Appl. No.: 13/229,479

(22) Filed: Sep. 9, 2011

(65) Prior Publication Data

US 2012/0077095 A1    Mar. 29, 2012

Related U.S. Application Data

(60) Provisional application No. 61/381,400, filed on Sep. 9, 2010, provisional application No. 61/416,193, filed (Continued)

(51) Int. Cl.
*H01M 4/02* (2006.01)
*H01M 4/04* (2006.01)
(Continued)

(52) U.S. Cl.
CPC .......... *H01G 11/26* (2013.01); *H01G 2/08* (2013.01); *H01G 9/0003* (2013.01); *H01G 9/0029* (2013.01); *H01G 9/048* (2013.01); *H01G 9/07* (2013.01); *H01G 11/02* (2013.01); *H01G 11/10* (2013.01); *H01G 11/46* (2013.01); *H01M 4/02* (2013.01); *H01M 4/04* (2013.01); *H01M 4/661* (2013.01); *H01M 4/663* (2013.01); *H01M 4/664* (2013.01); *H01M 4/70* (2013.01); *H01M 4/86* (2013.01); *H01M 4/8605* (2013.01); *H01M 4/88* (2013.01); *H01M 6/02* (2013.01); *H01M 6/5038* (2013.01); *H01M 8/002* (2013.01); *H01M 8/0206* (2013.01); *H01M 8/0213* (2013.01); *H01M 8/0215* (2013.01); *H01M 8/0247* (2013.01); *H01M 8/04067* (2013.01); *H01M 8/20* (2013.01); *H01M 10/04* (2013.01); *H01M 10/6554* (2015.04); *H01M 12/02* (2013.01);
(Continued)

(58) Field of Classification Search
CPC ..................... H01M 10/6552; H01M 10/654
See application file for complete search history.

(56) References Cited

U.S. PATENT DOCUMENTS

| 528,647 A | 11/1894 | Reed |
|---|---|---|
| 3,168,458 A | 2/1965 | Sprague |

(Continued)

FOREIGN PATENT DOCUMENTS

| CN | 1555588 A | 12/2004 |
|---|---|---|
| GB | 320916 | 10/1929 |

(Continued)

OTHER PUBLICATIONS

Office Action dated Sep. 10, 2014 for Chinese Application No. 201180042861.0 and partial English translation.
(Continued)

Primary Examiner — Barbara Gilliam
Assistant Examiner — Helen M McDermott
(74) Attorney, Agent, or Firm — Lathrop Gage LLP

(57) ABSTRACT

A three-dimensional electrode array for use in electrochemical cells, fuel cells, capacitors, supercapacitors, flow batteries, metal-air batteries and semi-solid batteries.

30 Claims, 33 Drawing Sheets

Related U.S. Application Data on Nov. 22, 2010, provisional application No. 61/467,112, filed on Mar. 24, 2011.

(51) Int. Cl.

| | | |
|---|---|---|
| *H01M 4/86* | (2006.01) | |
| *H01M 4/88* | (2006.01) | |
| *H01M 2/18* | (2006.01) | |
| *H01M 6/02* | (2006.01) | |
| *H01M 6/50* | (2006.01) | |
| *H01M 8/24* | (2016.01) | |
| *H01M 8/2404* | (2016.01) | |
| *H01M 10/04* | (2006.01) | |
| *H01M 10/60* | (2014.01) | |
| *H01M 12/02* | (2006.01) | |
| *H01G 9/048* | (2006.01) | |
| *H01G 9/07* | (2006.01) | |
| *H01G 2/08* | (2006.01) | |
| *H01G 11/26* | (2013.01) | |
| *H01M 8/00* | (2016.01) | |
| *H01G 9/00* | (2006.01) | |
| *H01M 10/6554* | (2014.01) | |
| *H01M 8/04007* | (2016.01) | |
| *H01G 11/02* | (2013.01) | |
| *H01G 11/10* | (2013.01) | |
| *H01G 11/46* | (2013.01) | |
| *H01M 4/66* | (2006.01) | |
| *H01M 4/70* | (2006.01) | |
| *H01M 8/0206* | (2016.01) | |
| *H01M 8/0213* | (2016.01) | |
| *H01M 8/0215* | (2016.01) | |
| *H01M 8/0247* | (2016.01) | |
| *H01M 8/20* | (2006.01) | |
| *H01M 12/06* | (2006.01) | |

(52) U.S. Cl.
CPC .......... *H01M 12/065* (2013.01); *Y02E 60/13* (2013.01); *Y10T 29/49204* (2015.01)

(56) References Cited

U.S. PATENT DOCUMENTS

| | | | |
|---|---|---|---|
| 3,342,717 A | 9/1967 | Leduc | |
| 3,607,422 A | 9/1971 | Moran | |
| 3,972,795 A | 8/1976 | Goens et al. | |
| 4,041,211 A | 8/1977 | Wiacek | |
| 4,052,539 A | 10/1977 | Shropshire et al. | |
| 4,346,152 A | 8/1982 | Sammells et al. | |
| 4,786,567 A | 11/1988 | Skyllas-Kazacos et al. | |
| 4,871,428 A | 10/1989 | Misra et al. | |
| 4,981,672 A | 1/1991 | De Neufville et al. | |
| 5,089,455 A | 2/1992 | Ketcham et al. | |
| 5,487,959 A | 1/1996 | Koksbang | |
| 5,510,209 A | 4/1996 | Abraham et al. | |
| 5,952,120 A | 9/1999 | Yu et al. | |
| 6,146,786 A * | 11/2000 | Stadnick et al. | 429/101 |
| 6,306,540 B1 | 10/2001 | Hiroi et al. | |
| 6,444,339 B1 | 9/2002 | Eshraghi | |
| 6,489,055 B1 | 12/2002 | Ichihashi et al. | |
| 6,781,817 B2 | 8/2004 | Andelman | |
| 6,830,849 B2 | 12/2004 | Lee et al. | |
| 6,852,446 B2 | 2/2005 | Barbarich | |
| 7,282,295 B2 | 10/2007 | Visco et al. | |
| 7,282,296 B2 | 10/2007 | Visco et al. | |
| 7,390,591 B2 | 6/2008 | Visco et al. | |
| 7,425,387 B2 | 9/2008 | Bohnstedt | |
| 7,553,584 B2 | 6/2009 | Chiang et al. | |
| 7,618,748 B2 | 11/2009 | Nathan et al. | |
| 7,642,012 B2 | 1/2010 | Djian et al. | |
| 7,811,507 B2 | 10/2010 | Wechs et al. | |
| 7,985,337 B2 | 7/2011 | Heuser et al. | |
| 8,048,556 B2 | 11/2011 | Davis et al. | |
| 8,119,269 B2 | 2/2012 | Ramasubramanian et al. | |
| 8,202,649 B2 | 6/2012 | Visco et al. | |
| 8,288,034 B2 | 10/2012 | Davis et al. | |
| 2002/0150818 A1 | 10/2002 | Amatucci et al. | |
| 2002/0160263 A1 | 10/2002 | Corrigan et al. | |
| 2003/0013015 A1 | 1/2003 | Klein et al. | |
| 2003/0096147 A1 | 5/2003 | Badding et al. | |
| 2003/0099884 A1 | 5/2003 | Chiang et al. | |
| 2004/0011661 A1 | 1/2004 | Bradford et al. | |
| 2004/0018431 A1 | 1/2004 | Gozdz et al. | |
| 2004/0175626 A1 | 9/2004 | Dasgupta et al. | |
| 2004/0241540 A1 | 12/2004 | Tsutsumi et al. | |
| 2005/0074671 A1 | 4/2005 | Sugiyama et al. | |
| 2005/0095504 A1 | 5/2005 | Kim et al. | |
| 2005/0175894 A1 | 8/2005 | Visco et al. | |
| 2005/0208383 A1 | 9/2005 | Totsuka et al. | |
| 2006/0121342 A1 | 6/2006 | Sano et al. | |
| 2006/0154141 A1 | 7/2006 | Salot et al. | |
| 2007/0059584 A1 | 3/2007 | Nakano et al. | |
| 2007/0117000 A1 | 5/2007 | An et al. | |
| 2007/0190427 A1 | 8/2007 | Carlson et al. | |
| 2007/0212603 A1 | 9/2007 | Nathan et al. | |
| 2008/0057389 A1 | 3/2008 | Kono et al. | |
| 2008/0113261 A1 | 5/2008 | De Jonghe et al. | |
| 2008/0153000 A1 | 6/2008 | Salot et al. | |
| 2008/0274394 A1 | 11/2008 | Schormann et al. | |
| 2009/0035664 A1 | 2/2009 | Chiang et al. | |
| 2009/0087730 A1 | 4/2009 | Kondo et al. | |
| 2009/0189567 A1 | 7/2009 | Joshi et al. | |
| 2009/0197170 A1 | 8/2009 | Viavattine | |
| 2009/0208834 A1 | 8/2009 | Ramasubramanian et al. | |
| 2009/0214956 A1 | 8/2009 | Prieto et al. | |
| 2010/0047671 A1 | 2/2010 | Chiang et al. | |
| 2010/0090650 A1 | 4/2010 | Yazami et al. | |
| 2010/0129699 A1 | 5/2010 | Mikhaylik et al. | |
| 2010/0203372 A1 | 8/2010 | Kim et al. | |
| 2010/0266907 A1 | 10/2010 | Yazami | |
| 2011/0027648 A1 | 2/2011 | Long et al. | |
| 2011/0065009 A1 | 3/2011 | Lascaud et al. | |
| 2011/0097623 A1 | 4/2011 | Marinis et al. | |
| 2011/0104521 A1 | 5/2011 | Kishimoto et al. | |
| 2011/0117416 A1 | 5/2011 | Arora et al. | |
| 2011/0143207 A1 | 6/2011 | Arora et al. | |
| 2011/0143217 A1 | 6/2011 | Arora et al. | |
| 2011/0159373 A1 | 6/2011 | Conner et al. | |
| 2011/0159374 A1 | 6/2011 | Conner et al. | |
| 2011/0171514 A1 | 7/2011 | Nishikawa et al. | |
| 2011/0171518 A1 | 7/2011 | Dunn et al. | |
| 2011/0183186 A1 | 7/2011 | Klootwijk et al. | |
| 2011/0197435 A1 | 8/2011 | Kaneko et al. | |
| 2011/0217585 A1 | 9/2011 | Wang et al. | |
| 2011/0217586 A1 | 9/2011 | Kim et al. | |
| 2011/0227243 A1 | 9/2011 | Kepler et al. | |
| 2011/0236744 A1 | 9/2011 | Kim et al. | |
| 2011/0256443 A1 | 10/2011 | Park et al. | |
| 2011/0281176 A1 | 11/2011 | Seymour | |
| 2011/0293976 A1 | 12/2011 | Chiba et al. | |
| 2012/0015229 A1 | 1/2012 | Ohashi et al. | |
| 2012/0015232 A1 | 1/2012 | Teshima et al. | |
| 2012/0028101 A1 | 2/2012 | Ishihara et al. | |
| 2012/0034508 A1 | 2/2012 | Davis et al. | |
| 2012/0043940 A1 | 2/2012 | Affinito et al. | |
| 2012/0077095 A1 | 3/2012 | Roumi et al. | |
| 2012/0094188 A1 | 4/2012 | Visco et al. | |
| 2012/0094194 A1 | 4/2012 | Visco et al. | |
| 2012/0119155 A1 | 5/2012 | Liu et al. | |
| 2012/0183868 A1 | 7/2012 | Tousaint et al. | |
| 2012/0219842 A1 | 8/2012 | Visco et al. | |
| 2012/0244412 A1 | 9/2012 | Pascaly et al. | |
| 2012/0263986 A1 | 10/2012 | Fulop et al. | |
| 2012/0270088 A1 | 10/2012 | Huang et al. | |
| 2012/0270112 A1 | 10/2012 | Visco et al. | |
| 2013/0017432 A1 | 1/2013 | Roumi | |
| 2013/0189592 A1 | 7/2013 | Roumi et al. | |
| 2013/0224632 A1 | 8/2013 | Roumi | |

(56) References Cited

U.S. PATENT DOCUMENTS

FOREIGN PATENT DOCUMENTS

| JP | 08-236093 | 9/1996 |
|---|---|---|
| JP | 09-092254 | 4/1997 |
| JP | H10106521 | 4/1998 |
| JP | 2005525674 | 8/2005 |
| JP | 2006185917 | 7/2006 |
| JP | 2008159589 | 7/2008 |
| JP | 2009105063 | 5/2009 |
| JP | 2010534389 | 11/2010 |
| JP | 2011512010 | 4/2011 |
| WO | WO 97/06569 | 2/1997 |
| WO | WO 03/012908 | 2/2003 |
| WO | WO 2008/019398 | 2/2008 |
| WO | WO 2008/049040 | 4/2008 |
| WO | WO 2008/153749 | 12/2008 |
| WO | WO 2010/007579 | 1/2010 |
| WO | WO 2010/054261 | 5/2010 |
| WO | WO 2010/062391 | 6/2010 |
| WO | WO 2012/034042 | 3/2012 |
| WO | WO 2013-009750 | 1/2013 |
| WO | WO 2013/154623 | 10/2013 |

OTHER PUBLICATIONS

International Search Report and Written Opinion dated Jun. 27, 2013, corresponding to International Application No. PCT/US/2013/021043.
http://www.liquicel.com/uploads/documents/Membran%20Contactors%20-%20An%20Introduction%20To%20The%20Technology.pdf.
International Search Report and Written Opinion mailed Apr. 30, 2012, for International Application No. PCT/US2011/051041.
Tarascon et al. (2001) "Issues and challenges facing rechargeable lithium batteries", Nature (414) 359-367.
Kumar et al. (2010), A Solid-State, Rechargeable, Long Cycle Life Lithium-Air Battery, Journal of the Electrochemical Society, 157, 1, A50-A54.
K. Xu, (2004) "Nonaqueous Electrolytes for Lithium-Based Rechargeable Batteries," Chemical Reviews 2004, 104, 4303-4417.
Seel and Dahn J. (2000), "Electrochemical Intercalation of PF6 into Graphite," Journal of Electrochemical Society, 147(3) 892-898.
Arora, P. et al. (2004) "Battery Separators." Chem. Rev., 104, 4419-4462.
Aurbach, D. et al. (2002) "A short review of failure mechanisms of lithium metal and lithiated graphite anodes in liquid electrolyte solutions." Solid State Ionics, 148, 405-416.
Bruce et al. (Published online Dec. 15, 2012) "Li-O$_2$ and Li-S Batteries with High Energy Storage," Nature Materials. 11:19-29.
Cheng et al. (Published online Jan. 17, 2012) "Metal-Air Batteries: From Oxygen Reduction Electrochemistry to Cathode Catalysts," Chem. Soc. Rev. 41:2172-2192.
Christensen et al. (Dec. 29, 2011) "A Critical Review of Li/Air Batteries," J. Electrochem. Soc. 159(2):R1-R30.
Duduta et al. (2011) "Semi-Solid Lithium Rechargeable Flow Battery," Advanced Energy Materials. 1(4):511-516.
Goodenough (Published Online May 8, 2012) "Rechargeable Batteries: Challenges Old and New," J. Solid State Electrochem. 16:2019-2029.

Gowda et al. (Feb. 7, 2012) "3D Nanoporous Nanowire Current Collectors for Thin Film Microbatteries," Nano. Lett. 12(3):1198-1202.
Hamelet et al. (Jul. 20, 2012) "Non-aqueous Li-Based Redox Flow Batteries," J. Electrochem. Soc. 159(8):A1360-A1367.
International Search Report and Written Opinion dated Jan. 29, 2013, for International Application No. PCT/US2012/046067.
Jung et al. (Published online Jun. 10, 2012) "An Improved High-Performance Lithium-Air Battery," Nature Chemistry. 4:579-585.
Kichambare et al. (Jan. 2012) "Mesoporous Nitrogen-Doped Carbon-Glass Ceramic for Solid-State Lithium-Oxygen Batteries," ACS Appl. Mater. Interfaces. 4(1):49-52.
Li et al. (Jan. 2012) "A Dual-Electrolyte Rechargeable Li-Air Battery with Phosphate Buffer Catholyte," Electrochemistry Communications. 14(1):78-81.
Long et al. (2004) "Three-Dimensional Battery Architectures," Chem. Rev. 104:4463-4492.
Lu et al. (2011) "Aqueous Cathode for Next-Generation Alkali-Ion Batteries," J. Am. Chem. Soc. 133(15):5756-5759.
Lu et al. (2011) "Rechargeable-Ion Cathode-Flow Battery," J. Mater. Chem. 21:10113- 0117.
Peng et al. (Aug. 3, 2012) "A Reversible and Higher-Rate Li-O$_2$ Battery," Science. 337(6094):563-566.
Pu, et al.(2006) "Preparation of PVDF—HFP microporous membrane for Li-ion batteries by phase inversion." Journal of Membrane Science, (272) 1-2, 11-14.
Roberts et al. (2011) "3D Lithium Ion Batteries—From Fundamentals to Fabrication," J. Mater. Chem. 21:9876-9890.
Scrosati, B. (2007) "Nanomaterials: Paper powers battery breakthrough." Nature Nanotechnology 2, 598-599.
Shao et al. (Published online Apr. 6, 2012) "Electrocatalysts for Nonaqueous Lithium-Air Batteries: Status, Challenges, and Perspective," ACS Catal. 2(5):844-857.
Sun et al. (Feb. 2012) "Graphene Nanosheets as Cathode Catalysts for Lithium-Air Batteries with an Enhanced Electrochemical Performance," CARBON. 50(2):727-733.
Tan et al. (Published Online Jul. 1, 2012) "Synthesis and Characterization of Biphenyl-Based Lithium Solvated Electron Solutions," J. Phys. Chem. B 116(30):9056-9060.
Weber et al. (2011) "Redox Flow Batteries: A Review," J. Appl. Electrochem. 41:1137-1164.
Zadin (May 8, 2012) "Modeling the 3-D Microbattery," University of Tartu http://dspace.utlib.ee/dspace/handle/10062/25375 [Accessed Jun. 26, 2013].
Zhang, S. (2007) "A review on the separators of liquid electrolyte Li-ion batteries." Journal of Power Sources, 164(1) 351-364.
Zhong et al. (Published online Dec. 5, 2011) "High-Capacity Silicon-Air Battery in Alkaline Solution," ChemSusChem. 5:177-180.
Notification to Go Through Registration Formalities dated Oct. 27, 2015, corresponding to Chinese Patent Application No. 201180042861.0 (Chinese and English).
Office Action dated Apr. 10, 2015, corresponding to Chinese Patent Application No. 201180042861.0 (Chinese and English).
Notification of Reasons for Refusal dated Aug. 18, 2015, corresponding to Japanese Patent Application No. 2013-528339 (Japanese and English).
Notification of Reasons for Refusal dated Jul. 5, 2016, corresponding to Japanese Patent Application No. 2013-528339 (Japanese and English).
Notice to File Response (Office Action) dated Sep. 22, 2017, for Korean Patent Application No. 10-2013-7007963.

\* cited by examiner

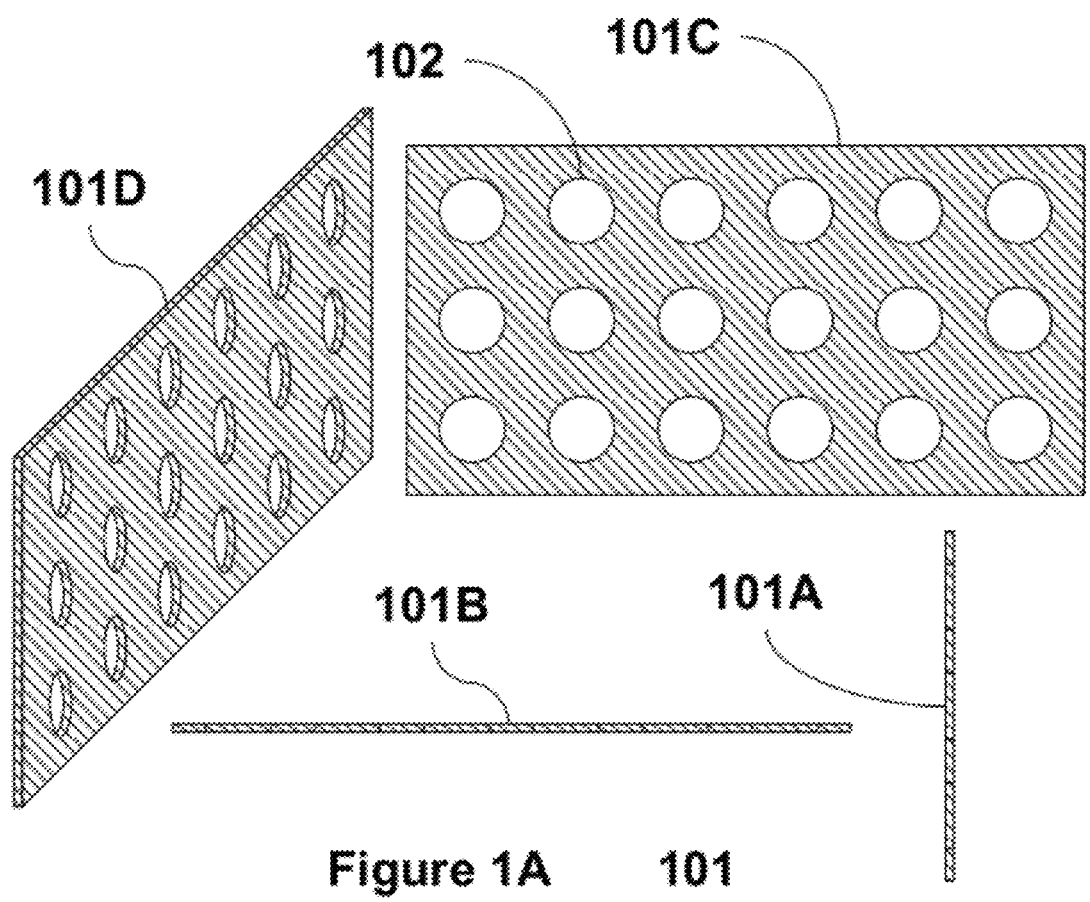
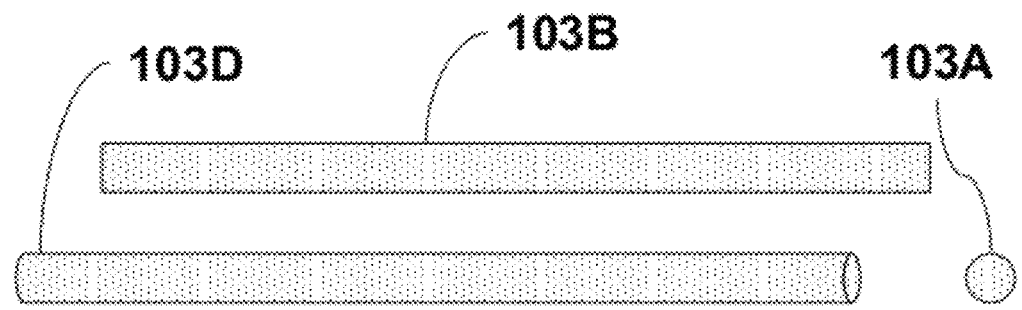
Figure 1A 101
Figure 1B 103

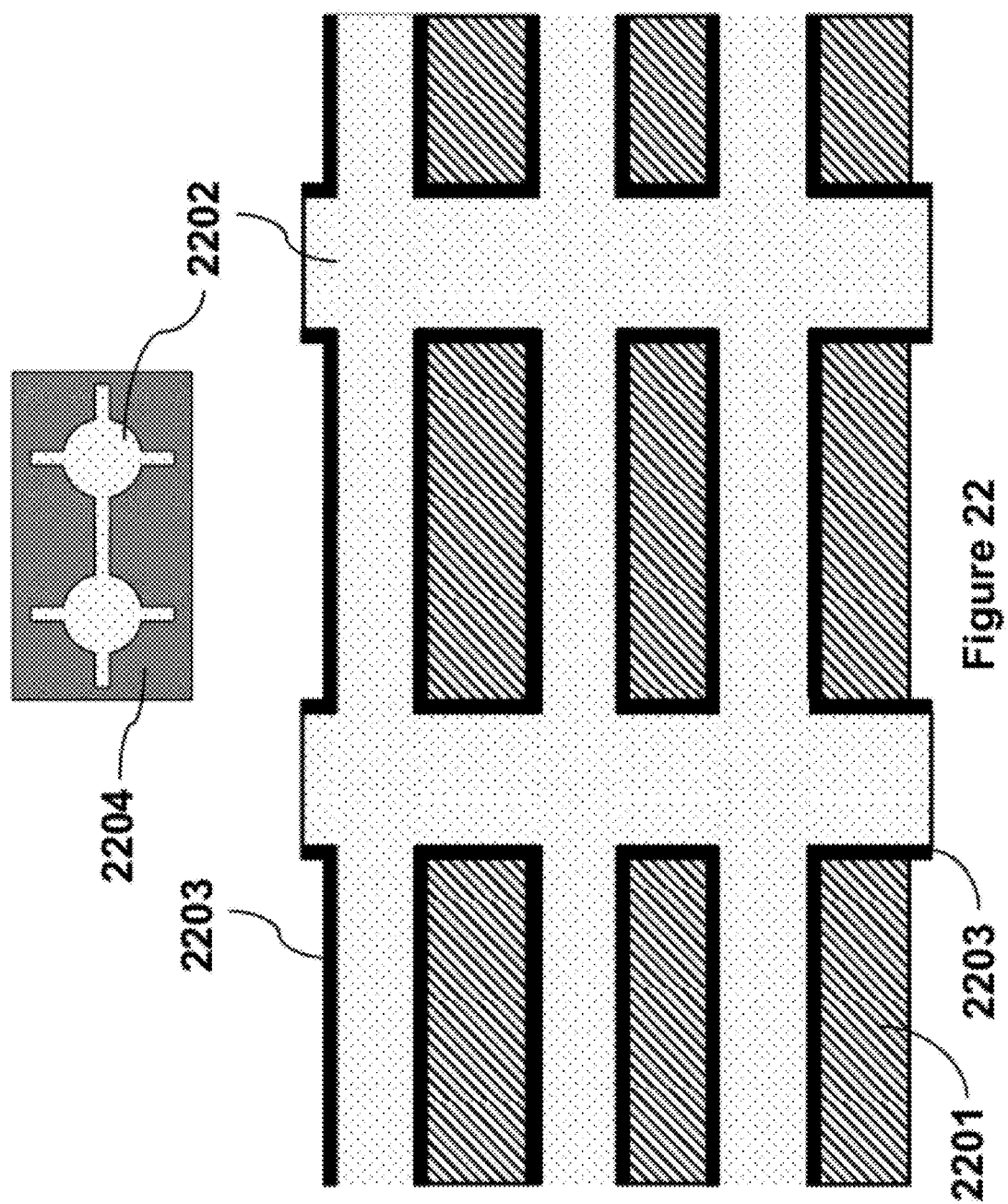

US 9,831,043 B2

ELECTROCHEMICAL ENERGY STORAGE SYSTEMS AND METHODS

CROSS REFERENCE TO RELATED APPLICATION

This application claims the benefit of and priority to U.S. Provisional Application 61/381,400 filed on Sep. 9, 2010, U.S. Provisional Application 61/416,193, filed on Nov. 22, 2010, and U.S. Provisional Application 61/467,112 filed on Mar. 24, 2011, which are hereby incorporated by reference in their entireties.

BACKGROUND

Over the last few decades revolutionary advances have been made in electrochemical storage and conversion devices expanding the capabilities of these systems in a variety of fields including portable electronic devices, air and space craft technologies, passenger vehicles and biomedical instrumentation. Current state of the art electrochemical storage and conversion devices have designs and performance attributes that are specifically engineered to provide compatibility with a diverse range of application requirements and operating environments. For example, advanced electrochemical storage systems have been developed spanning the range from high energy density batteries exhibiting very low self-discharge rates and high discharge reliability for implanted medical devices to inexpensive, light weight rechargeable batteries providing long runtimes for a wide range of portable electronic devices to high capacity batteries for military and aerospace applications capable of providing extremely high discharge rates over short time periods.

Despite the development and widespread adoption of this diverse suite of advanced electrochemical storage and conversion systems, significant pressure continues to stimulate research to expand the functionality of these systems, thereby enabling an even wider range of device applications. Large growth in the demand for high power portable electronic products, for example, has created enormous interest in developing safe, light weight primary and secondary batteries providing higher energy densities. In addition, the demand for miniaturization in the field of consumer electronics and instrumentation continues to stimulate research into novel design and material strategies for reducing the sizes, masses and form factors of high performance batteries. Further, continued development in the fields of electric vehicles and aerospace engineering has also created a need for mechanically robust, high reliability, high energy density and high power density batteries capable of good device performance in a useful range of operating environments.

Many recent advances in electrochemical storage and conversion technology are directly attributable to discovery and integration of new materials for battery components. Lithium battery technology, for example, continues to rapidly develop, at least in part, due to the discovery of novel electrode and electrolyte materials for these systems. The element lithium has a unique combination of properties that make it attractive for use in an electrochemical cell. First, it is the lightest metal in the periodic table having an atomic mass of 6.94 AMU. Second, lithium has a very low electrochemical oxidation/reduction potential (i.e., −3.045 V vs. NHE (normal hydrogen reference electrode)). This unique combination of properties enables lithium based electrochemical cells to have very high specific capacities. State of the art lithium ion secondary batteries provide excellent charge-discharge characteristics, and thus, have also been widely adopted as power sources in portable electronic devices, such as cellular telephones and portable computers. U.S. Pat. Nos. 6,852,446, 6,306,540, 6,489,055, and "Lithium Batteries Science and Technology" edited by Gholam-Abbas Nazri and Gianfranceo Pistoia, Kluer Academic Publishers, 2004, are directed to lithium and lithium ion battery systems which are hereby incorporated by reference in their entireties.

Advances in electrode structure and geometry have also recently developed. For example, U.S. Patent Application Publication US 2011/0171518 and International Patent Application publication WO 2010/007579 disclose three-dimensional battery structure for solid-state lithium ion batteries. U.S. Pat. No. 7,553,584 and U.S. Patent Application Publication US 2003/0099884 disclose quasi-three-dimensional batteries in which the electrodes are formed as complementary structures. These structures, however, do not find use with lead-acid cells, fuel cells, capacitors, supercapacitors or metal-air batteries.

SUMMARY

This invention is in the field of energy storage. This invention relates generally to an electrode array for use in energy storage and energy generation devices.

In a first aspect, provided are three-dimensional electrode arrays. In an embodiment, a three-dimensional electrode array comprises a plurality of plate electrodes, wherein each plate electrode includes an array of apertures, wherein the plate electrodes are arranged in a substantially parallel orientation such that the each aperture of an individual plate electrode is aligned along an alignment axis passing through an aperture of each of all other plate electrodes; and a plurality of rod electrodes, wherein the plurality of rod electrode are not in physical contact with the plurality of plate electrodes and arranged such that each rod electrode extends a length along an alignment axis passing through an aperture of each plate electrode; and wherein a first surface area includes a cumulative surface area the plurality of plate electrodes, wherein a second surface area includes a cumulative surface area of each aperture array and wherein a third surface area includes a cumulative surface area of each of the plurality of rod electrodes. In a specific embodiment, the plurality of rod electrodes are not in electrical contact with the plurality of plate electrodes.

In embodiments, the three-dimensional electrode array is a component of a device selected from the group consisting of: a primary electrochemical cell, a secondary electrochemical cell, a fuel cell, a capacitor, a supercapacitor, a flow battery, a metal-air battery and a semi-solid battery.

Three-dimensional electrode arrays of this aspect include those having a variety of geometries and physical dimensions. Useful three-dimensional electrode arrays include those in which a ratio of the second surface area to the first surface area is about 2 or is selected over the range of 1 to 5. Useful three-dimensional electrode arrays include those in which a ratio of the second surface area to the third surface area is about 2, is selected over the range of 1 to 5 or is selected over the range of 0.2 to 1. Three-dimensional electrode arrays having a ratio of the second surface area to the third surface area selected over the range of 1 to 5 are optionally useful for electrochemical cell embodiments. Three-dimensional electrode arrays having a ratio of the second surface area to the third surface area selected over the range of 0.2 to 1 are optionally useful for flow battery embodiments, fuel cell embodiments and semisolid battery embodiments.

Three-dimensional electrode arrays of this aspect include those having any orientation. For example, in one embodiment, a three-dimensional electrode array is arranged such that the plate electrodes have a horizontal orientation. In another embodiment, however, a three-dimensional electrode array is arranged such that the plate electrodes have a vertical orientation. In one embodiment, a three-dimensional electrode array is arranged such that the rod electrodes have a horizontal orientation. In another embodiment, however, a three-dimensional electrode array is arranged such that the rod electrodes have a vertical orientation.

Three-dimensional electrode arrays of this aspect include those having plate electrodes with a variety of geometries and physical dimensions. Optionally, each plate electrode in a three-dimensional electrode array has identical or substantially identical dimensions. In certain embodiments, however, the dimensions of each plate electrode are independent. Optionally, each of the plurality of plate electrodes has one or more lateral dimensions (e.g., length, width) of about 2 cm, or selected over the range of 20 nm to 20 m or selected over the range of 5 mm to 1 m. In embodiments, each of the plurality of plate electrodes has a thickness dimension selected over the range of 20 nm to 5 cm or selected over the range of 200 µm to 5 mm. In embodiments, a distance between each of the plurality of plate electrodes is selected over the range of 10 nm to 5 cm or selected over the range of 200 µm to 5 mm. In embodiments, each aperture in a plate electrode has a diameter or a lateral dimension selected over the range of 10 nm to 20 cm or selected over the range of 3 mm to 2 cm or selected over the range of 1 mm to 2 cm. Optionally, each aperture in a plate electrode has identical or substantially identical dimensions and/or shapes. Optionally, each aperture has a lateral dimension more than 2× a lateral dimension of a rod electrode. In certain embodiments, however, the dimensions and/or shape of each aperture in a plate electrode are independent. Optionally, the dimensions and/or shape of each aperture of each plate electrode are independent. Useful aperture shapes include, but are not limited to, square, rectangular, circular and polygonal. As used herein, the terms aperture and hole are used interchangeably.

Three-dimensional electrode arrays of this aspect include those having rod electrodes with a variety of geometries and physical dimensions. Optionally, each rod electrode in a three-dimensional electrode array has identical or substantially identical dimensions. In certain embodiments, however, the dimensions of each rod electrode are independent. Optionally, each rod electrode has a circular cross-section. Optionally, each rod electrode has a non-circular or polygonal cross-section. Useful rod electrode cross-sectional shapes include, but are not limited to, square, rectangular, circular and polygonal. In an embodiment, each of the plurality of rod electrodes has a length selected over the range of 50 nm to 20 m or selected over the range of 5 mm to 1 m. In embodiments, each of the plurality of rod electrodes has a diameter or a lateral dimension selected over the range of 9 nm to 20 cm or selected over the range of 3 mm to 2 cm or selected over the range of 1 mm to 2 cm. Optionally, at least one rod electrode comprises a group of rod electrodes, wherein the group of rod electrodes is arranged such that the group of rod electrodes extends a length along an alignment axis passing through an aperture of each plate electrode. Optionally, each rod electrode comprises a cylinder.

Three-dimensional electrode arrays of this aspect include those comprising any of a variety of materials. Useful electrode materials include those used in primary electrochemical cells, secondary electrochemical cells, fuel cells, capacitors and supercapacitors. In embodiments, each plate electrode in a three-dimensional electrode array independently comprises a material selected from the group consisting of: a metal, a metal alloy, carbon, graphite, graphene, Li, $Mn_2O_4$, $MnO_2$, Pb, $PbO_2$, Na, S, Fe, Zn, Ag, Ni, Sn, Ge, Si, Sb, Bi, NiOOH, Cd, $FeS_2$, $LiCoO_2$, $LiCoO_2$ doped with Mg, $LiNiO_2$, $LiMn_2O_4$, $LiMnO_2$, $LiMnO_2$ doped with Al, $LiFePO_4$, doped $LiFePO_4$ (Mg, Al, Ti, Nb, Ta), amorphous carbon, mescocarbon microbeads, LiAl, $Li_9Al_4$, $Li_3Al$, LiZn, LiAg, $Li_{10}Ag_3$, B, $Li_7B_6$, $Li_{12}Si_7$, $Li_{13}Si_4$, Sn, $LiSSn_2$, $Li_{13}SnS$, $Li_7Sn_2$, $Li_{22}SnS$, $Li_2Sb$, $Li_3Sb$, LiBi, $Li_3Bi$, $SnO_2$, SnO, MnO, $Mn_3O_4$, CoO, NiO, FeO, $LiFe_2O_4$, $TiO_2$, $LiTi_2O_4$, a vanadium oxide, glass doped with a Sn—B—P—O compound, mesocarbon microbeads coated with at least one of poly(o-methoxyanaline, poly(3octylthiophene) and poly(vinylidene fluoride) and any combination of these. Optionally, each plate electrode in a three-dimensional electrode array comprises identical or substantially identical materials. In certain embodiments, however, the materials of two or more plate electrodes in a three-dimensional electrode array are different. In certain embodiments, electrical communication is established between each of the plurality of plate electrodes. Optionally, a plate electrode comprises lithium; a lithium alloy such as lithium-aluminum, lithium-tin, lithium-magnesium, lithium-lead, lithium-zinc or lithium-boron; an alkali metal such as Na, K, Rb or Cs; an alkaline earth metals such as Be, Mg, Ca, Sr, Ba or an alloy thereof; Zn or an alloy of Zn; or Al or an alloy of Al.

Optionally, a three-dimensional electrode array comprises a component of a fuel cell. In one embodiment, the three-dimensional electrode array further comprises a fuel fluid, such as hydrogen gas or a hydrogen containing gas or a liquid hydrocarbon fuel, positioned in contact with one or more plate electrodes, one or more rod electrodes or both one or more plate electrodes and one or more rod electrodes. In an embodiment, the three-dimensional electrode array further comprises an oxygen containing fluid, such as oxygen gas or air, positioned in contact with one or more plate electrodes, one or more rod electrodes or both one or more plate electrodes and one or more rod electrodes. Optionally, a flow is provided to the fuel fluid, for example, by a pump. Optionally, a flow is provided to the oxygen containing fluid, for example, by a pump.

Optionally, the three-dimensional electrode array comprises a component of a metal-air battery. In one embodiment, at least one rod electrode comprises a metal or at least one plate electrodes comprises a metal or both at least one rod electrode and at least one plate electrode comprise a metal. In an embodiment, the three-dimensional electrode array further comprises an oxygen containing fluid, such as oxygen gas or air, positioned in contact with one or more plate electrodes, one or more rod electrodes or both one or more plate electrodes and one or more rod electrodes. Optionally, a flow is provided to the oxygen containing fluid, for example, by a pump.

In embodiments, each rod electrode in a three-dimensional electrode array independently comprises a material selected from the group consisting of: a metal, a metal alloy, carbon, graphite, graphene, Li, $Mn_2O_4$, $MnO_2$, Pb, $PbO_2$, Na, S, Fe, Zn, Ag, Ni, Sn, Ge, Si, Sb, Bi, NiOOH, Cd, $FeS_2$, $LiCoO_2$, $LiCoO_2$ doped with Mg, $LiNiO_2$, $LiMn_2O_4$, $LiMnO_2$, $LiMnO_2$ doped with Al, $LiFePO_4$, doped $LiFePO_4$ (Mg, Al, Ti, Nb, Ta), amorphous carbon, mescocarbon microbeads, LiAl, $Li_9Al_4$, $Li_3Al$, LiZn, LiAg, $Li_{10}Ag_3$, B, $Li_7B_6$, $Li_{12}Si_7$, $Li_{13}Si_4$, Sn, $LiSSn_2$, $Li_{13}SnS$, $Li_7Sn_2$, $Li_{22}SnS$, $Li_2Sb$, $Li_3Sb$, LiBi, $Li_3Bi$, $SnO_2$, SnO, MnO, $Mn_3O_4$, CoO, NiO, FeO, $LiFe_2O_4$, $TiO_2$, $LiTi_2O_4$, a vanadium oxide, glass doped with a Sn—B—P—O compound, mesocarbon microbeads coated with at least one of poly(o-methoxyanaline, poly(3octylthiophene) and poly(vinylidene fluoride) and any combination of these. Optionally, each rod electrode in a three-dimensional electrode array comprises identical or substantially identical materials. In certain embodiments, however, the materials of two or more rod electrodes in a three-dimensional electrode array are different. In embodiments, electrical communication is established between each of the plurality of rod electrodes. Optionally, a rod electrode comprises lithium; a lithium alloy such as lithium-aluminum, lithium-tin, lithium-magnesium, lithium-lead, lithium-zinc or lithium-boron; an alkali metal such as Na, K, Rb or Cs; an alkaline earth metals such as Be, Mg, Ca, Sr, Ba or an alloy thereof; Zn or an alloy of Zn; or Al or an alloy of Al.

In an exemplary embodiment, at least one rod electrode comprises a composite rod electrode. Useful composite rod electrodes include those comprising a rod electrode inner core and a rod electrode outer shell surrounding the rod electrode inner core. Optionally, the rod electrode inner core and the rod electrode outer shell are separated by a first distance, for example, filled with an electrolyte. Optionally, a composite rod electrode comprises an electrochemical cell. Optionally a rod electrode inner core comprises a solid cylinder. Optionally a rod electrode outer shell comprises a hollow cylinder. In one embodiment, the rod electrode inner core comprises a first electrode material, the rod electrode outer shell comprises a second electrode material different from the first electrode material, and at least one plate electrode comprises the first electrode material.

In an embodiment, one or more rod electrodes comprise branched rod electrodes including branched segments extending along a direction perpendicular to an alignment axis passing through an aperture of each plate electrode. In one embodiment, branched segments of at least two neighboring rod electrodes extend a full distance between the at least two neighboring rod electrodes, thereby forming a bridge segment between the at least two neighboring rod electrodes. In embodiments, each rod electrode is coated with an electrolyte, such as a solid electrolyte.

In an exemplary embodiment, at least one plate electrode comprises a composite plate electrode. Useful composite plate electrodes include those comprising a plate electrode inner layer and a plate electrode outer shell surrounding the rod electrode inner layer. Optionally, the plate electrode inner layer and the plate electrode outer shell are separated by a first distance, for example, filled with an electrolyte. Optionally, a composite plate electrode comprises an electrochemical cell. In one embodiment, the plate electrode inner layer comprises a first electrode material, the plate electrode outer shell comprises a second electrode material different from the first electrode material, and at least one rod electrode comprises the first electrode material.

In embodiments, a three-dimensional electrode array of this aspect comprises any number of plate electrodes. For example, useful three-dimensional electrode arrays include those comprising 5 or more, 6 or more, 7 or more, 8 or more, 9 or more or 10 or more plate electrodes. In embodiments, a three-dimensional electrode array of this aspect comprises any number of rod electrodes. For example, useful three-dimensional electrode arrays include those comprising 50 or more, 60 or more, 70 or more, 80 or more, 90 or more or 100 or more rod electrodes.

In embodiments, an electrode array includes an oxygen electrode, for example useful in a metal-air battery. Optionally, an oxygen electrode is exposed to ambient air and molecular oxygen is accessed from the ambient air. Useful electrodes include composite carbon electrodes, for example, about 150 micrometer thick, made of graphite powders and a binder such as PVDF on a Ni mesh.

In certain embodiments, the three-dimensional electrode array is a component of an electrochemical cell. Useful electrochemical cells include those selected from the group consisting of: a primary cell, a secondary cell, a lead-acid cell, a lithium cell, a lithium ion cell, a metal-air cell, a zinc-carbon cell, an alkaline cell, a nickel-cadmium cell, a nickel metal hydride cell, a silver oxide cell, a sodium sulfur cell, a solid electrochemical cell or a fluid electrochemical cell. Optionally, a three-dimensional electrode array further comprises an electrolyte positioned between each of the plurality of plate electrodes and each of the plurality of rod electrodes or around each of the plurality of rod electrodes. In a specific embodiment, the electrolyte comprises a first electrolyte surrounding each of the plurality of plate electrodes and a second electrolyte surrounding each of the plurality of rod electrodes. Optionally, the first electrolyte and the second electrolyte are different. Optionally, the first electrolyte and the second electrolyte are the same. Optionally, the first electrolyte and the second electrolyte each independently comprise a solid electrolyte. In a specific embodiment, a membrane is positioned between the first and second electrolytes. Optionally, the first and second electrolytes are both liquids. Optionally, an electrolyte is a fluid of variable viscosity, velocity, composition or any combination of these.

In embodiments, the electrolyte includes any of a variety of electrolytes, for example useful in primary and secondary electrochemical cells. Useful electrolytes include, but are not limited to: an aqueous solution; an organic solvent; a lithium salt; sulfuric acid; potassium hydroxide; an ionic liquid; a solid electrolyte; a polymer; poly(ethylene oxide); poly(propylene oxide); poly(styrene); poly(imide); poly(amine); poly(acrylonitrile); poly(vinylidene fluoride); methoxyethoxyethyoxy phosphazine; diiodomethane; 1,3-diiodopropane; N,N-dimethylformamide; imethypropylene urea; ethylene carbonate; diethylene carbonate; dimethyl carbonate; propylene carbonate; a block copolymer lithium electrolyte doped with a lithium salt; glass; glass doped with at least one of LiI, LiF, LiCl, $Li_2O$—$B_2O_3$—$Bi_2O_3$, $Li_2O$—$B_2O_3$—$P_2O_5$ and $Li_2OB_2O_3$; a sol of at least one oxide of Si, B, P, Ti, Zr, Bb and Bi; a sol of at least one hydroxide of Si, B, B, Ti, Zr, Pb and Bi; a gel of at least one oxide of Si, B, P, Ti, Zr, Bb and Bi; a gel of at least one hydroxide of Si, B, B, Ti, Zr, Pb and Bi; or any combination of these. Useful polymers further include polyacryonitrile, poly(vinyl chloride), poly(vinyl sulfone), poly(ethylene glycol diacrylate), poly(vinyidene fluoride), poly(tetrahydrofuran), poly(dioxolane), poly(ethylane oxide), poly(propylene oxide), poly(vinyl pyrrolidinoe) and mixtures thereof. Useful electrolytes further include those comprising $LiClO_4$, $LiBF_4$, $LiAsF_6$, $LiCF_3$, $SO_3$, $LiPF_6$, and $LiN(SO_2CF_3)2$. Optionally, an electrolyte comprises a salt selected from the group of salts consisting of $Mg(ClO_4)_2$, $Zn(ClO_4)_2$, $LiAlCl_4$, and $Ca(ClO_4)_2$. Optionally, an electrolyte is a solid, for example comprising a material selected from the group consisting of phosphorous based glass, oxide based glass, oxide sulfide based glass, selenide glass, gallium based glass, germanium based glass, sodium and lithium betaalumina, glass ceramic alkali metal ion conductors, and Nasiglass a polycrystalline ceramic selected from the group consisting of LISICON, NASICON, $Li_{0.3}La_{0.7}TiO_3$, sodium and lithium beta alumina, LISICON polycrystalline ceramic such as lithium metal phosphates.

In certain embodiments, the three-dimensional electrode array is a component of a capacitor or a supercapacitor. In one embodiment, a three-dimensional electrode array further comprises one or more dielectric materials positioned between each of the plurality of plate electrodes and each of the one or more rod electrodes or around each of the one or more of rod electrodes. Useful dielectric materials include, but are not limited to: a metal oxide, a silicon oxide, a metal nitride, a silicon nitride, and any combination of these. Useful dielectric materials, for some embodiments also include carbon, nanocarbon, graphene and/or graphite. Optionally, a dielectric is substituted by a synthetic resin or polypropylene.

For a variety of three-dimensional electrode arrays, embodiments include one or more current collectors. In a specific embodiment, each of the plurality of plate electrodes comprises a current collector. In a specific embodiment, each of the plurality of rod electrodes comprises a current collector. In a specific embodiment, each of the plurality of plate electrodes and each of the plurality of rod electrodes comprises a current collector.

Optionally, one or more current collectors are positioned in thermal communication with a heat sink or a heat source. Current collectors positioned in thermal communication with a heat sink or a heat source are useful, for example, for heating, cooling and/or controlling the temperature of a three-dimensional electrode array or a device comprising a three-dimensional electrode array, such as an electrochemical cell. In a specific embodiment, each of the plurality of plate electrodes comprises a current collector positioned in thermal communication with a heat sink or a heat source. In a specific embodiment, each of the plurality of rod electrodes comprises a current collector positioned in thermal communication with a heat sink or a heat source. In a specific embodiment, one or more of the plurality of rod electrodes' current collectors and one or more of the plurality of plate electrodes' current collectors are positioned in thermal communication with a heat sink or a heat source. Useful current collectors include those comprising a material selected from the group consisting of: a metal, a metal alloy, Cu, Ag, Au, Pt, Pd, Ti, Al and any combination of these. Optionally, each current collector comprises and/or is constructed as a heat pipe. In certain embodiments, each current collector is a structural element of the three-dimensional electrode array or provides structural support to the three-dimensional electrode array. Optionally, one or more current collectors is under tension. Current collectors positioned under tensions are useful, for example, for providing structural rigidity to a three-dimensional electrode array. Useful current collectors include those comprising Ni, such as a porous Ni sheet or a Ni screen or a Ni rod or a porous Ni rod. Optionally, a rod electrode comprises a porous rod. Optionally a porous rod electrode comprises a hollow rod electrode with porous walls. Porous rod electrodes are useful, for example, for permitting the passage of active materials, such as a gas, air, or a liquid, such as in a semi-solid battery, a flow battery or a fuel cell.

In a specific embodiment, a three-dimensional electrode of this aspect further comprises one or more heat transfer rods arranged such that each heat transfer rod extends a length along an alignment axis passing through an aperture of each plate electrode. For example, one or more heat transfer rods are positioned analogous to a rod electrode in a three-dimensional array. Optionally, at least one of the one or more heat transfer rods are positioned in thermal communication with a heat sink or a heat source, for example, for heating, cooling and/or controlling the temperature of a three-dimensional electrode array or a device comprising a three-dimensional electrode array. Useful heat transfer rods include, but are not limited to those comprising a material selected from the group consisting of: a metal, a metal alloy, Cu, Ag, Au, Pt, Pd, Ti, Al and any combination of these. Optionally, each heat transfer rod independently comprises a metal or a metal alloy.

In certain embodiments, a three-dimensional electrode array of this aspect further comprises an inert coating on a surface of one or more apertures, for example on a surface of each aperture. An inert coating on an aperture is useful, for example, for preventing electrical contact between a rod electrode and a plate electrode, for preventing the growth of dendrites on a plate electrode and/or for preventing an oxidation reaction or a reduction reaction from occurring at a plate electrode at positions covered by the inert coating. Useful inert coatings include those comprising a material selected from the group consisting of: Teflon, Delrin, Kapton, polytetrafluoroethylene (PTFE), a perfluoroalkoxy (PFA), fluorinated ethylene propylene (FEP), polypropylene (PP), polyethylene (PE) and any combination of these.

In certain embodiments, a three-dimensional electrode array of this aspect further comprises one or more inert spacer elements positioned to provide a space between each plate electrode, between each rod electrode or between each plate electrode and each rod electrode. Useful inert spacers include those comprising a material selected from the group consisting of: Teflon, Delrin, Kapton, polytetrafluoroethylene (PTFE), a perfluoroalkoxy (PFA), fluorinated ethylene propylene (FEP), polypropylene (PP), polyethylene (PE) and any combination of these. Useful inert spacers further include those comprising a non-conducting material.

Optionally, for a three-dimensional electrode array embodiment, at least one rod electrode comprises a first cathode material and wherein at least one rod electrode comprises a second cathode material different from the first cathode material. Optionally, for a three-dimensional electrode array embodiment, at least one rod electrode comprises a first anode material and wherein at least one rod electrode comprises a second anode material different from the first anode material.

Optionally, for a three-dimensional electrode array embodiment, at least one plate electrode comprises a first cathode material and wherein at least one plate electrode comprises a second cathode material different from the first cathode material. Optionally, for a three-dimensional electrode array embodiment, at least one plate electrode comprises a first anode material and wherein at least one plate electrode comprises a second anode material different from the first anode material.

Optionally, for a three-dimensional electrode array embodiment, one or more plate electrodes have a rectangular geometry, a square geometry, an ellipsoidal geometry or a circular geometry. Optionally, for a three-dimensional electrode array embodiment one or more rod electrodes have a diameter or a lateral dimension that changes over a length of a rod electrode or linearly increases or decreases over a length of a rod electrode. Optionally, for a three-dimensional electrode array embodiment, each aperture has a diameter or a lateral dimension that differs on each plate electrode, changes along a length of a rod electrode, or linearly increases or decreases along a length of a rod electrode.

Optionally, one or more of the plurality of rod electrodes has two different diameters or lateral dimensions, a first diameter or lateral dimension positioned at a region of the rod electrode adjacent to an aperture in a plate electrode, and a second diameter or lateral dimension positioned at a region of the rod electrode at regions between plate electrodes, as an example it can be thinner in the vicinity of the walls of the holes and thicker in the vicinity of the space between the plates.

Optionally, a space between one or more of the plate electrodes acts as a buffer, especially when the plate active material has a significant shape change such as in Si anodes in Li-ion batteries.

Optionally, in a three-dimensional electrode array embodiment, a space between the plate electrodes is filled with oil or water or a heat transfer fluid or a heat transfer solid positioned in thermal communication with a thermostat, thereby maintaining the temperature of the three-dimensional electrode array at a specified temperature.

Optionally, a three dimensional electrode array further comprises a plurality of inert material gaskets, PTFE gaskets or silicone gaskets, wherein the oil or water or heat transfer liquid or heat transfer solid is separated from an electrolyte between the rods and the hole-walls by the inert material gaskets, PTFE gaskets or silicone gaskets and wherein the inert material gaskets, PTFE gaskets or silicone gaskets have a shape of a cylinder with a length dimension at least as long as a length dimension of a rod electrode and an outer diameter equal to that of the apertures in the plate electrode, and wherein inert material gaskets, PTFE gaskets or silicone gaskets are completely solid between the plates and is more than 80% open at a vicinity of the apterures in the plate electrodes. Optionally, for each aperture, two diaphragms having a donut shape are placed at the top and bottom of apertures to completely prevent mixing and/or contact of the oil or water or heat transfer liquid or heat transfer solid with the electrolyte.

In an embodiment, a three-dimensional electrode array further comprises one or more metal, glass, ceramic, steel, or polymer rods arranged such that each metal, glass, ceramic, steel or polymer rod extends a length along an alignment axis passing through an aperture of each plate electrode. Such metal, glass, ceramic, steel or polymer rods are useful, for example for providing structural integrity to the three-dimensional electrode array. Optionally, apertures which the metal, glass, ceramic, steel or polymer rods pass through are larger than apertures which the plurality of rod electrodes pass through.

In an embodiment, a three-dimensional electrode array further comprises one or more metal, glass, ceramic, steel or polymer plates including an array of apertures, wherein the one or more metal, glass, ceramic, steel or polymer plates are arranged in a substantially parallel orientation such that the each aperture of an individual metal, glass, ceramic, steel or polymer plate is aligned along the alignment axis passing through the apertures of each of the plate electrodes, Such metal, glass, ceramic, steel or polymer plates are useful, for example, for providing structural integrity to the three-dimensional electrode array.

In an embodiment, a three-dimensional electrode array further comprises a pump to flow a fluid positioned in a space between the plate electrodes and the rod electrodes or a space between each of the plate electrodes or a space inside each of the rod electrodes. Optionally, one or more of the rod electrodes comprise hollow tubes.

Optionally, for use of different electrolytes, such as one between each rod and the corresponding wall of the holes of the plates and another between the perforated plates, a thin membrane is included, for example, tens of micrometers thick, between the two electrolyte systems to separate them. Such a membrane is useful when the two electrolyte systems are both fluid such as liquid, as an example similar to a thin O-ring. Optionally, the membrane is used to remove unwanted products from the cell or to add assisting materials to the cell. Examples of removing unwanted products from the cell are some gas phases that happen as the product of the chemistry cell reactions, such as hydrogen gas, as, for example, is generated in Flow batteries or in Lead Acid batteries, especially in flooded lead-acid batteries. In embodiments, the membranes used here are optionally inert materials such as PTFE or PE or other membrane products with desired pore sizes or chemistry or surface behavior.

In an embodiment, a three-dimensional electrode further comprises one or more dessicant plates including an array of apertures and comprising a dessicant selected from the group consisting of silica gel, activated charcoal, calcium sulfate, calcium chloride, montmorillonite clay, molecular sieves and any combination of these, wherein the one or more dessicant plates are arranged in a substantially parallel orientation such that the each aperture of an individual dessicant plate is aligned along the alignment axis passing through the apertures of each of the plate electrodes. Optionally, one or more dessicant plates comprise an inert coating or a PTFE coating. Inert coatings or PTFE coatings are useful, for example, when the three-dimensional electrode array is a Li battery or a Li-air battery. Optionally, the inert coating or PTFE coating increases the safety and/or performance the battery. In certain embodiments, a dessicant plate is removed from the three-dimensional electrode array after the dessicant plate is saturated with water.

In another aspect, also provided are methods for controlling a temperature of an electrochemical cell. A specific method of this aspect comprises the steps of: providing an electrochemical cell comprising: a plurality of plate electrodes, wherein each plate electrode includes an array of apertures, wherein the plate electrodes are arranged in a substantially parallel orientation such that the each aperture of an individual plate electrode is aligned along an alignment axis passing through an aperture of each of all other plate electrodes; and a plurality of rod electrodes, wherein the plurality of rod electrode are not in physical contact with the plurality of plate electrodes and arranged such that each rod electrode extends a length along an alignment axis passing through an aperture of each plate electrode; wherein a first surface area includes a cumulative surface area the plurality of plate electrodes, wherein a second surface area includes a cumulative surface area of each aperture array and wherein a third surface area includes a cumulative surface area of each of the plurality of rod electrodes; wherein each of the plurality of plate electrodes comprises a current collector, wherein each of the plurality of rod electrodes comprises a current collector or wherein each of the plurality of plate electrodes comprises a current collector and each of the plurality of rod electrodes comprises a current collector; and positioning one or more of the current collectors in thermal communication with a heat sink or a heat source. Optionally, each current collector independently comprises a material selected from the group consisting of: a metal, a metal alloy, Cu, Ag, Au, Pt, Pd, Ti, Al and any combination of these.

In one embodiment, the positioning step comprises removing heat from at least a portion of the electrochemical cell. In one embodiment, the positioning step comprises adding heat to at least a portion of the electrochemical cell. In one embodiment, the method further comprises a step of positioning one or more of the current collectors in thermal communication with a second heat sink or a second heat source.

Optionally, the electrochemical cell further comprises one or more heat transfer rods arranged such that each heat transfer rod extends a length along an alignment axis passing through an aperture of each plate electrode and the method further comprises the step of positioning one or more of the heat transfer rods in thermal communication with the heat sink or the heat source.

In embodiments, a three-dimensional electrode comprises a flow battery. Optionally a three-dimensional electrode array, further comprises a plurality of tubes arranged such that each tube extends a length along an alignment axis passing through an aperture of each plate electrode and wherein at least one rod electrode is positioned within each tube. Optionally, a space within each tube between an inner wall of the tube and a surface of a rod electrode is filled with a fluid, an electrolyte, an aqueous solution or a gas. Optionally, a space between an outer wall of each and wall of one or more apertures is filled with a fluid, an electrolyte, an aqueous solution or a gas, for example different than a fluid, an electrolyte, an aqueous solution or a gas that is present within a space inside each tube. In embodiments, each fluid, electrolyte, aqueous solution or gas is flowing along an alignment axis passing through an aperture of each plate electrode. Optionally, a fluid inside each tube is flowing in a direction opposite to a fluid outside each tube.

In embodiments using different electrolytes, for example one between each rod and the corresponding wall of the holes of the plates and another between the perforated plates, a thin membrane is optionally provided, for example about tens of micrometers thick, between the different electrolyte systems to separate them, for example when the different electrolytes are both fluid such as liquid. Optionally, the thin membrane is a thin O-ring. Optionally, membranes can be used, about tens of micrometers thin, in the shape of tubes, outer radius the same as the holes, inner radius the same as the rods, which are placed around the rods at the top and at the bottom of the plates.

Optionally, a membrane is used during operation of an electrochemical cell to remove unwanted products from the cell or to add assisting materials to the cell. Example of removing unwanted products from the cell are gas phases that form as the product of the chemistry cell reactions, such as hydrogen gas as forms in flow batteries or in lead acid batteries, such as in flooded lead-acid batteries. The membranes used here are optionally inert materials such as PTFE or PE or other membrane products with desired pore sizes or chemistry or surface behavior.

In one embodiment, the separator itself can be a flowing fluid. In an embodiment, that small particles with desired area to volume ratio are transported in a flowing fluid separator and larger particles are not transported in the flowing fluid separator.

In a specific embodiment, a three-dimensional electrode array further comprises a plurality of second tubes arranged such that each second tube extends a length along an alignment axis passing through an aperture of each plate electrode and wherein at least one second tube is positioned with each tube and wherein at least one rod electrode is positioned within each second tube. In this embodiment, each second tube provides a further space in which an optional additional fluid can be flowed.

Another method of this aspect for controlling a temperature of an electrochemical cell comprises the steps of: providing an electrochemical cell comprising: a plurality of plate electrodes, wherein each plate electrode includes an array of apertures, wherein the plate electrodes are arranged in a substantially parallel orientation such that the each aperture of an individual plate electrode is aligned along an alignment axis passing through an aperture of each of all other plate electrodes; a plurality of rod electrodes, wherein the plurality of rod electrode are not in physical contact with the plurality of plate electrodes and arranged such that each rod electrode extends a length along an alignment axis passing through an aperture of each plate electrode; and one or more heat transfer rods arranged such that each heat transfer rod extends a length along an alignment axis passing through an aperture of each plate electrode; wherein a first surface area includes a cumulative surface area the plurality of plate electrodes, wherein a second surface area includes a cumulative surface area of each aperture array and wherein a third surface area includes a cumulative surface area of each of the plurality of rod electrodes; wherein each of the plurality of plate electrodes comprises a current collector, wherein each of the plurality of rod electrodes comprises a current collector or wherein each of the plurality of plate electrodes comprises a current collector and each of the plurality of rod electrodes comprises a current collector; and positioning one or more of the heat transfer rods in thermal communication with a heat sink or a heat source.

In yet another aspect, provided are methods of making electrode arrays. A specific method of this aspect comprises the steps of: providing a plurality of plate electrodes, wherein each plate electrode includes an array of apertures; arranging the plurality of plate electrodes in a substantially parallel orientation such that the each aperture of an individual plate electrode is aligned along an alignment axis passing through an aperture of each of all other plate electrodes; providing a plurality of rod electrodes; and arranging the plurality of rod electrodes such that the plurality of rod electrode are not in physical contact with the plurality of plate electrodes and such that each rod electrode extends a length along an alignment axis passing through an aperture of each plate electrode.

In a specific method of this aspect, the step of providing a plurality of plate electrodes comprises providing a plurality of current collectors and coating an electrode material on at least a portion of the surface of each current collector. In a specific method of this aspect, the step of providing the plurality of rod electrodes comprises providing a plurality of current collectors and coating an electrode material on at least a portion of the surface of each current collector.

A specific method of this aspect comprises making an electrochemical cell. For example a method for making an electrochemical cell further comprises a step of providing an electrolyte between each of the plurality of plate electrodes and each of the plurality of rod electrodes, thereby making an electrochemical cell. Optionally, the method further comprises a step of providing the electrolyte between each of the plurality of plate electrodes and between each of the plurality of rod electrodes.

In another aspect, provided is a redox flow energy storage device. A device of this aspect comprises a positive electrode current collector in the form of one or more rods, a negative electrode current collector in the form of a grid or a grating of crossed bars, and an ion-permeable membrane separating said positive and negative current collectors; a positive electrode disposed between the positive electrode current collector and the ion-permeable membrane; the positive electrode current collector and the ion-permeable membrane defining a positive electroactive zone accommodating the positive electrode; a negative electrode disposed between the negative electrode current collector and the ion-permeable membrane; the negative electrode current collector and the ion-permeable membrane defining a negative electroactive zone accommodating the negative electrode; wherein at least one of the positive and negative electrode comprises a flowable semi-solid or condensed liquid ion-storing redox composition capable of taking up or releasing ions during operation of the cell.

In an embodiment of this aspect, both of the positive and negative electrodes comprise the flowable semi-solid or condensed liquid ion-storing redox compositions. In an embodiment, one of the positive and negative electrodes comprises the flowable semi-solid or condensed liquid ion-storing redox composition and the remaining electrode is a conventional stationary electrode. In an embodiment, the flowable semi-solid or condensed liquid ion-storing redox composition comprises a gel. In an embodiment, a steady state shear viscosity of the flowable semi-solid or condensed liquid ion-storing redox composition is between about 1 cP and 1,000,000 cP at the temperature of operation of the redox flow energy storage device.

In an embodiment, the flowable semi-solid ion-storing redox composition comprises a solid comprising amorphous carbon, disordered carbon, graphitic carbon, graphene, carbon nanotubes or a metal-coated or metal-decorated carbon. In an embodiment, the flowable semi-solid ion-storing redox composition comprises a solid comprising a metal or metal alloy or metalloid or metalloid alloy or silicon or any combination of these. In an embodiment, the flowable semi-solid ion-storing redox composition comprises a solid comprising nanostructures selected from the group consisting of nanowires, nanorods, nanotetrapods and any combination of these. In an embodiment, the flowable semi-solid ion-storing redox composition comprises a solid comprising an organic redox compound.

In an embodiment, a redox flow energy storage device further comprises a storage tank for storing the flowable semi-solid or condensed liquid ion-storing redox composition, the storage tank in flow communication with the redox flow energy storage device. Optionally, a redox flow energy storage device comprises an inlet for introduction of the flowable semi-solid or condensed liquid ion-storing redox composition into the positive/negative electroactive zone and an outlet for the exit of the flowable semi-solid or condensed liquid ion-storing redox composition out of the positive/negative electroactive zone. Optionally a redox flow energy storage device further comprises a fluid transport device to enable flow communication, for example a fluid transport device comprising a pump. Optionally, a condensed-liquid ion-storing material comprises a liquid metal alloy.

In another aspect, provided are methods of operating a redox flow energy storage device. A method of this aspect comprises the steps of providing a redox flow energy storage device, such as described above; and transporting the flowable semi-solid or condensed liquid ion-storing redox composition into the electroactive zone during operation of the device. Optionally, at least a portion of the flowable semi-solid or condensed liquid ion-storing redox composition in the electroactive zone is replenished by introducing new semi-solid or condensed liquid ion-storing redox composition into the electroactive zone during operation.

Optionally, a method of this aspect further comprises a step of transporting depleted semi-solid or condensed liquid ion-storing material to a discharged composition storage receptacle for recycling or recharging. Optionally a method of this aspect further comprises a step of applying an opposing voltage difference to the flowable redox energy storage device; and transporting charged semi-solid or condensed liquid ion-storing redox composition out of the electroactive zone to a charged composition storage receptacle during charging. Optionally, a method of this aspect further comprises the step of applying an opposing voltage difference to the flowable redox energy storage device; and transporting discharged semi-solid or condensed liquid ion-storing redox composition into the electroactive zone to be charged.

In another aspect, provided is a redox flow battery comprising a stack of perforated cells and a group of rods (for example of arbitrary aspect ratio; from one that is a circle cross section to a very large number that is a rectangular cross section; the cross-section itself can vary for example in size), and anolyte and catholyte compartments divided from each other by an ionically selective and conductive separator and having respective electrodes; and anolyte and catholyte tanks, with respective pumps and pipeworks to provide fluid communication between the respective anolyte and catholyte tanks and compartements. In use, the pumps circulate the electrolytes to and from the tanks, to the compartments and back to the tanks. Electricity optionally flows to a load. The electrolyte lines are optionally provided with tappings via which fresh electrolyte can be added and further tappings via which spent electrolyte can be withdrawn, the respective tappings being for anolyte and catholyte. Optionally, on recharging, typically via a coupling for lines to all the tappings, a remote pump pumps fresh anolyte and fresh catholyte from remote storages and draws spent electrolyte to other remote storages.

Optionally, a redox flow battery further comprises an anode in a catholyte compartment, a cathode in an anolyte compartment and, an ion selective membrane separator between the compartments, a pair of electrolyte reservoirs, one for anolyte and the other for catholyte, and electrolyte supply means for circulating anolyte from its reservoir, to the anolyte compartment in the cell and back to its reservoir and like circulating means for catholyte; the battery comprising: connections to its electrolyte reservoirs and/or its electrolyte supply means so that the battery can be recharged by withdrawing spent electrolyte and replacing it with fresh electrolyte. Optionally, an electrolyte divider or membrane is a diaphragm between each rod and the walls of the corresponding holes, or a thin tube shape that the inner and outer radii are chosen to fit between the rod and the corresponding wall and is as long as each of the rods or a thin tube shape as long as the thickness of each of the perforated plates.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

FIGS. 1A and 1B provide views of components of a three-dimensional electrode array embodiment.

FIG. 22 provides a schematic cross-sectional side view of a three-dimensional electrode array comprising a bridge type structure linking the rod electrodes. The inset shows a top view.

DETAILED DESCRIPTION

Figure 2A:
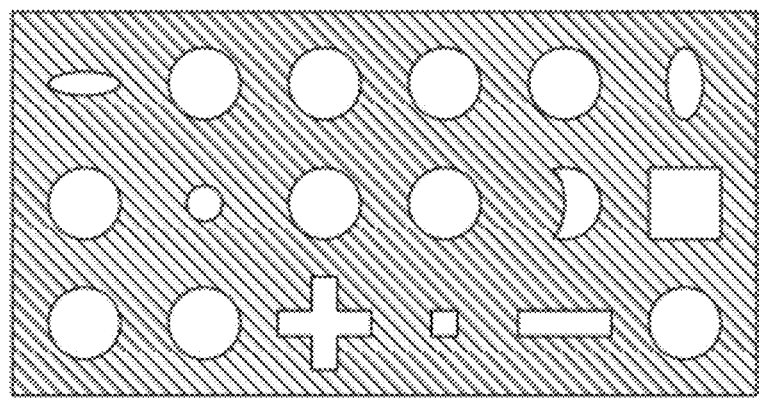
FIGS. 2A and 2B provide front views of components of a three-dimensional electrode array embodiment showing alternate cross-sectional shapes.

In general the terms and phrases used herein have their art-recognized meaning, which can be found by reference to standard texts, journal references and contexts known to those skilled in the art. The following definitions are provided to clarify their specific use in the context of the invention.

Referring to the drawings, like numerals indicate like elements and the same number appearing in more than one drawing refers to the same element. In addition, hereinafter, the following definitions apply:

The term "electrochemical cell" refers to devices and/or device components that convert chemical energy into electrical energy or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries and electrolysis systems. In certain embodiments, the term electrochemical cell includes fuel cells, superdapacitors, capacitors, flow batteries, metal-air batteries and semi-solid batteries. General cell and/or battery Construction is known in the art, see e.g., U.S. Pat. Nos. 6,489,055, 4,052,539, 6,306,540, Seel and Dahn J. Electrochem. Soc. 147(3) 892-898 (2000).

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight. Specific capacity is typically expressed in units of ampere-hours $kg^{-1}$.

The term "discharge rate" refers to the current at which an electrochemical cell is discharged. Discharge current can be expressed in units of ampere-hours. Alternatively, discharge current can be normalized to the rated capacity of the electrochemical cell, and expressed as $C/(X\,t)$, wherein C is the capacity of the electrochemical cell, X is a variable and t is a specified unit of time, as used herein, equal to 1 hour.

"Current density" refers to the current flowing per unit electrode area.

Electrode refers to an electrical conductor where ions and electrons are exchanged with electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive electrodes and negative electrodes of the present electrochemical cell may further comprises a conductive diluent, such as acetylene black, carbon black, powdered graphite, coke, carbon fiber, graphene, and metallic powder, and/or may further comprises a binder, such polymer binder. Useful binders for positive electrodes in some embodiments comprise a fluoropolymer such as polyvinylidene fluoride (PVDF). Positive and negative electrodes of the present invention may be provided in a range of useful configurations and form factors as known in the art of electrochemistry and battery science, including thin electrode designs, such as thin film electrode configurations. Electrodes are manufactured as disclosed herein and as known in the art, including as disclosed in, for example, U.S. Pat. Nos. 4,052,539, 6,306,540, 6,852,446. For some embodiments, the electrode is typically fabricated by depositing a slurry of the electrode material, an electrically conductive inert material, the binder, and a liquid carrier on the electrode current collector, and then evaporating the carrier to leave a coherent mass in electrical contact with the current collector.

"Electrode potential" refers to a voltage, usually measured against a reference electrode, due to the presence within or in contact with the electrode of chemical species at different oxidation (valence) states.

"Electrolyte" refers to an ionic conductor which can be in the solid state, the liquid state (most common) or more rarely a gas (e.g., plasma).

"Standard electrode potential" (E°) refers to the electrode potential when concentrations of solutes are 1M, the gas pressures are 1 atm and the temperature is 25 degrees Celsius. As used herein standard electrode potentials are measured relative to a standard hydrogen electrode.

"Active material" refers to the material in an electrode that takes part in electrochemical reactions which store and/or delivery energy in an electrochemical cell.

"Cation" refers to a positively charged ion, and "anion" refers to a negatively charged ion.

"Electrical contact" and "electrical communication" refers to the arrangement of one or more objects such that an electric current efficiently flows from one object to another. For example, in some embodiments, two objects having an electrical resistance between them less than 100Ω are considered in electrical communication with one another. An electrical contact can also refer to a component of a device or object used for establishing electrical communication with external devices or circuits, for example an electrical interconnection. "Electrical communication" also refers to the ability of two or more materials and/or structures that are capable of transferring charge between them, such as in the form of the transfer of electrons. In some embodiments, components in electrical communication are in direct electrical communication wherein an electronic signal or charge carrier is directly transferred from one component to another. In some embodiments, components in electrical communication are in indirect electrical communication wherein an electronic signal or charge carrier is indirectly transferred from one component to another via one or more intermediate structures, such as circuit elements, separating the components.

"Thermal contact" and "thermal communication" are used synonymously and refer to an orientation or position of elements or materials, such as a current collector or heat transfer rod and a heat sink or a heat source, such that there is more efficient transfer of heat between the two elements than if they were thermally isolated or thermally insulated. Elements or materials may be considered in thermal communication or contact if heat is transported between them more quickly than if they were thermally isolated or thermally insulated. Two elements in thermal communication or contact may reach thermal equilibrium or thermal steady state and in some embodiments may be considered to be constantly at thermal equilibrium or thermal steady state with one another. In some embodiments, elements in thermal communication with one another are separated from each other by a thermally conductive material or intermediate thermally conductive material or device component. In some embodiments, elements in thermal communication with one another are separated by a distance of 1 µm or less. In some embodiments, elements in thermal communication with one another are provided in physical contact.

FIG. 1A provides views of a plate electrode 101 of a three-dimensional electrode array embodiment, including side 101A, top 101B, front 101C and perspective 101D views. Here, plate electrode 101 includes a plurality of apertures 102, each having a circular shape. FIG. 1B provides views of a rod electrode 103 of a three-dimensional electrode array embodiment, including front 103A, side 103B and perspective 103D views. Here, rod electrode 103 has a circular cross-sectional shape.

Figure 2B:
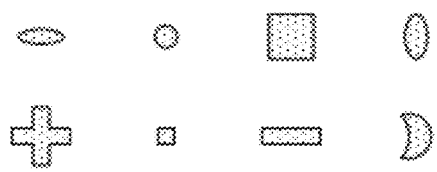

FIG. 2A provides a front view of a plate electrode. Here, plate electrode includes a plurality of apertures of a variety of shapes. FIG. 2B provides a front view of a plurality of rod electrodes showing a variety of useful cross-sectional shapes.

Figure 3A:
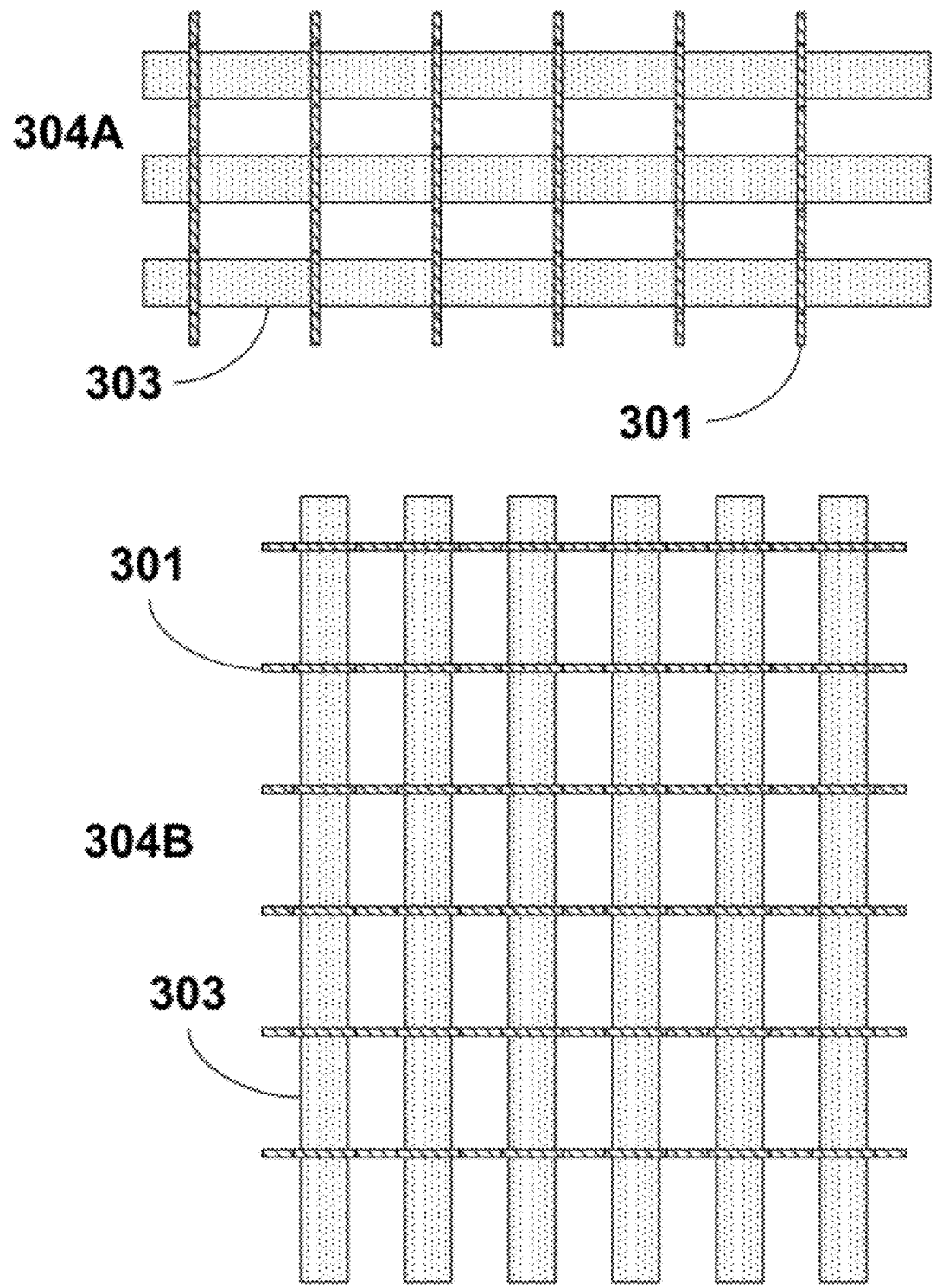
FIGS. 3A and 3B provide views of a three-dimensional electrode array embodiment.
Figure 3B:
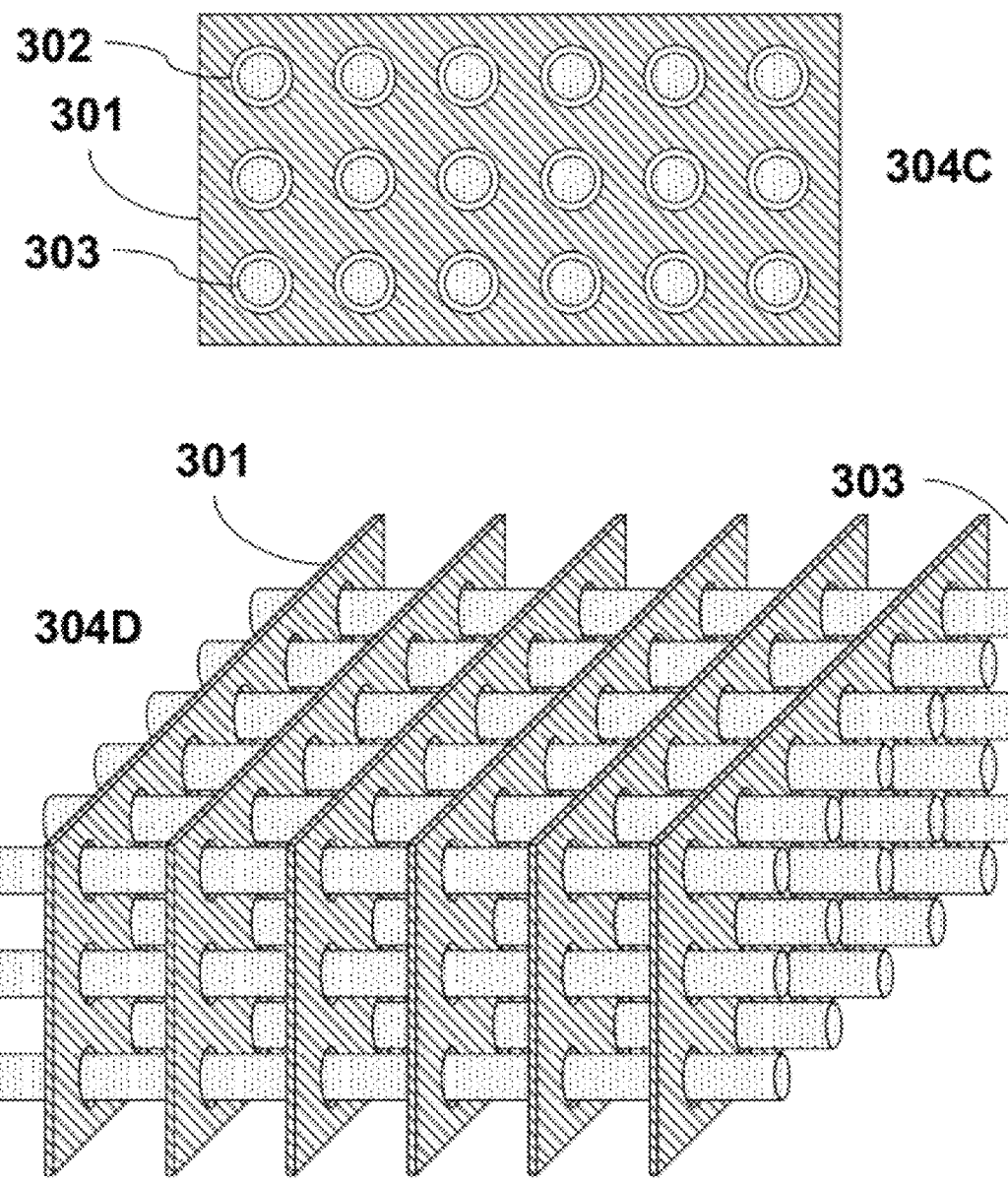

FIGS. 3A and 3B provide views of a three-dimensional electrode array 304. FIG. 3A shows side 304A and top 304B views and FIG. 3B shows front 304C and perspective 304D views. Three dimensional electrode array 304 includes 6 plate electrodes 301 and 18 rod electrodes 303. Here, each rod electrode 303 passes through an aperture 302 of each of the 6 plate electrodes 301. Optionally, the vacant space between each of the plate electrodes, between each of the rod electrodes and between each of the plate electrodes and each of the rod electrodes (i.e., in the apertures) is filled with an electrolyte.

Figure 4A:
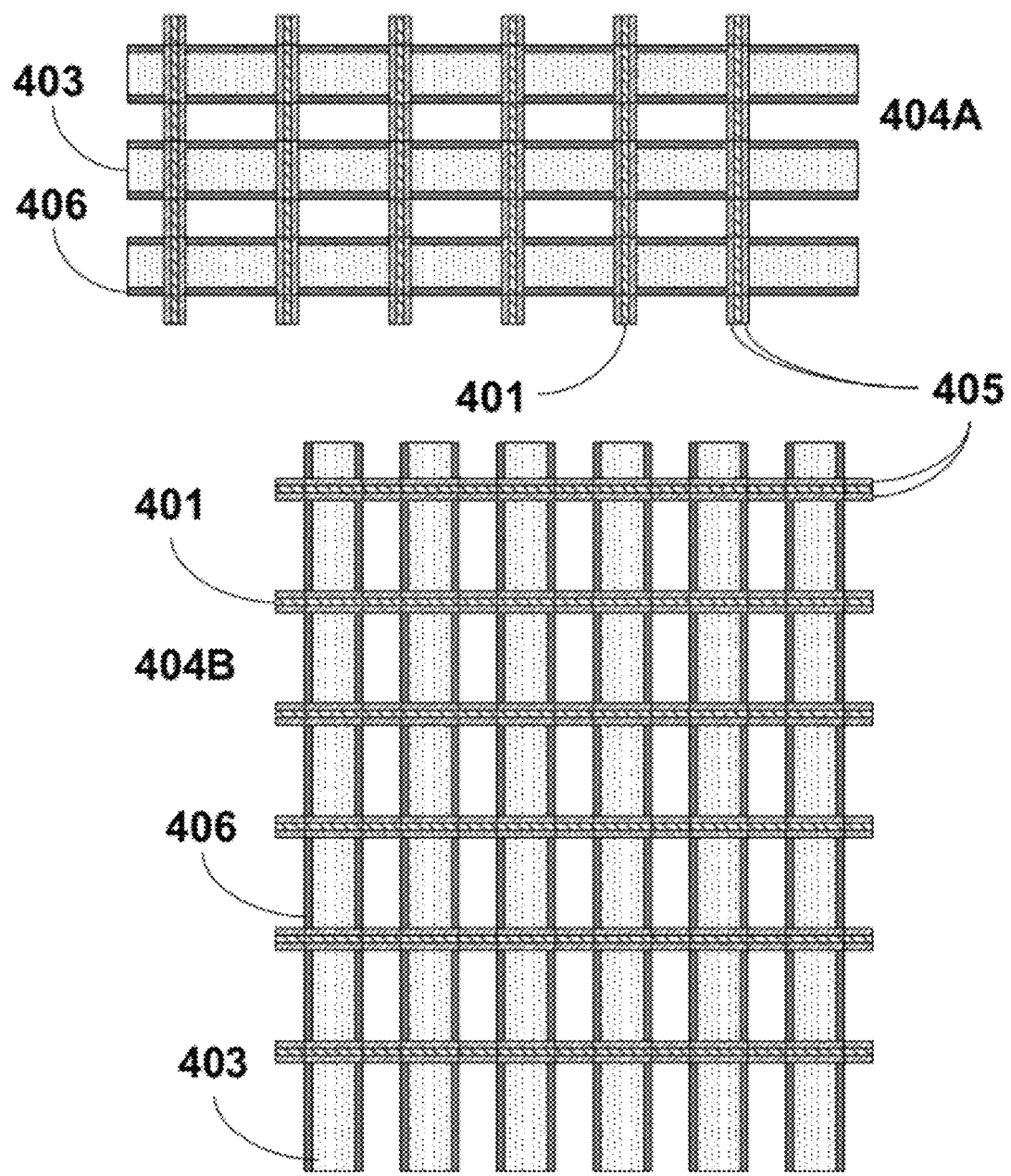
FIGS. 4A and 4B provide views of a three-dimensional electrode array embodiment comprising two different electrolytes.
Figure 4B:
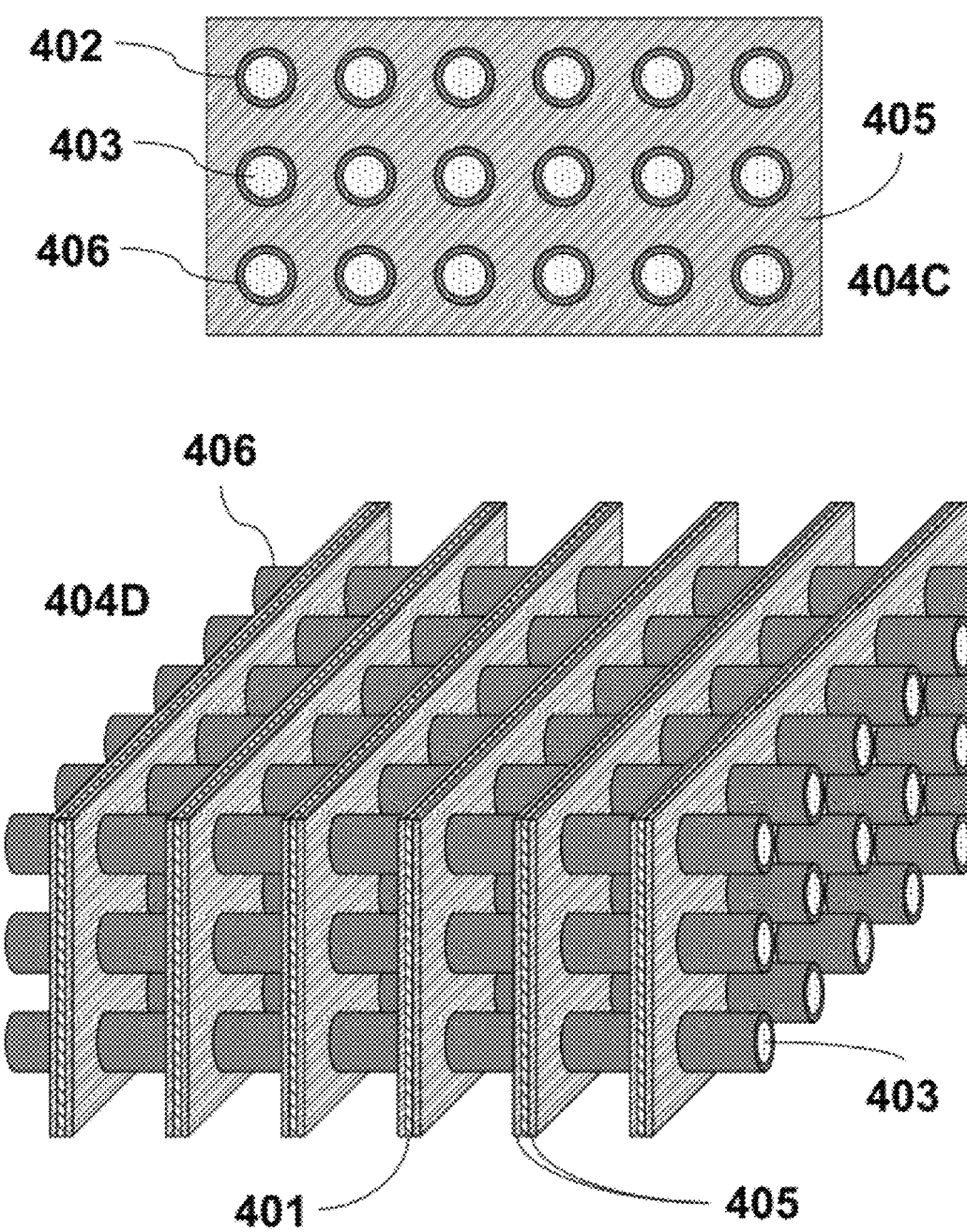

FIGS. 4A and 4B provide views of a three-dimensional electrode array 404. FIG. 4A shows side 404A and top 404B views and FIG. 4B shows front 404C and perspective 404D views. Three dimensional electrode array 404 includes 6 plate electrodes 401 and 18 rod electrodes 403. Here, each rod electrode 403 passes through an aperture 402 of each of the 6 plate electrodes 401. Each plate electrode is flanked on both sides by a first electrolyte 405. Each rode electrode is surrounded by a second electrolyte 406. In this embodiment, second electrolyte 406 and rod electrode 403 completely fill aperture 402. In this embodiment, first electrolyte 405 and second electrolyte 406 are different. For clarity, views 404A and 404B show a cross sectional view of rod electrode 403 and surrounding second electrolyte 406.

Figure 5A:
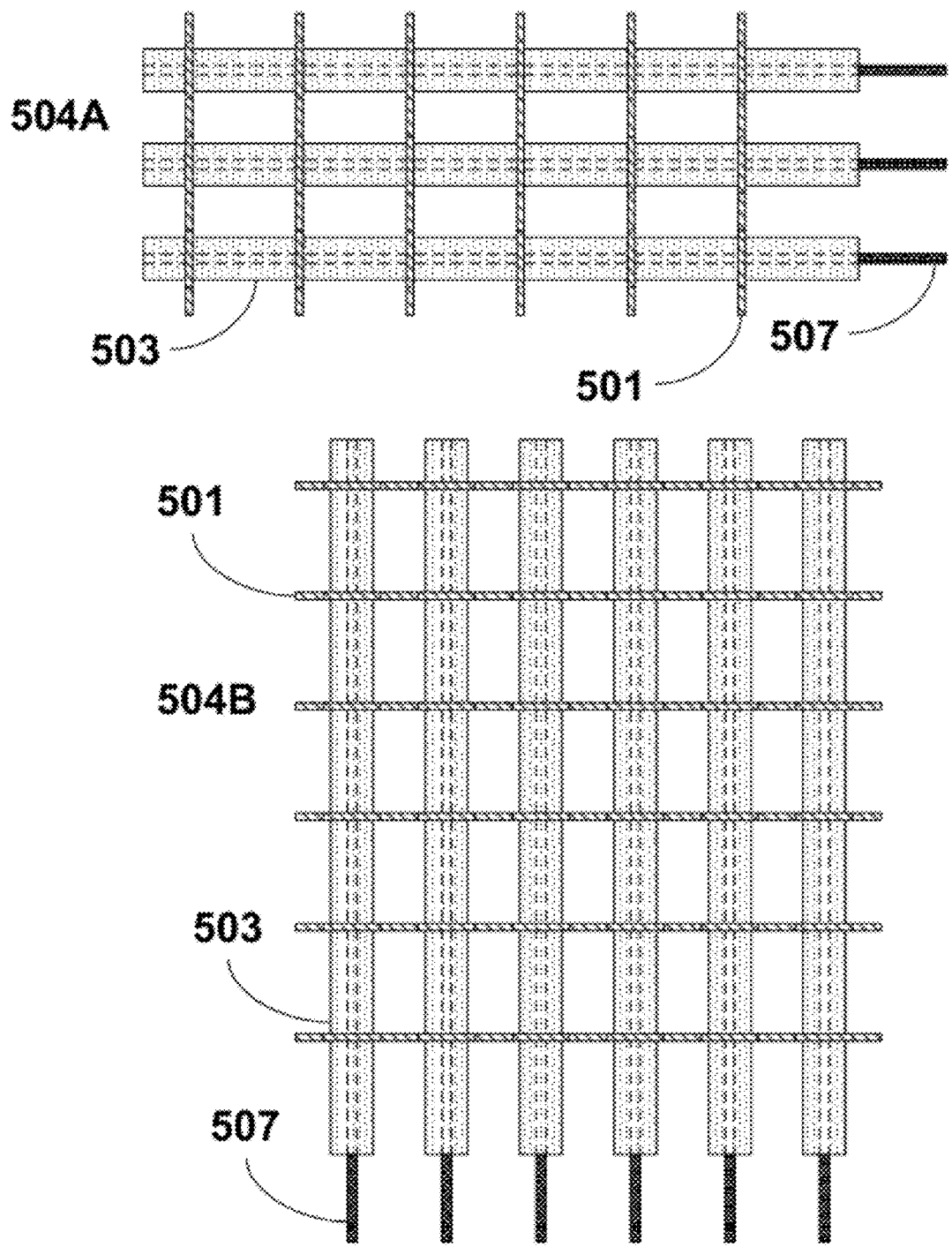
FIGS. 5A and 5B provide views of a three-dimensional electrode array embodiment comprising elements for controlling the temperature of the electrode array.
Figure 5B:
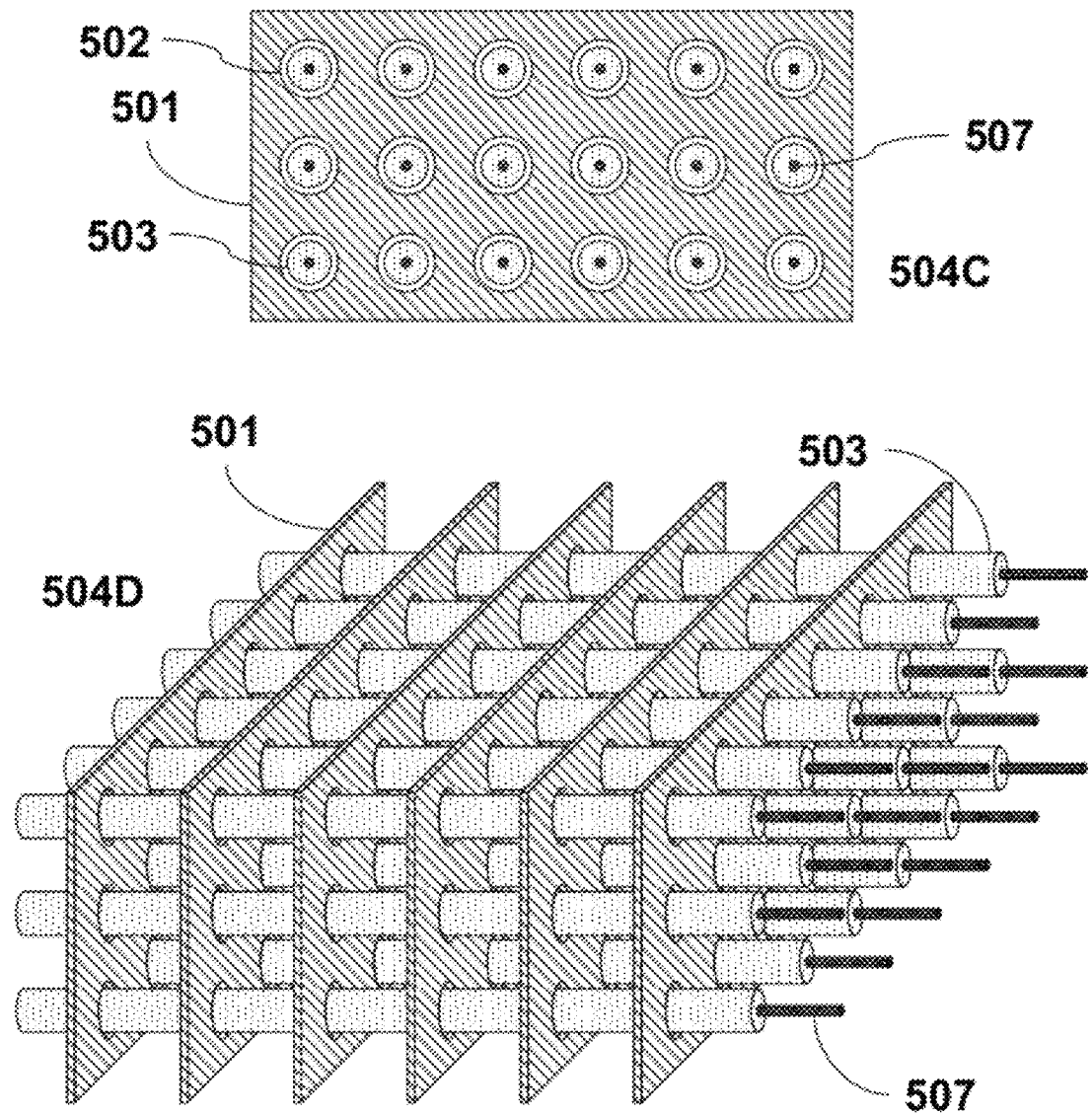

FIGS. 5A and 5B provide views of a three-dimensional electrode array 504. FIG. 5A shows side 504A and top 504B views and FIG. 5B shows front 504C and perspective 504D views. Three dimensional electrode array 504 includes 6 plate electrodes 501 and 18 rod electrodes 503. Here, each rod electrode 503 passes through an aperture 502 of each of the 6 plate electrodes 501. In this embodiment, each rod electrode includes a current collector 507. Optionally, one or more current collectors 507 are placed in thermal communication with a heat sink or heat source to control a temperature of the three-dimensional electrode array.

Figure 6:
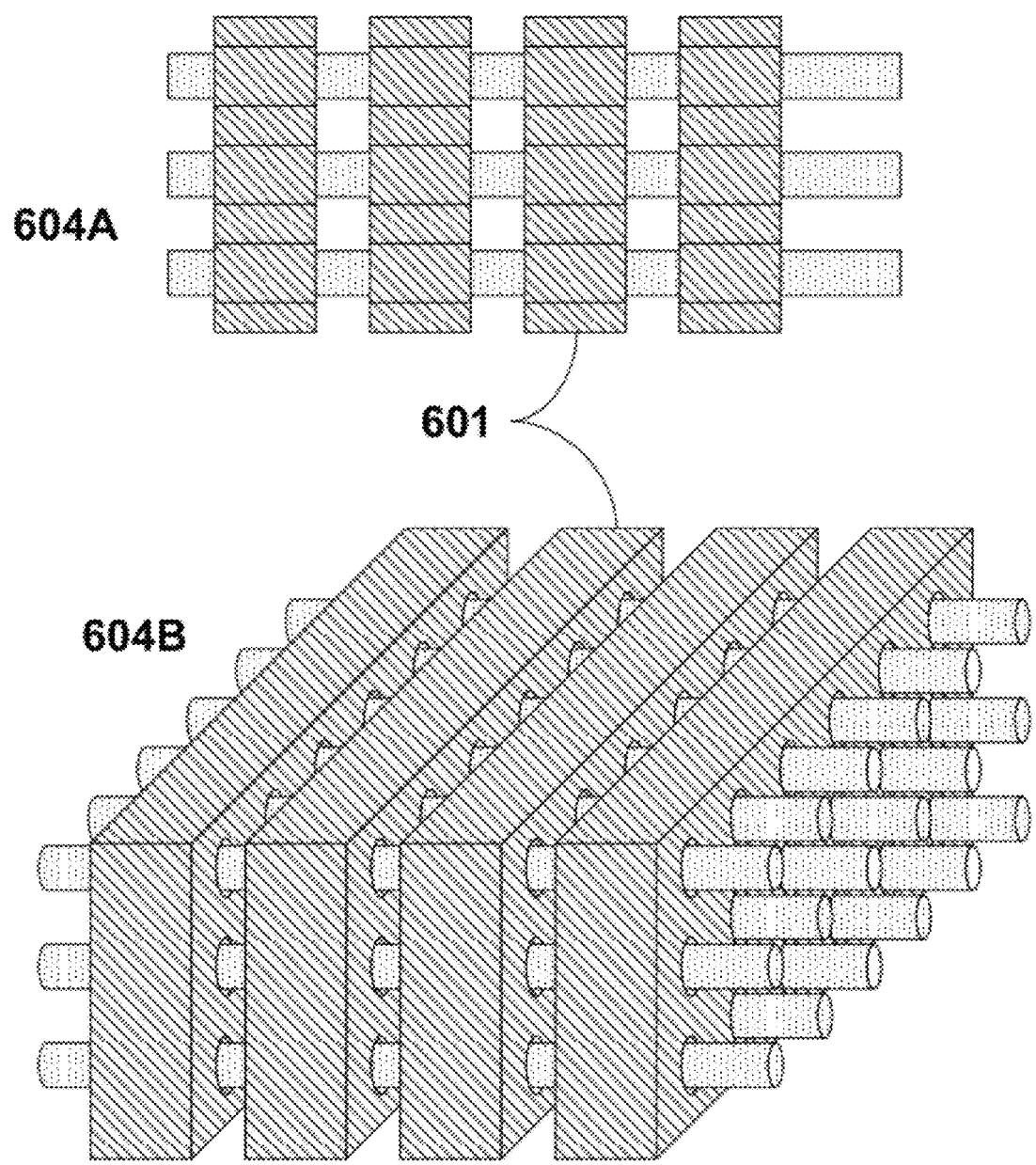
FIG. 6 provide views of a three-dimensional electrode array embodiment with plate electrodes having a thickness larger than the spacing between plates.

FIG. 6 provides views of a three-dimensional electrode array 604, showing side 604A and perspective 604B views. In this embodiment, the space between plate electrodes 601 is smaller than the thickness of the plate electrodes 601.

Figure 7A:
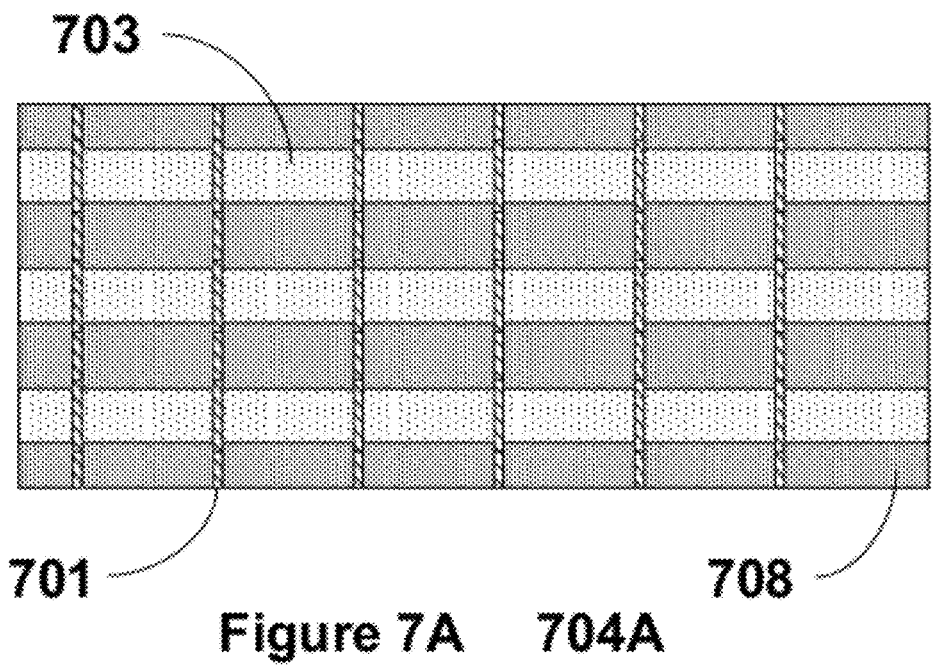
FIGS. 7A and 7B provide views of a three-dimensional electrode array embodiment comprising a fluid and a solid in the interelectrode space.
Figure 7B:
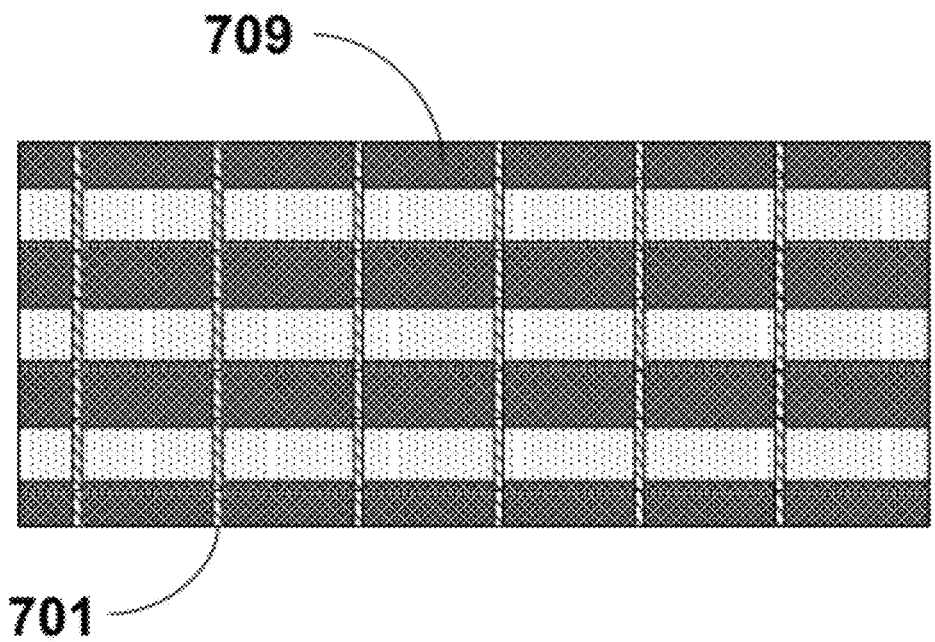

FIG. 7A provides a side view of a three-dimensional electrode array 704A, where the space between the plate electrodes 701 and the rod electrodes 703 is filled with a fluid 708, such as a gas or a liquid electrolyte. FIG. 7B provides a side view of a three-dimensional electrode array 704B, where the space between the plate electrodes 701 is filled with a solid 709.

Figure 8:
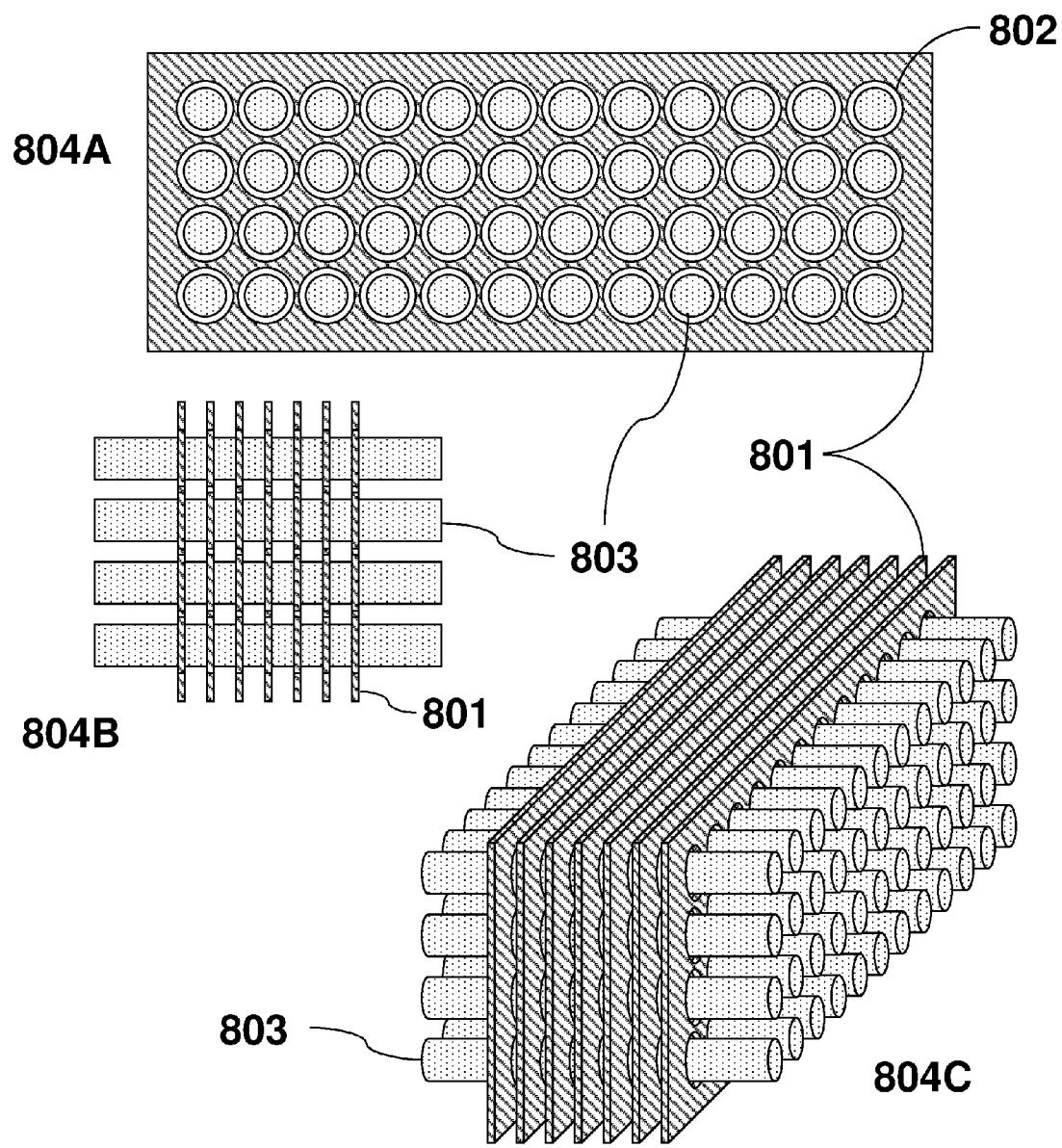
FIG. 8 provide views of a three-dimensional electrode array embodiment comprising closely spaced apertures in plate electrodes.

FIG. 8 provides views of a three-dimensional electrode array 804. FIG. 8 shows front 804A, side 804B and perspective 804C views. In this embodiment, there are 7 plate electrodes 801 and 48 rod electrodes 803. The apertures 802 in the plate electrodes are closely space in this embodiment, for example at a distance less than 10% of the diameter of the apertures 802.

Figure 9:
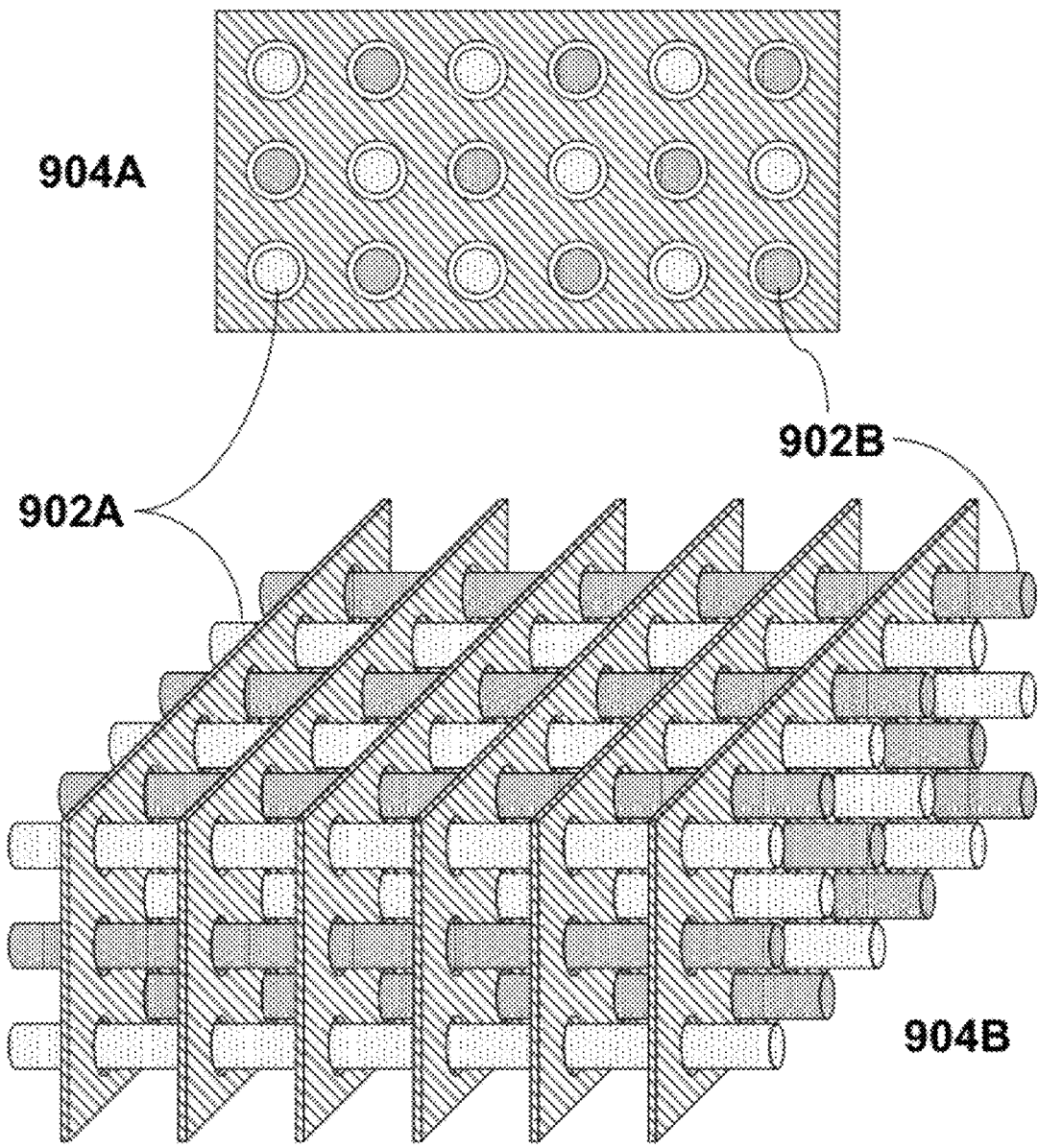
FIG. 9 provide views of a three-dimensional electrode array embodiment comprising different rod electrode materials.

FIG. 9 provides views of a three-dimensional electrode array 904 and shows front 904A and perspective 904B views. In this embodiment, the rod electrodes include two different materials, first rod electrode material 902A and second rod electrode material 902B.

Figure 10:
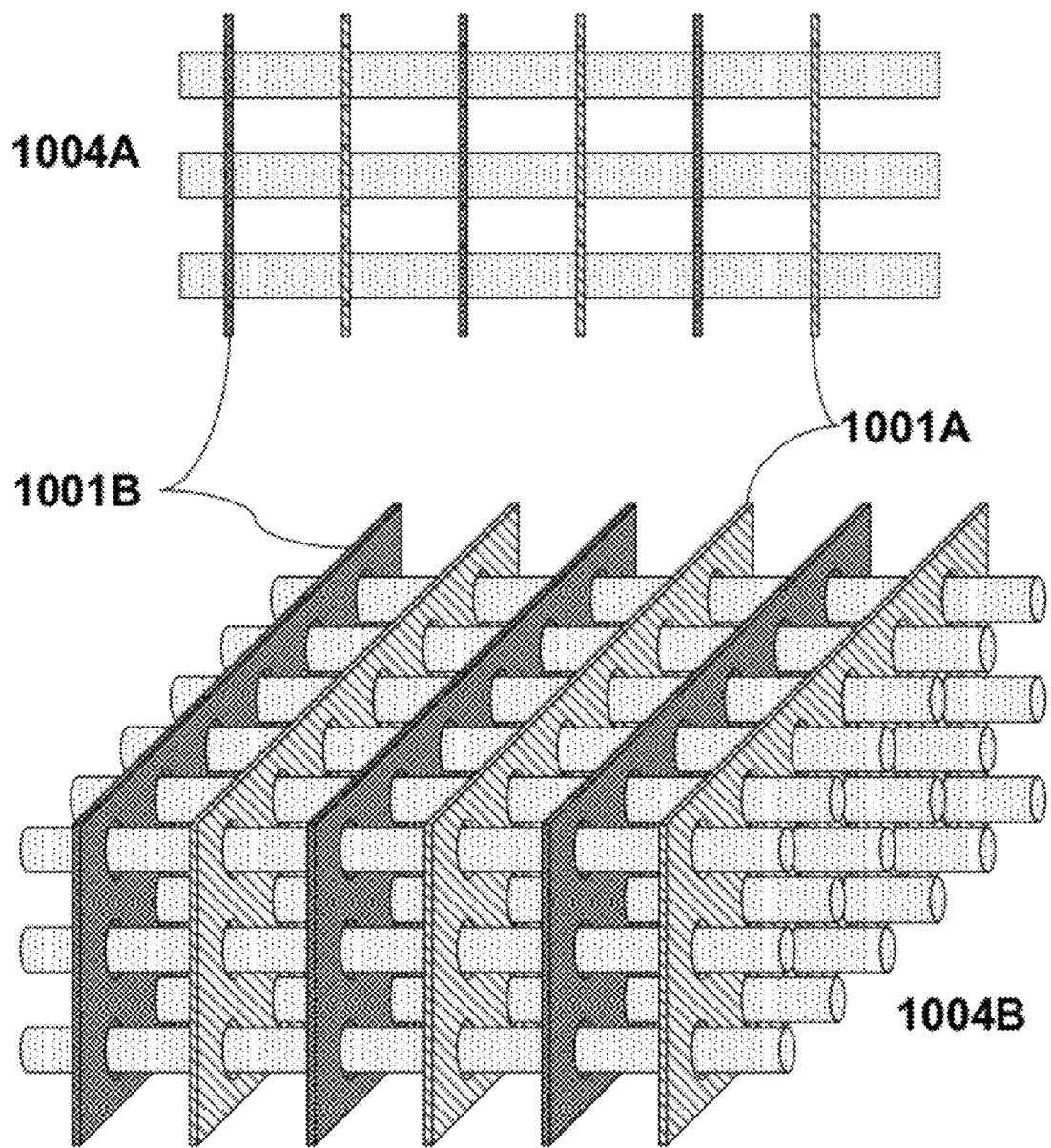
FIG. 10 provide views of a three-dimensional electrode array embodiment comprising different plate electrode materials.

FIG. 10 provides views of a three-dimensional electrode array 1004 and shows side 1004A and perspective 1004B views. In this embodiment, the plate electrodes include two different materials, first plate electrode material 1001A and second plate electrode material 1001B. Optional embodiments also include those with multiple plate electrode materials and multiple rod electrode materials.

Figure 11:
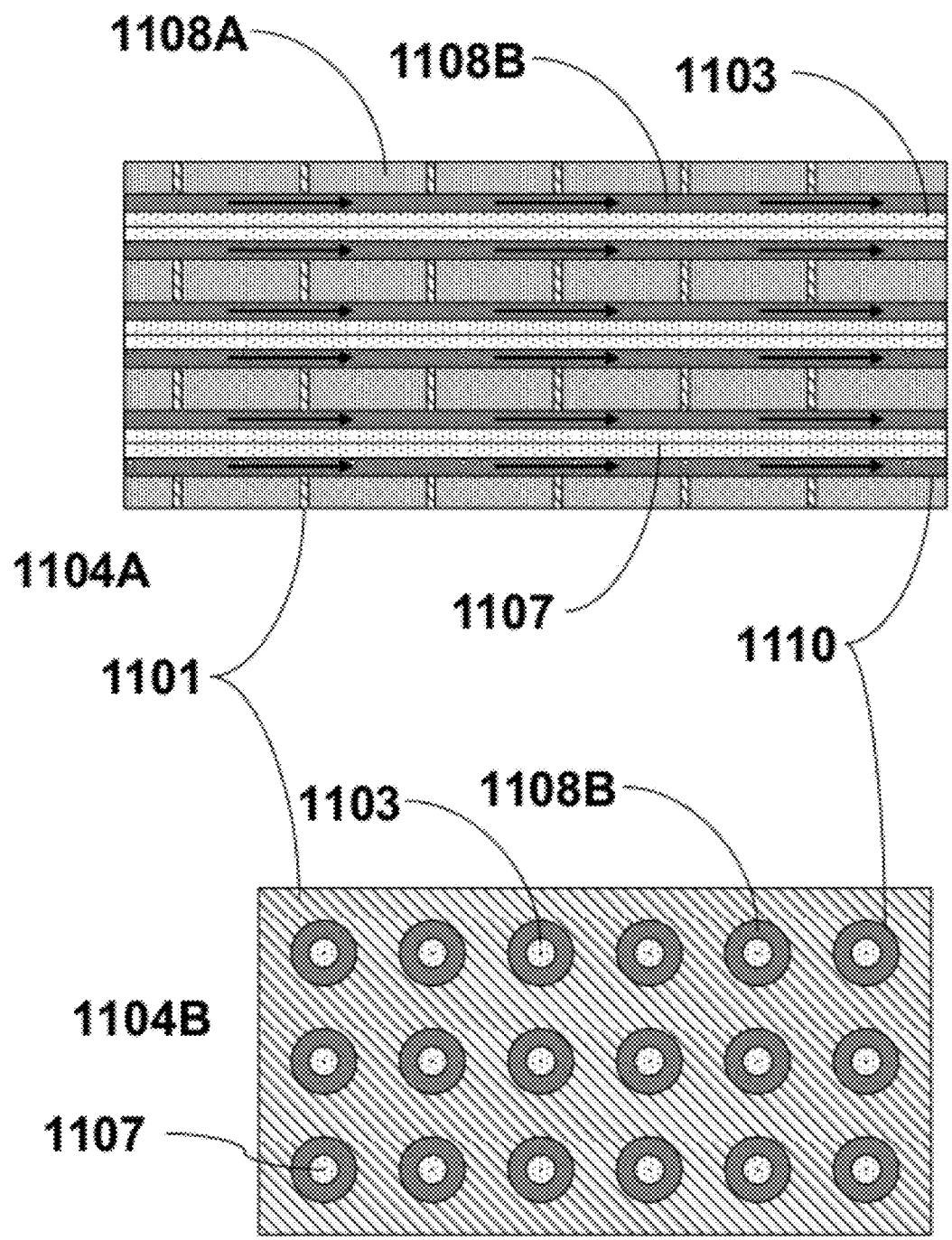
FIG. 11 provides a view of a three-dimensional electrode array in which a fluid surrounding the electrodes is induced to flow.

FIG. 11 provides views of a three-dimensional electrode array 1104, including a side view 1104A and a front view 1104B. In this embodiment, a thin tube 1110 fills each aperture in plate electrodes 1101. The space between plate electrodes 1101 is filled with a first fluid 1108A. For clarity, electrolyte 1108A is not shown in front view 1104B. Each thin tube 1110 is filled with a second fluid 1108B surrounding rod electrode 1103. Here, rod electrodes 1103 comprise an electron collector 1107. In this embodiment, a flow is provided such that fluid 1108B flows in the direction shown by the arrows.

Figure 12:
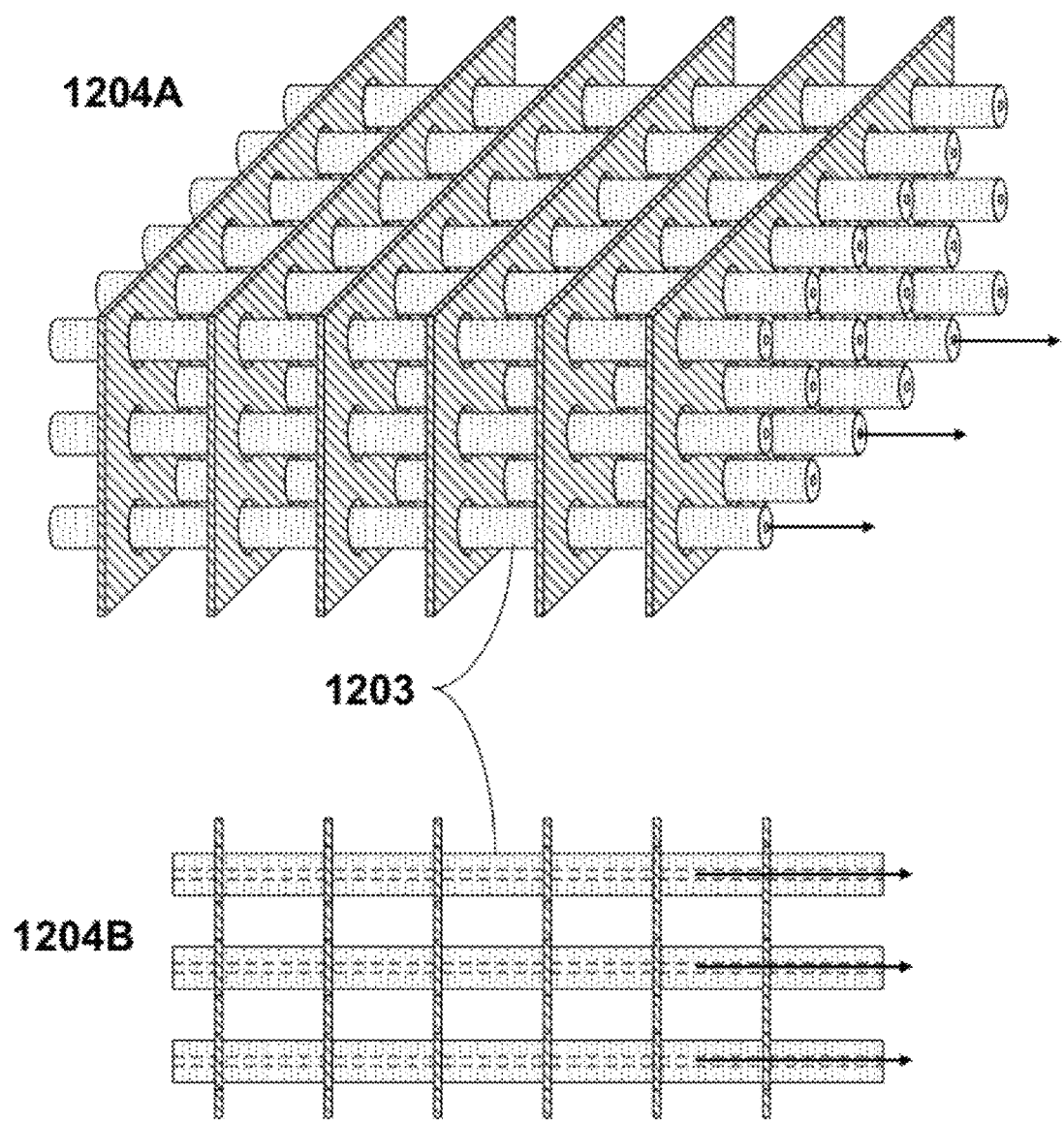
FIG. 12 provides views of a three-dimensional electrode array comprising hollow tube rod electrodes.

FIG. 12 provides views of a three-dimensional electrode array 1204 and shows perspective 1204A and side 1204B views. In this embodiment, rod electrodes 1203 are constructed as hollow tubes, such that fluid can flow along the interior of the rod electrodes 1203 as indicated by the arrows. Certain embodiments comprising hollow rod electrodes, are useful for a number of applications, including electrode array temperature control, fuel cell, metal-air batteries and flow batteries. In certain embodiments, rod electrodes 1203 comprise a porous material.

Figure 13A:
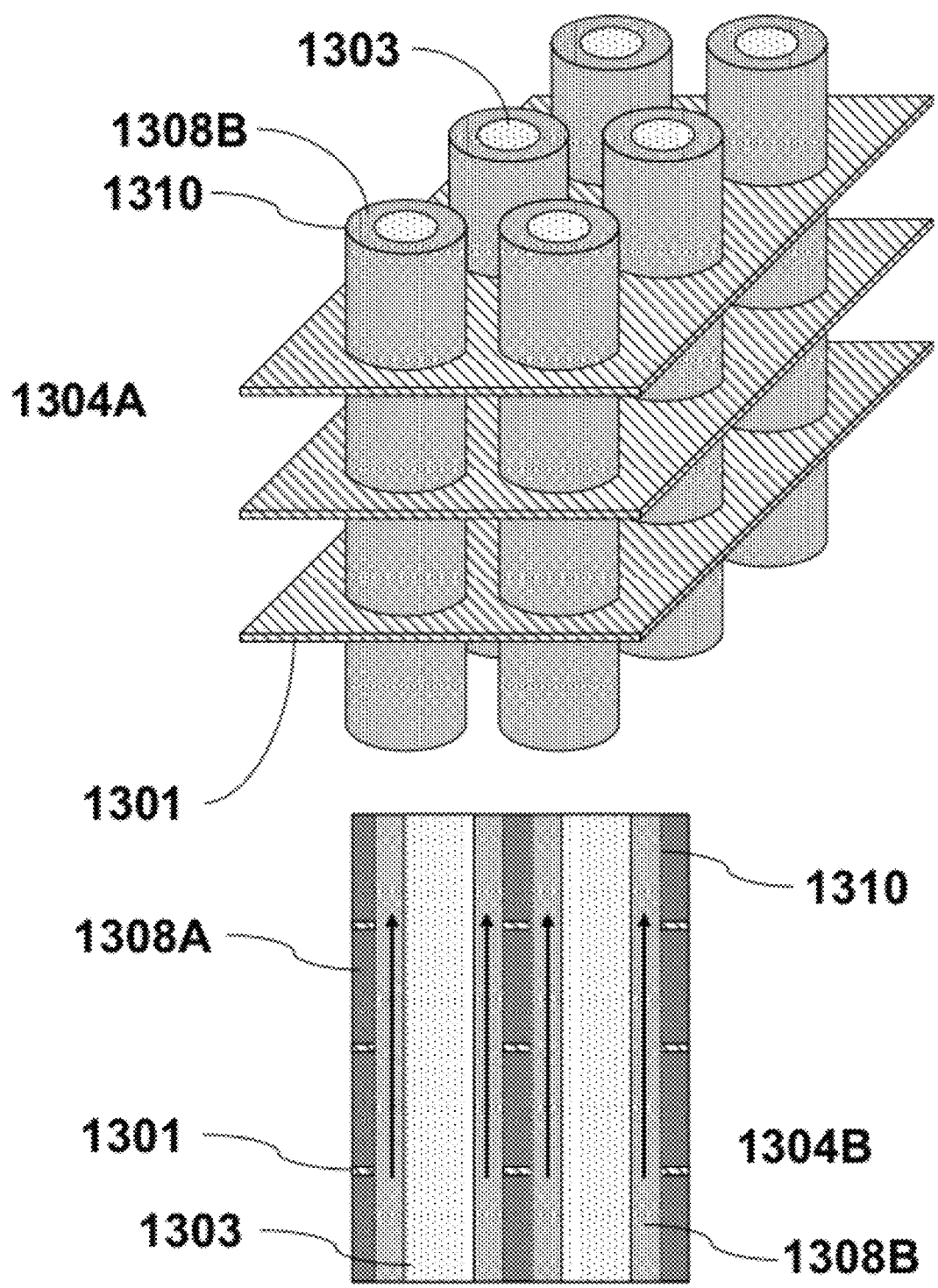
FIGS. 13A and 13B provide views of a three-dimensional electrode array comprising a first flowing fluid surround the plate electrodes and a second flowing fluid surrounding the rod electrodes.
Figure 13B:
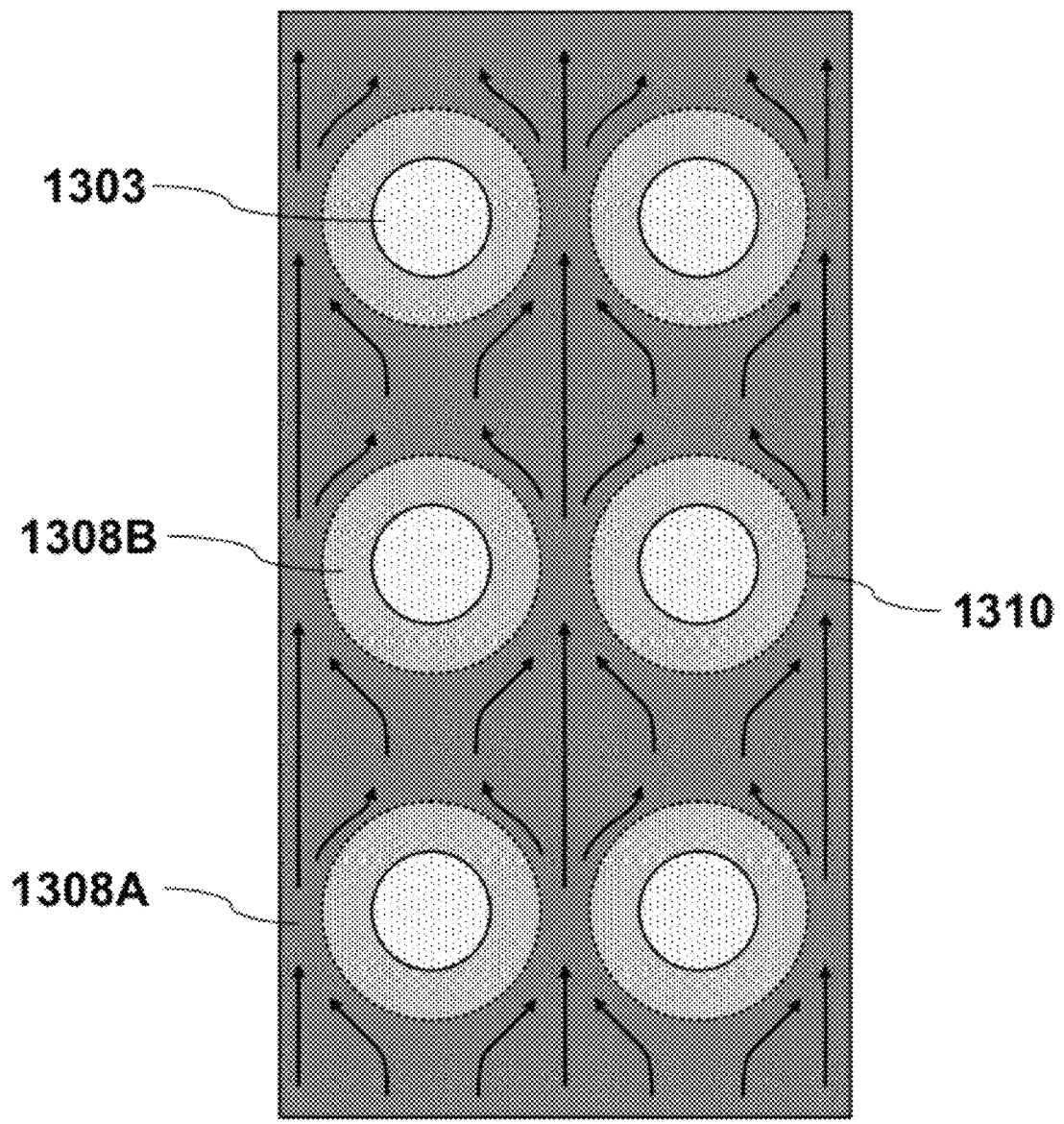

FIGS. 13A and 13B provides views of a three-dimensional electrode array 1304, including perspective 1304A, front cross-sectional 1304B and top 1304C views. This embodiment comprises 3 plate electrodes 1301 and 6 rod electrodes 1303. Here, the space between the plate electrodes 1301 is filled with a first fluid 1308A. For clarity, perspective view 1304A does not show first fluid 1308A. Surrounding each rod electrode 1303 is a thin tube 1310 filled with a second fluid 1308B. Each thin tube 1310 fills an entire aperture in plate electrodes 1301. In front cross-sectional view 1304B and top view 1304C, thin tubes 1310 are indicated by a dashed line. In embodiments, first fluid 1308A is induced to flow within thin tubes 1310, for example, as shown by the arrows in front cross-sectional view 1304B. In embodiments, second fluid 1308B is induced to flow across the space between plate electrodes 1301, for example, as shown by the arrows in FIG. 13B. First fluid 1308A flows in the spaces between plate electrodes 1301 and second fluid 1308B flows within thin tubes 1310.

Optionally, the plate electrodes 1301 comprise graphite and are optionally useful as an anode. Optionally, the rod electrodes 1303 useful as a cathode. Optionally, the rod electrodes 1303 comprise a carbon shell and include electron collectors (not shown) comprising copper. Optionally, first fluid 1308A and second fluid 1308 independently comprises electrolytes. In an embodiment where three-dimensional electrode array 1304 is a component of a semi-solid battery, first fluid 1308A comprises a first electrolyte and a first active material and second fluid 1308B comprises a second electrolyte and a second active material. In an embodiment where three-dimensional electrode array 1304 is a component of a flow battery, first fluid 1308A comprises a first electrolyte second fluid 1308B comprises a second electrolyte. In an embodiment where three-dimensional electrode array 1304 is a component of a fuel cell, first fluid 1308A comprises a fuel, such as $H_2$, and second fluid 1308B comprises an oxygen containing fluid, such as air.

Figure 14:
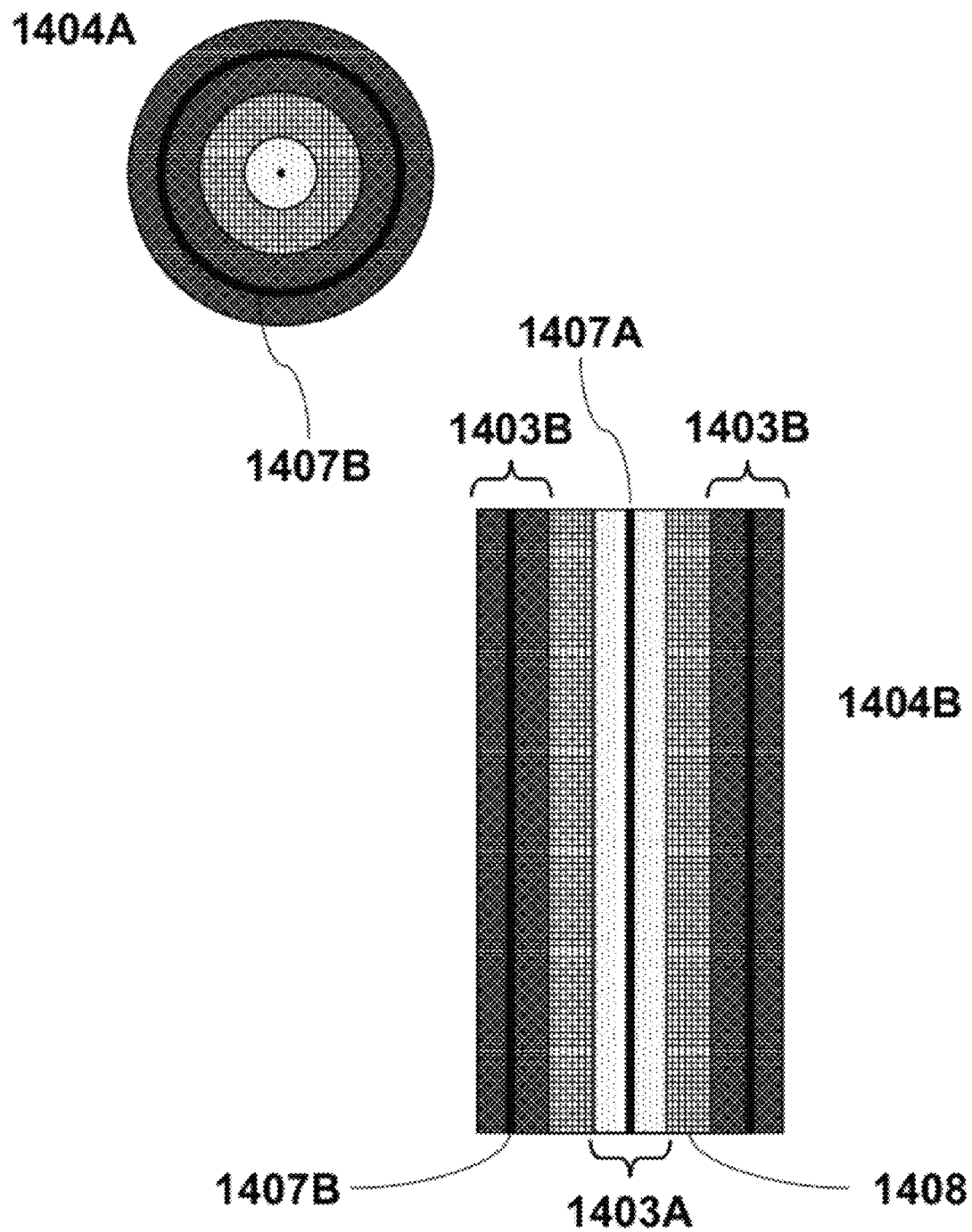
FIG. 14 provides views of a rod electrode embodiment.

FIG. 14 provides views of a rod electrode embodiment 1403, including end view 1404A and cross-sectional view 1404B. In this embodiment, each rod electrode 1403 comprises an electrode pair, including rod inner core 1403A and rod outer shell 1403B. In this embodiment, rod inner core 1403A comprises a first electron collector 1407A. In this embodiment, rod outer shell 1403B comprises a second electron collector 1407B. Between rod inner core 1403A and rod outer core 1403B is material 1408. In certain embodiments, each rod electrode 1403 is an electrochemical cell, and material 1408 comprises an electrolyte.

Rod electrodes of the embodiment shown in FIG. 14 are useful, for example, in any three-dimensional electrode array described herein. Optionally, the rod electrode inner core and a plate electrode comprise identical or substantially identical materials. Embodiments of this aspect are useful, for example, for increasing the ratio of the amount of the rod inner core/plate material to the amount of rod outer core material.

Figure 15A:
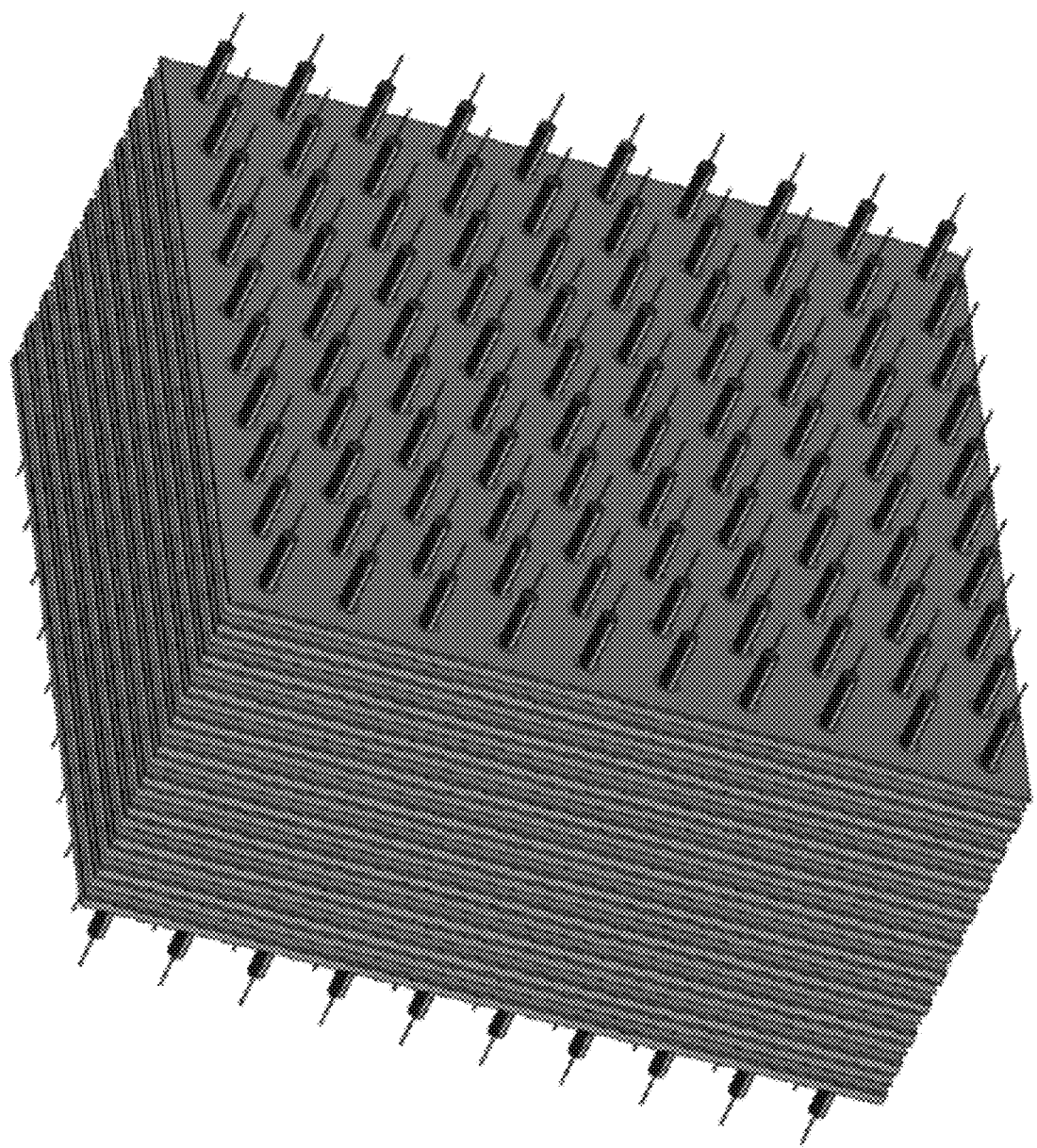
FIGS. 15A and 15B provide views of a three-dimensional electrode array comprising hollow tube rod electrodes.
Figure 15B:
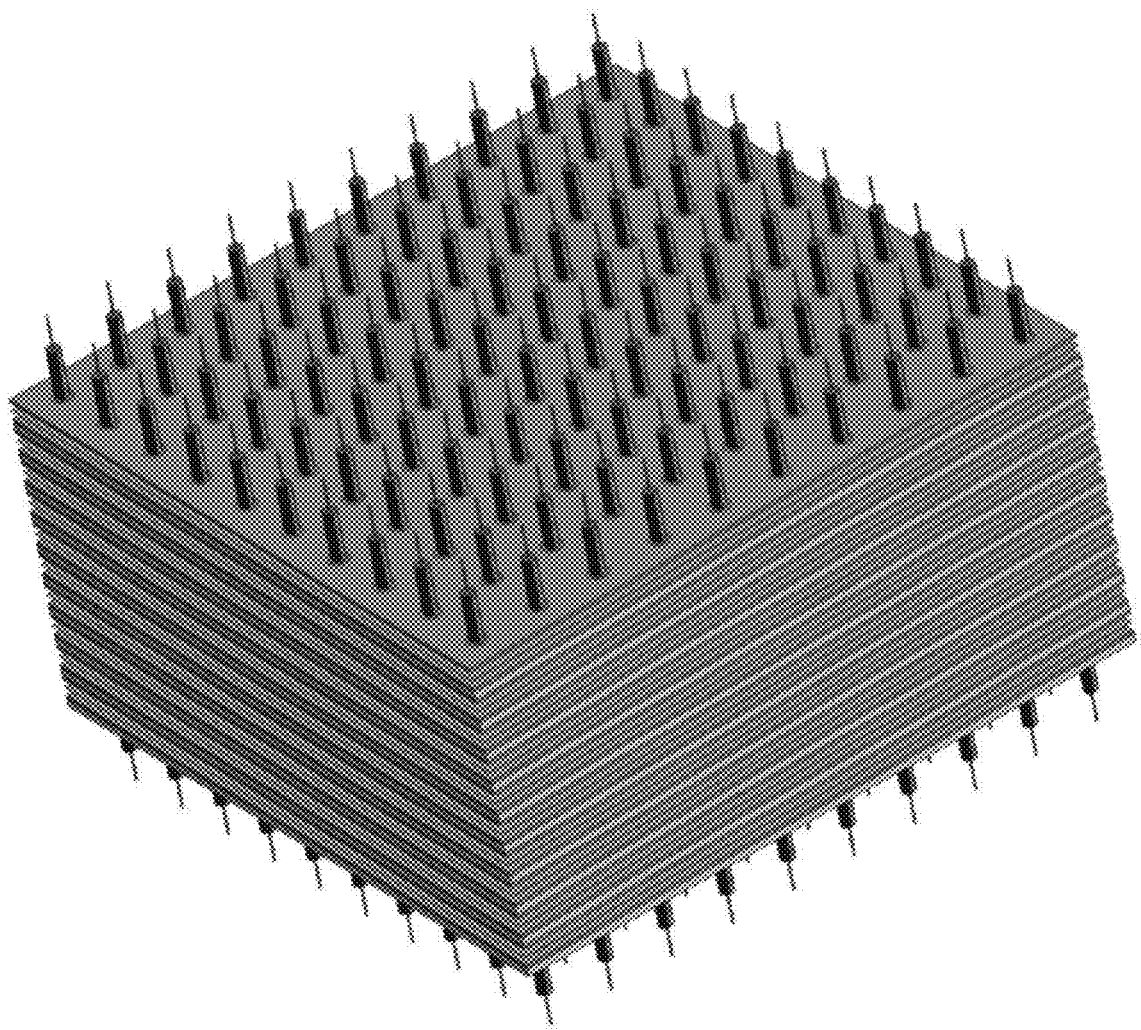

FIGS. 15A and 15B provide three-dimensional views of a three-dimensional electrode array 1504. In this embodiment, many plate electrodes are stacked, sandwiching materials, such as a solid electrolyte, between the plate electrodes. Many rod electrodes are shown, including a current collector. Optionally, the current collectors are held under tension to provide structural rigidity to the electrode array.

Figure 16A:
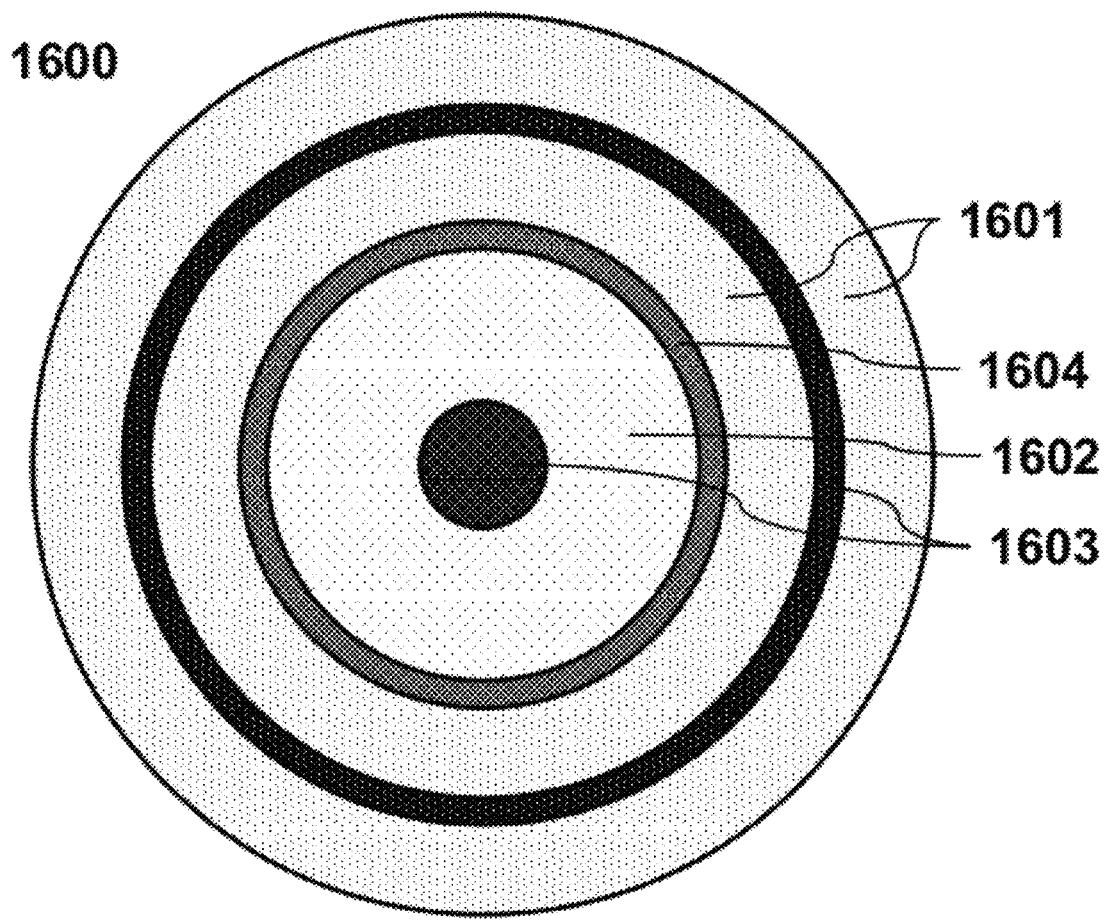
FIGS. 16A and 16B provide schematic drawings of a composite rod electrode structure.
Figure 16B:
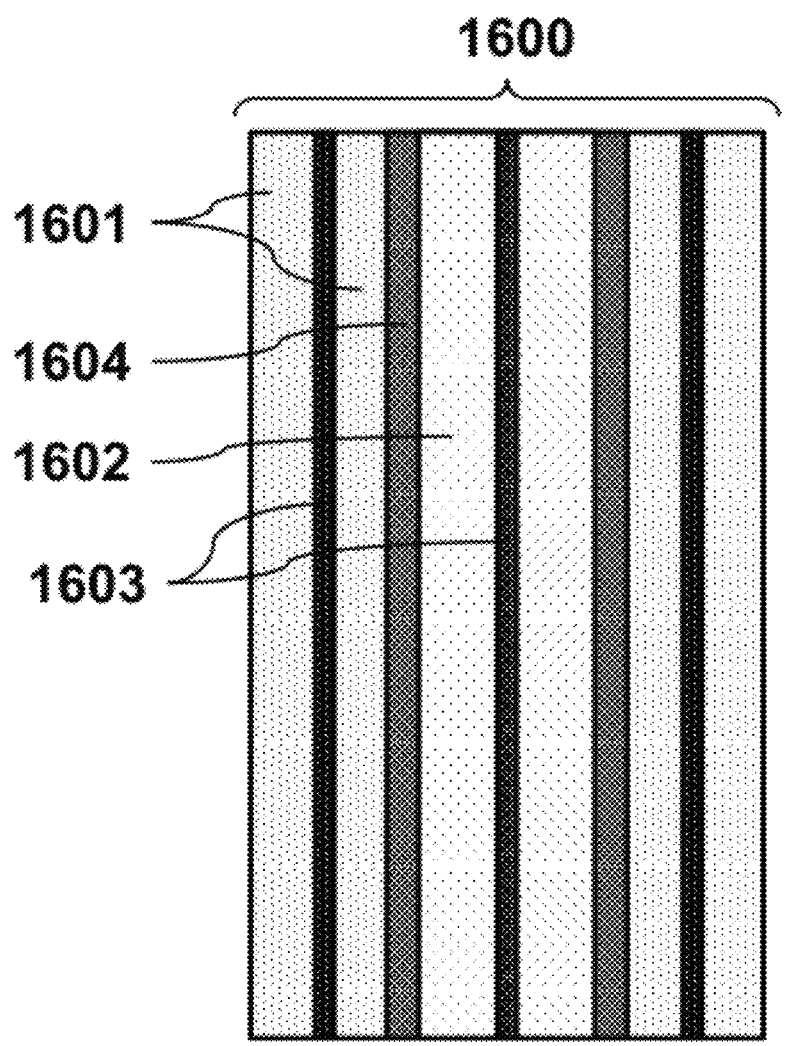

FIGS. 16A and 16B provide views of a composite rod electrode structure. FIG. 16A provides an end view of the composite rod electrode structure 1600 having electrodes 1601, electrode 1602, current collector 1603 and electrolyte 1604. FIG. 16B provides a cross sectional side view of the composite rod electrode 1600 also showing electrodes 1601, electrode 1602, current collector 1603 and electrolyte 1604. In an embodiment, electrodes 1601 are an anode and electrode 1602 is a cathode. Alternatively, the invention includes composite rod electrodes wherein electrodes 1601 is a cathode and electrode 1602 is an anode. In an embodiment, composite rod electrode structure 1600 provides an electrochemical cell, a fuel cell, a flow cell, a metal air battery, or a supercapacitor device.

Figure 17A:
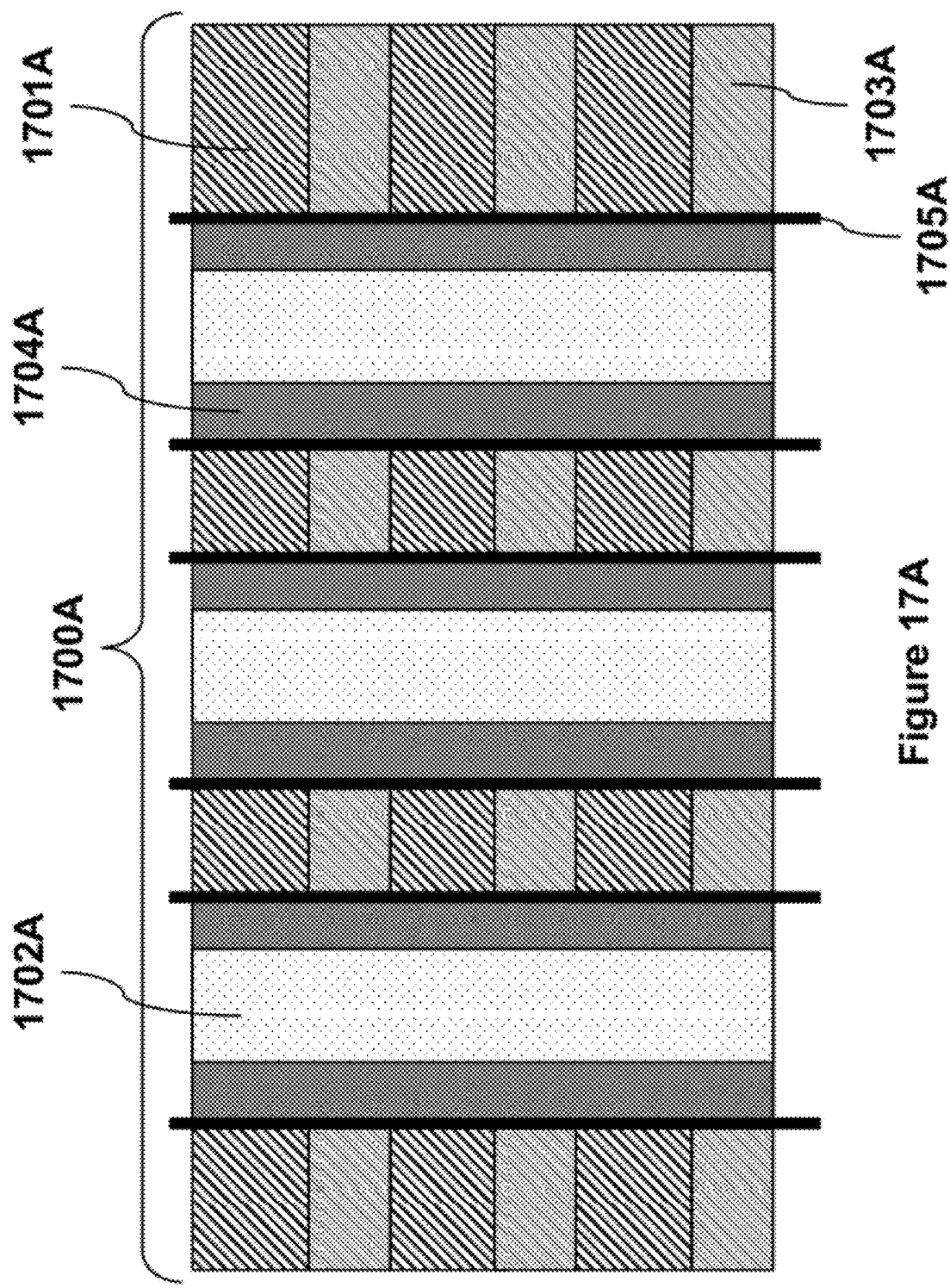
FIGS. 17A-17E provide schematic drawings of a three dimensional electrode array and optionally one or more flowing electrolyte components.

FIGS. 17A-17E provide schematic drawings of three-dimensional electrode arrays, optionally including one or more flowing electrolyte components. FIG. 17A provides a side view of an electrode array electrode structure 1700A having plate electrodes 1701A, rod electrodes 1702A, first electrolyte 1703A, second electrolyte 1704A and membrane 1705A. As shown in this figure, rod electrodes 1702A extend through holes provided in plate electrodes 1701A. Rod electrodes 1702A are provide in an array geometry and plate electrodes 1701A are provided in a stacked configuration. In an embodiment, plate electrodes 1701A and rod electrodes 1702A are solid electrodes. In an embodiment, first electrolyte 1703A and second electrolyte 1704A are independently a solid, a gel or a fluid electrolyte. In an embodiment, for example, first electrolyte 1703A and second electrolyte 1704A are the same electrolyte. In an alternative embodiment, for example, first electrolyte 1703A and second electrolyte 1704A are different electrolytes. In an embodiment, membrane 1705A is a solid membrane providing a barrier between plate electrodes 1701A and rod electrodes 1702A.

Figure 17B:
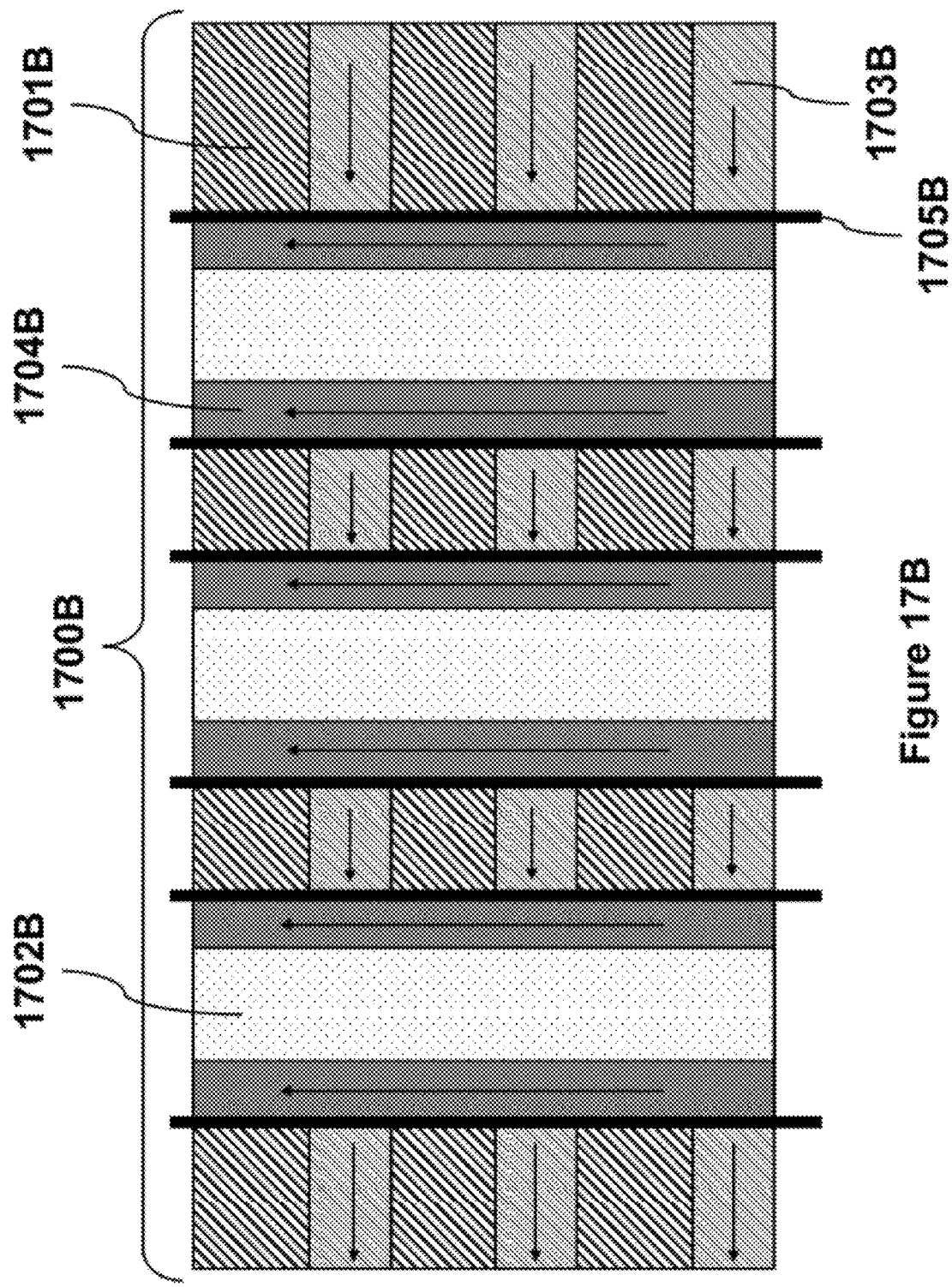

FIG. 17B provides a side view of an electrode array structure 1700B having plate electrodes 1701B, rod electrodes 1702B and membrane 1705B and demonstrating an embodiment including a flowing electrolyte configuration, for example, having a flowing first electrolyte 1703B and a flowing second electrolyte 1704B. In FIG. 17B, the arrows indicate the direction of flow of electrolytes. In an embodiment, electrolyte 1703B is a flowing fluid that optionally includes active nanoparticles and/or microparticles, for example, which participate in oxidation—reduction reactions. In an embodiment, electrolyte 1704B is a flowing fluid that optionally includes active nanoparticles and/or microparticles, for example, nanoparticles and/or microparticles which participate in oxidation—reduction reactions.

Figure 17C:
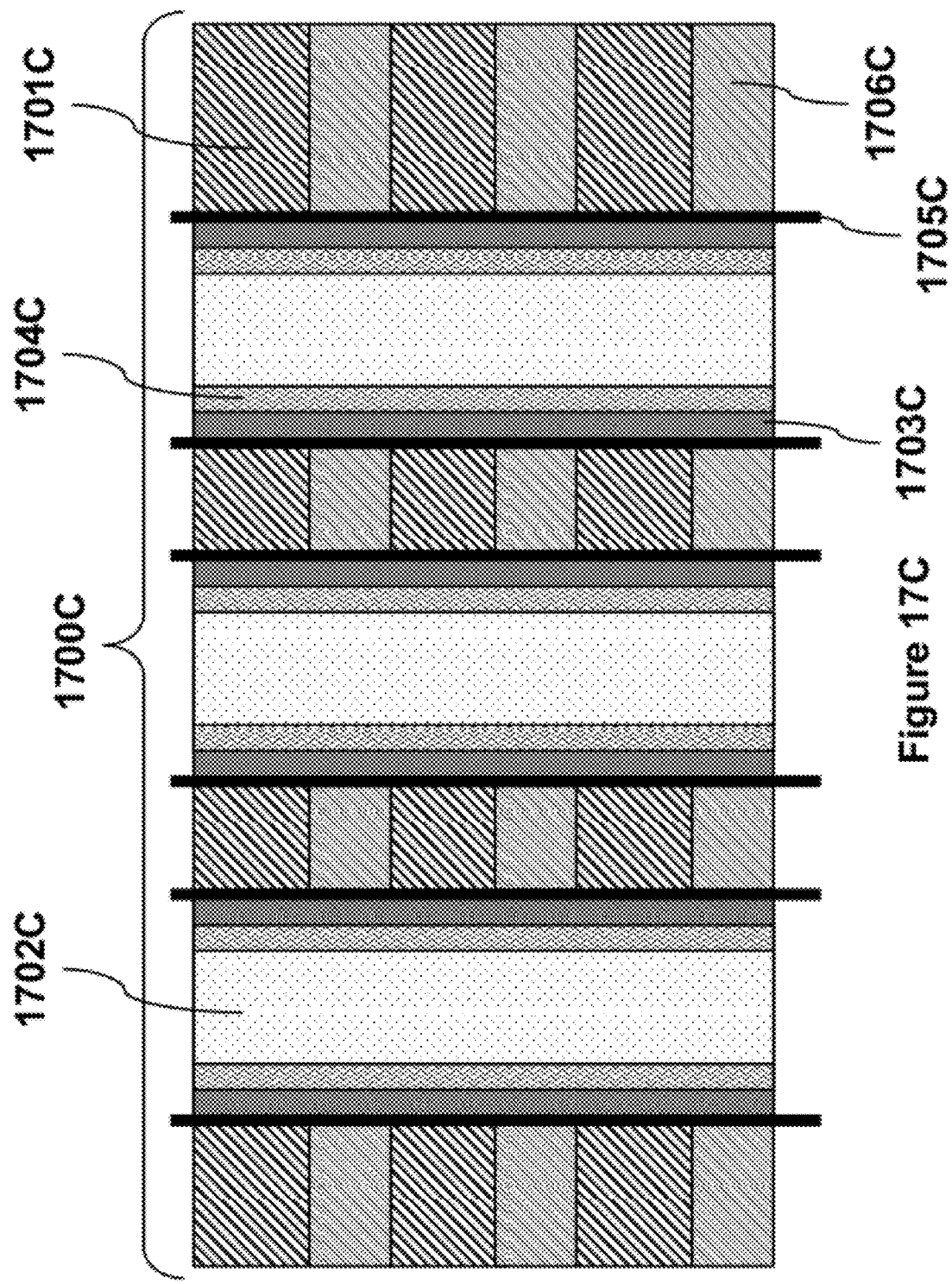

FIG. 17C provides a side view of an electrode array structure 1700C, for example for an electrochemical cell, having plate electrodes 1701C, rod electrodes 1702C, first electrolyte 1703C, second electrolyte 1704C, membrane 1705C and space 1706C. In an embodiment, for example, space 1706C is filled with liquid to control the temperature of the cell or to remove the unwanted products from the cell, for example, via membrane 1705C. In an embodiment, for example, space 1706C is filled with electrolyte or with porous PE or porous PP and electrolyte.

Figure 17D:
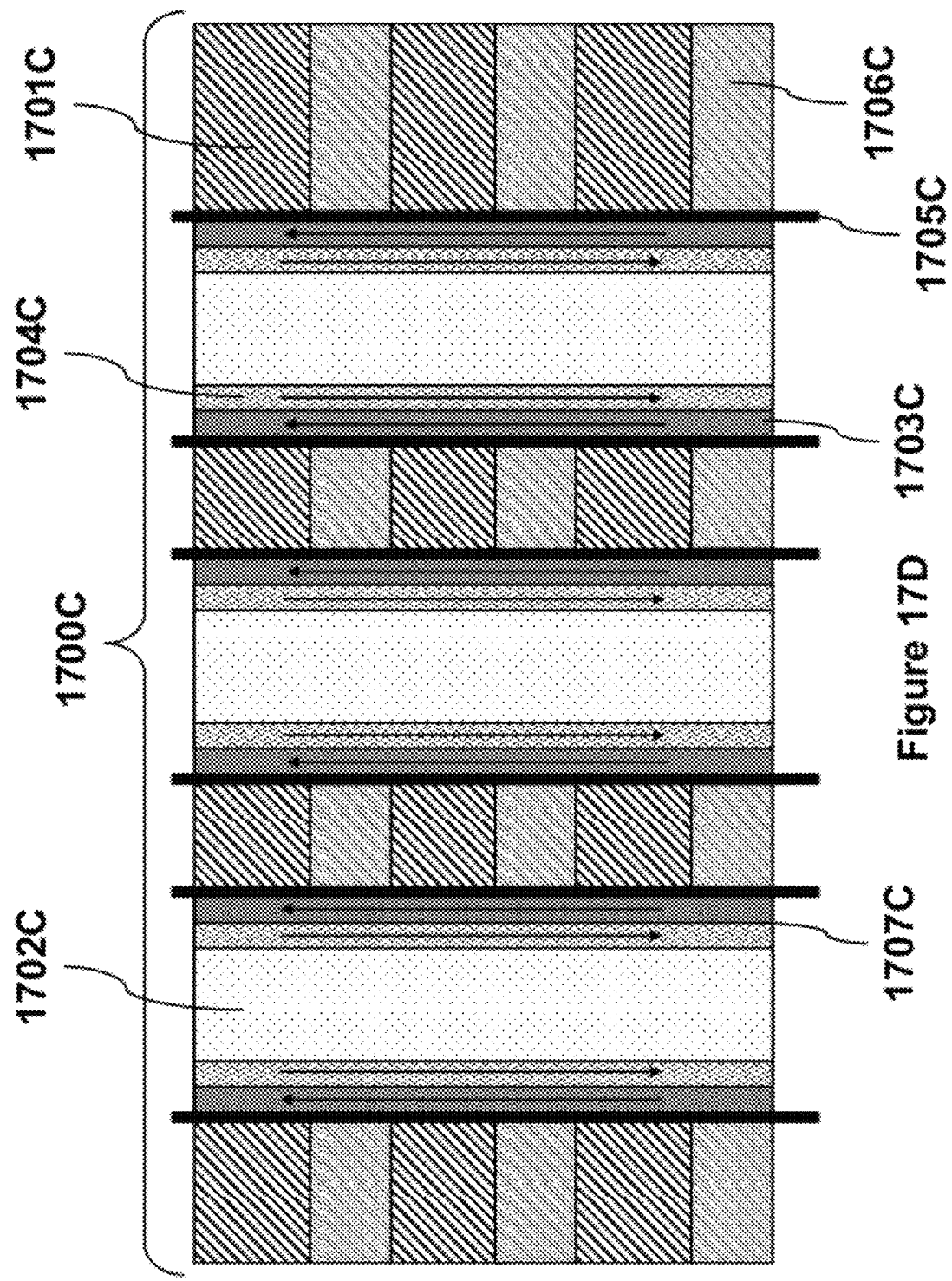
Figure 17E:
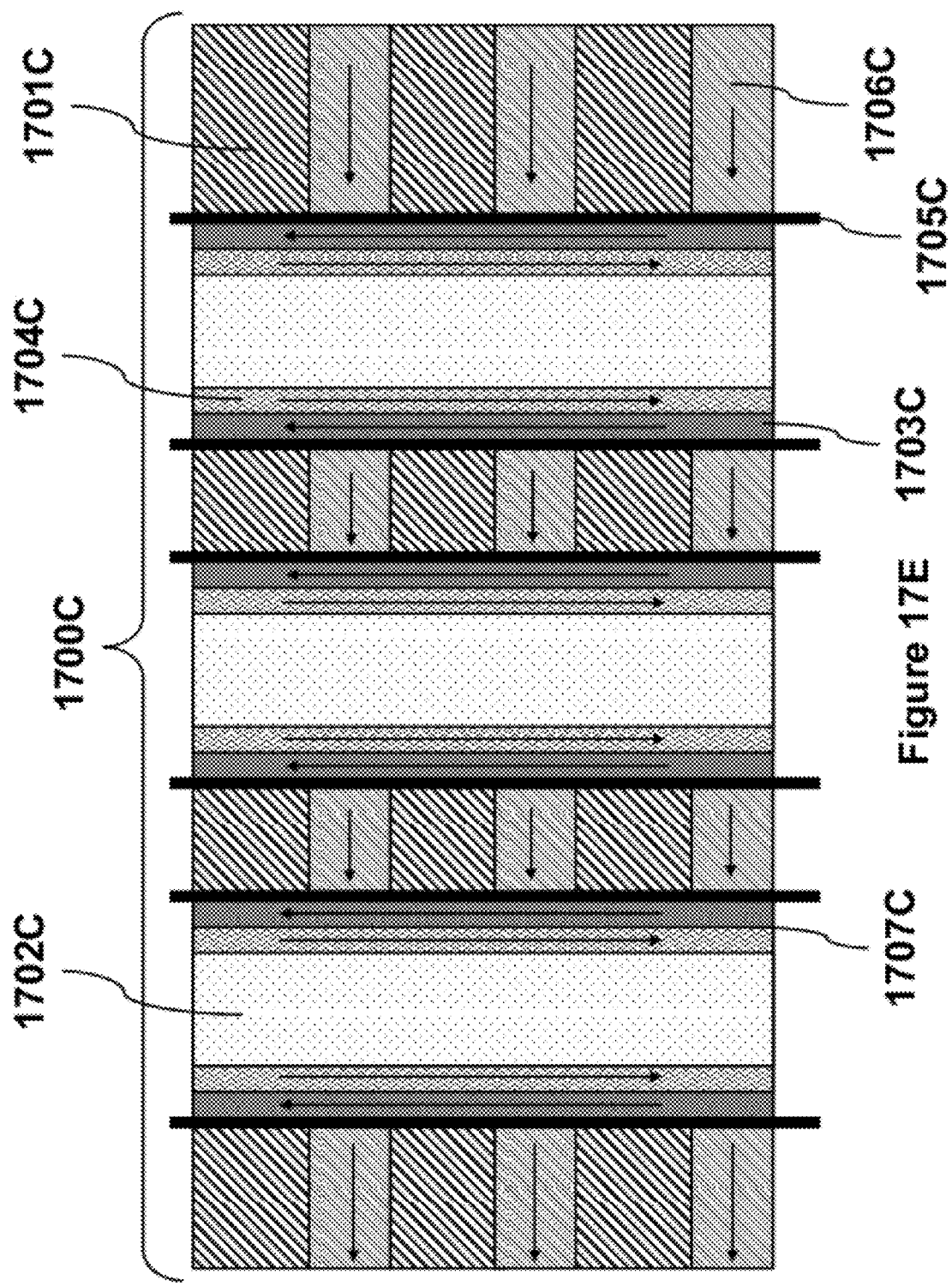

FIGS. 17D and 17E provide a side view of the composite rod electrode structure 1700C used in a flowing electrolyte configuration, for example, having a flowing first electrolyte 1703C and a flowing second electrolyte 1704C. In FIGS. 17D and 17E, the arrows indicate the direction of flow of electrolyte. As shown in FIG. 17D, for example, the system may have a flowing first electrolyte 1703C and a flowing second electrolyte 1704C. As shown in FIG. 17D, for example, the system may have a flowing first electrolyte 1703C, a flowing second electrolyte 1704C and a flowing electrolyte in space 1706C. To prevent mixing of first electrolyte 1703C and second electrolyte 1704C, a barrier 1707C is optionally provided, for example comprising a thin tube of inert material.

Figure 18A:
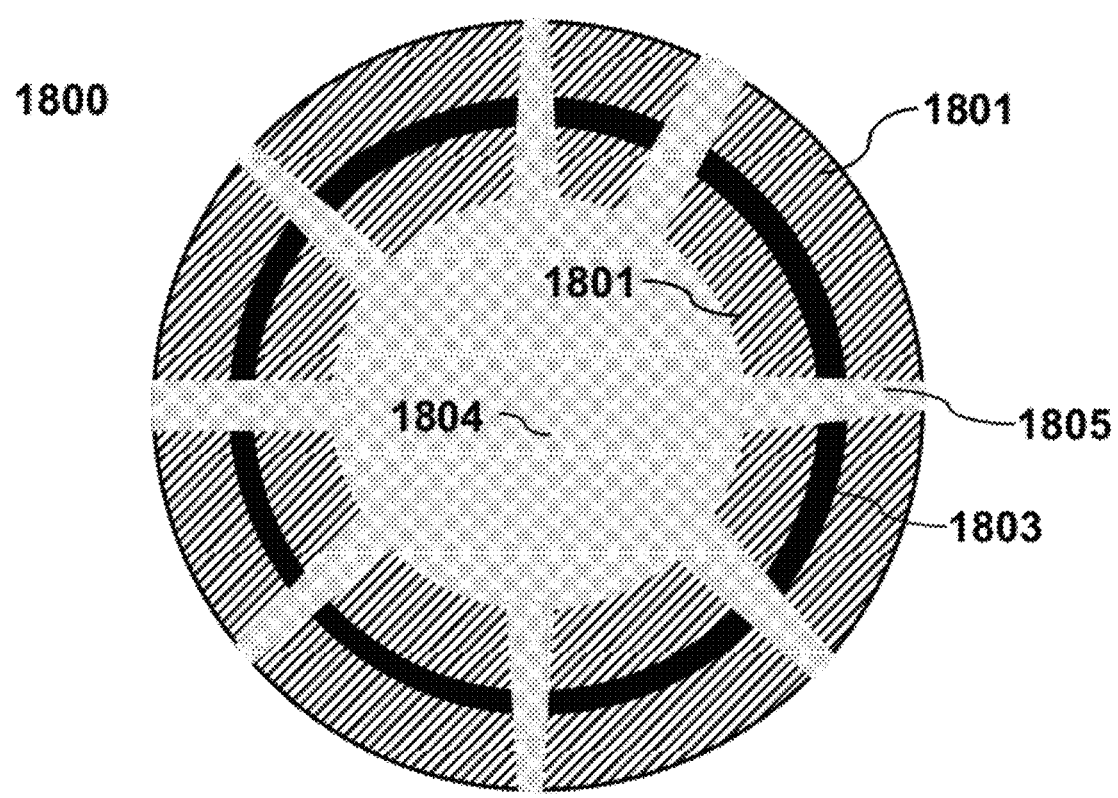
FIGS. 18A and 18B provide views of a composite rod electrode structure comprising a porous rod.
Figure 18B:
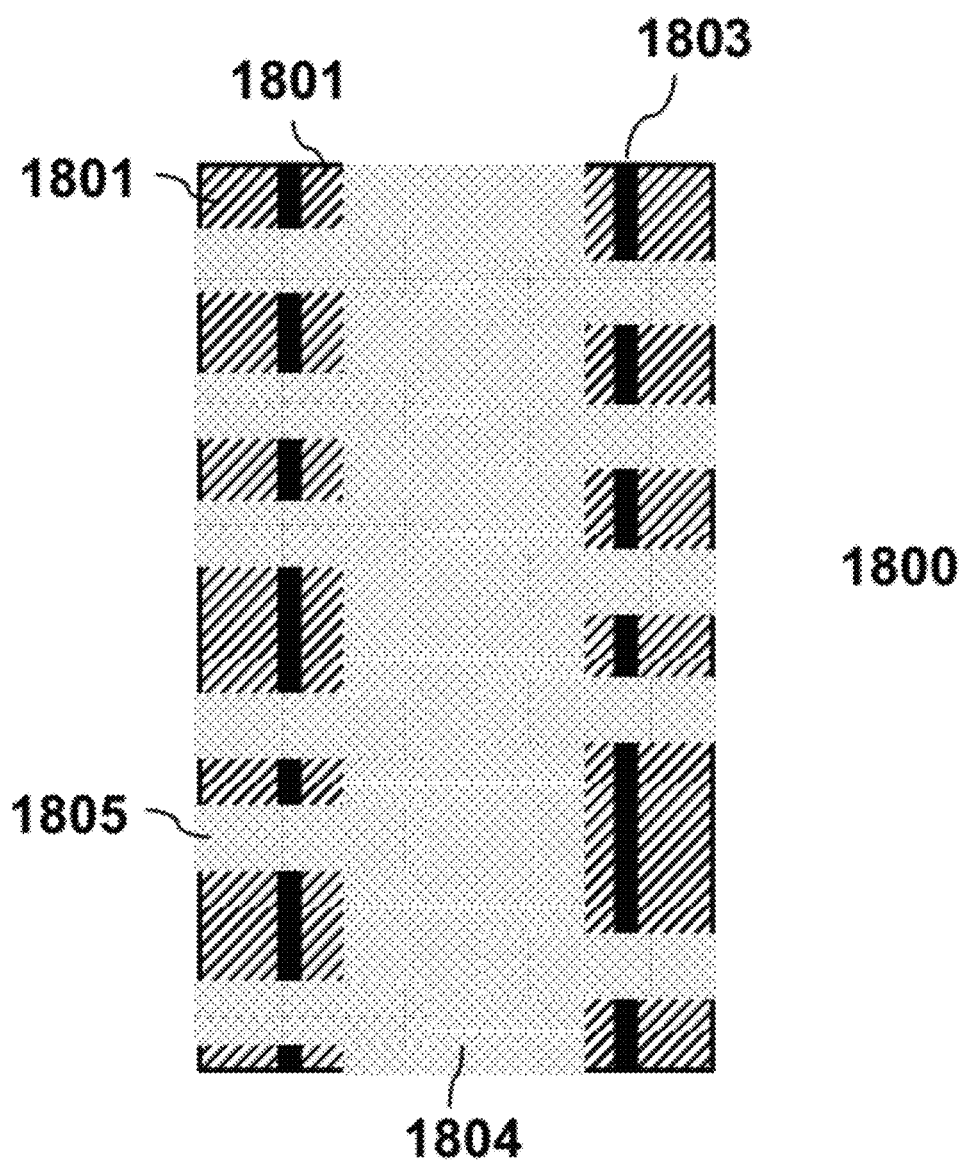

FIGS. 18A and 18B provide views of a composite rod electrode comprising a porous rod. FIG. 18A provides an end view of the composite rod electrode structure 1800 having an anode or cathode 1801, current collector 1803, an electrolyte 1804, and pores 1805. FIG. 18B provides a cross sectional view of the composite rod electrode 1800 also having an anode or cathode 1801, current collector 1803, an electrolyte 1804, and pores 1805. In an embodiment, electrolyte 1804 comprises a fluid. In an embodiment, electrolyte 1804 comprises a solid. In an embodiment, electrolyte 1804 comprises a fluid and a separator. In an embodiment, pores 1805 provide for fluid communication of the electrolyte 1804 inside the composite rod electrode structure 1800 to components outside of the rod electrode structure 1800, for example plate electrodes and the space between the plate electrodes.

Figure 19:
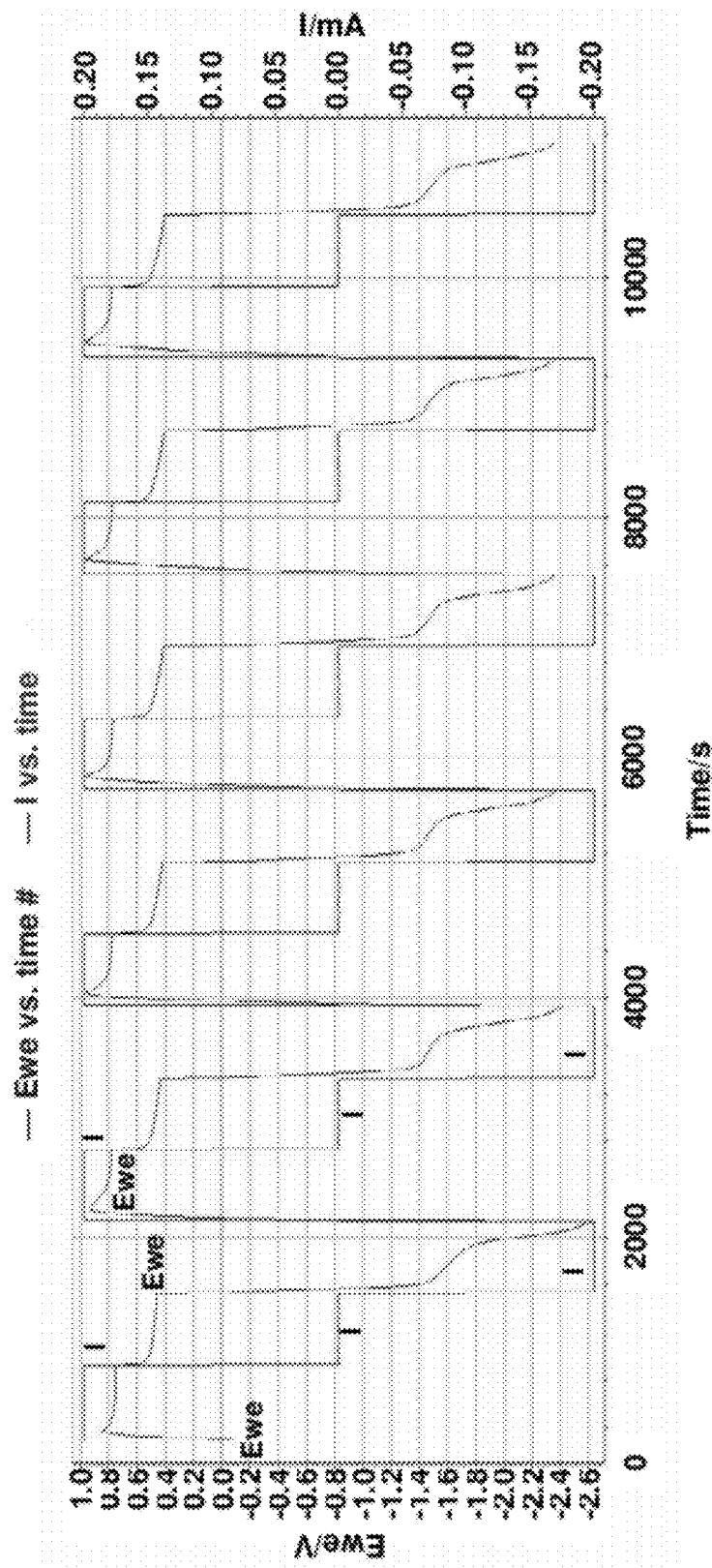
FIG. 19 provides experimental data of charge and discharge cycles of an electrochemical cell comprising a three-dimensional electrode array.

FIG. 19 provides data showing a charge-discharge curve for cycling an electrochemical cell embodiment comprising a three-dimensional electrode array including Ewe versus time and Current (I) versus time. For this embodiment, the cell comprises two parallel plates comprised of $LiMn_2O_4$, each of dimensions 10 mm×10 mm×0.2 mm with an Al current collector of 0.01 mm thick in the middle of the $LiMn_2O_4$ plate electrode. The cell also comprises four graphite rod electrodes of 2.5 mm diameter with a 0.1 mm diameter copper electron collector core. The voltage, Ewe, shown in FIG. 18, is with respect to the standard hydrogen electrode (SHE).

Figure 20:
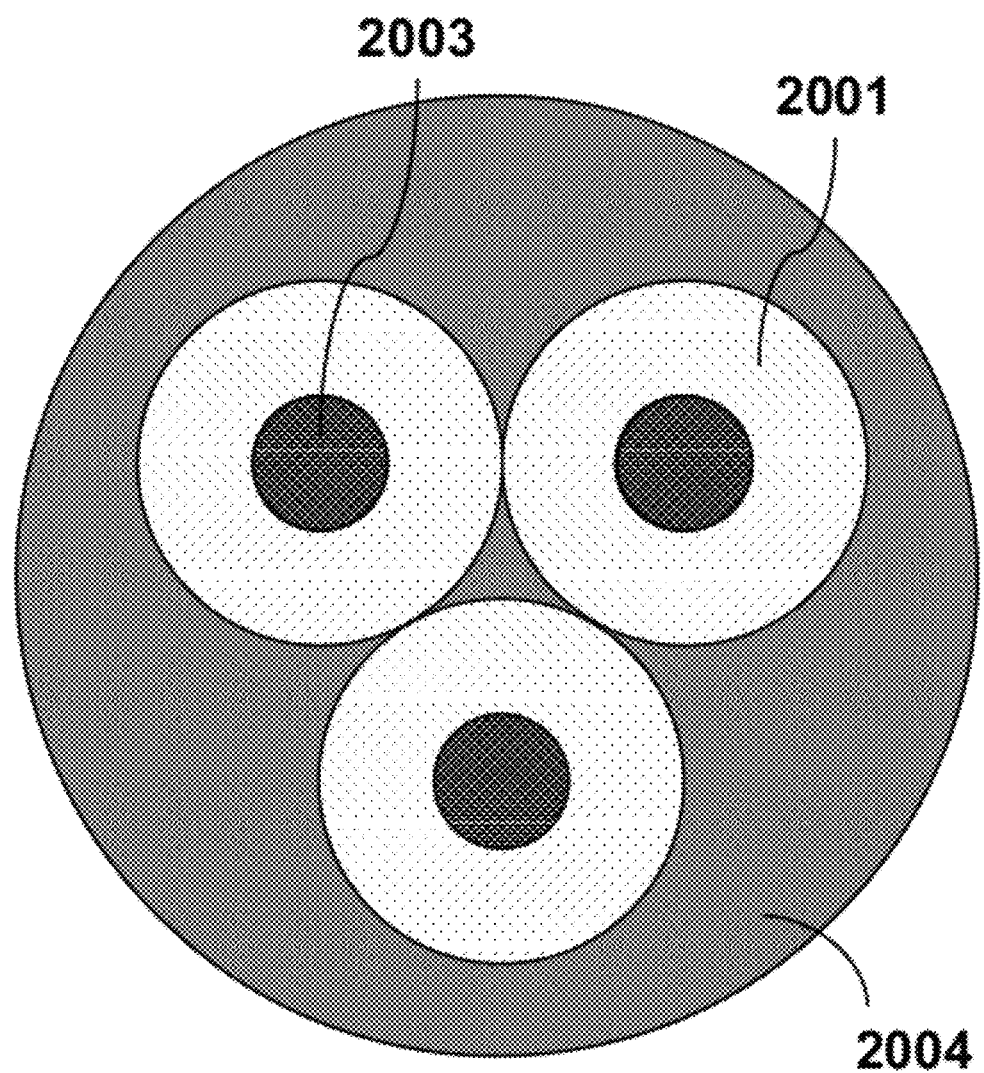
FIG. 20 provides a view of a single aperture of a plate electrode showing multiple rod electrodes.

FIG. 20 provides a view of a single aperture of a plate electrode showing multiple rod electrodes 2001 positioned within the single plate electrode. Here, rod electrodes include an electron collector 2003 and the aperture is filled with a fluid 2004. Optionally, fluid 2004 is an electrolyte. In an embodiment, fluid 2004 is a flowing fluid that optionally includes active nanoparticles and/or microparticles, for example, nanoparticles and/or microparticles which participate in oxidation-reduction reactions.

Figure 21:
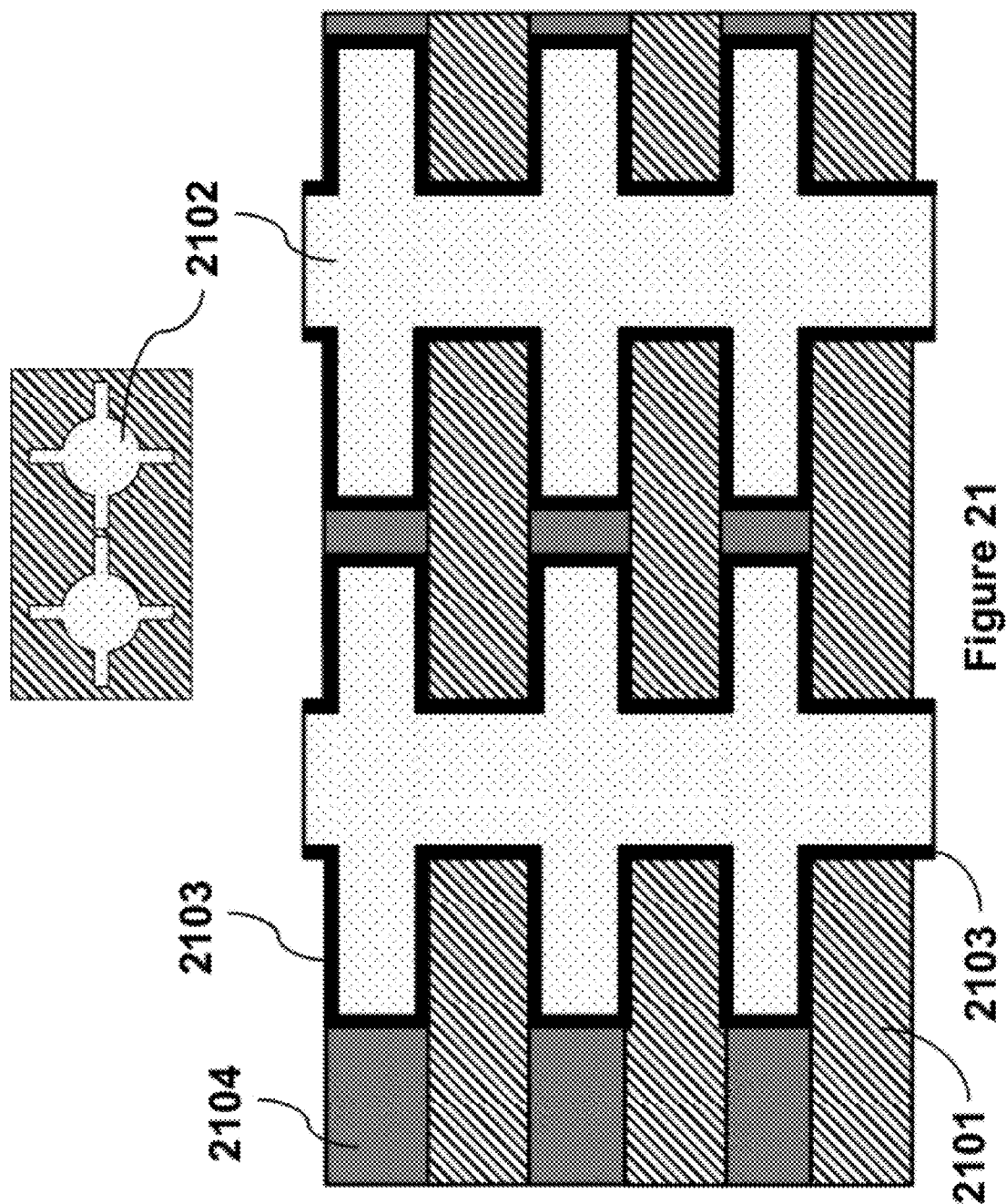
FIG. 21 provides a schematic cross-sectional side view of a three-dimensional electrode array comprising branched rod electrodes. The inset shows a top view.

FIG. 21 provides a schematic cross-sectional side view of a three-dimensional electrode array comprising branched rod electrodes. The inset shows a top view. Here, the electrode array comprises plate electrodes 2101, rod electrodes 2102 and electrolyte 2103. A space is provided between plate electrodes 2101 and is optionally filled with a solid, fluid or gel electrolyte 2104. For clarity, the inset view does not show electrolyte 2104. Rod electrodes 2102 branch along lateral dimensions from an aperture in plate electrodes 2101. Optionally, electrolyte 2103, which separates rod electrodes 2102 from plate electrodes 2101, is applied as a coating on the rod electrode 2102.

FIG. 22 provides a schematic cross-sectional side view of a three-dimensional electrode array comprising a bridge type structure linking the rod electrodes. The inset shows a top view. Here, the electrode array comprises plate electrodes 2201, rod electrodes 2202 and electrolyte 2203. A space (not explicitly shown in the cross-sectional view) is provided between plate electrodes 2201 and is optionally filled with a solid, fluid or gel electrolyte 2204. Here, the inset view shows electrolyte 2204 surrounding rod electrode 2202 and electrolyte 2203. Rod electrodes 2202 form bridges to neighboring rod electrodes 2203 along lateral dimensions from an aperture in plate electrodes 2101. Optionally, electrolyte 2203, which separates rod electrodes 2202 from plate electrodes 2201, is applied as a coating on the rod electrode 2202.

As will be understood by one of skill in the art, the figures provided are illustrative of embodiments of the invention. Unless otherwise indicated, the dimensions shown in the figures are not intended to be to scale. Orientations of embodiments shown include both horizontal and vertical orientations; that is, where an embodiment is shown with a single orientation, another orientation, rotated 90° is also disclosed.

Note that in all designs, some of the holes are optionally used only for structural integrity, by using metal or ceramic or glass or polymer rods, for example, steel rods. These holes optionally have larger diameter than the electrode rod holes. Some of the space bottom the parallel plates are optionally also used only for structural integrity, by using metal or ceramic plates. For example by using steel plates or glass plates.

An advantage of the designs described herein is that the maintenance can be done easier and faster, for example, when the cell is composed of many individual rods and plates. Another advantage is that, as the ratios of volume/foot-print surface area and active surface area/foot print surface area can be increase significantly over prior art designs, there is much less of the problem of electrolyte evaporation (which is a major problem, for example, in metal air batteries and in fuel cells) or ambient air-moisture contamination.

Optionally, current collectors are included in a three-dimensional cell. Not only are current collectors useful for transporting electrons in charge-discharge, but also current collectors optionally provide mechanical-structural stability to the cell. Optionally, some current collectors are used to help with the temperature control of the cell and thus can hinder overheating of the battery and can increase the performance and life.

Optionally, the current collector/temperature control element is solid or is liquid such as a molten metal or molten salt flowing inside a tube-pipe or it can be a metallic tube, for example Al or Cu or Ni to transport electrons, where inside the tube there is a fluid such as air or a liquid coolant such as oil or water or heat transfer fluid that can flow from one end to the other end, and be useful for controlling the temperature of the cell, for example for mid-large scale applications such as electric cars, renewable energy storage and grid storage.

For embodiments comprising a fluid electrolyte, a separator is optionally included between the rods and the walls of the plates to avoid their contact. For example, useful materials include PE or PP or a combination from Celgard co. The thickness is, for example, between 0.010 mm to 0.5 mm, or about 0.02 mm.

Note that graphite alone or combined with metals such as Al, are optionally useful as current collectors. Optionally, an electrolyte comprises an imide salt.

An important advantage of the current design is longer cycle life. As the cell is much more homogeneous comparing to the conventional design, the materials deformations and the temperature distribution are more homogeneous, resulting in lower stresses, lower cracks, less fatigue, and thus higher cycle life of the cell.

The distance between the parallel plates is optionally filled with a material solely for temperature control such as heat pipe or heat pin that can use thermal conductivity and phase transition. This is especially useful in mid-large scales, such as in electric cars and grid storage. As an example, such a material is a screen made of metals, such as thin steel or copper (e.g., a few micrometers thick for small cells to a few centimeters thick for bigger cells). There is no contact between the screen and the rods.

Optionally, the space between plates is optionally filled with oil or water or a heat transfer fluid to maintain the temperature of the cell at a specified temperature by using a thermostat. This liquid is optionally separated from the electrolyte between the rods and the hole-walls by using inert material (as an example PTFE or Silicone) gaskets with the shape of a long cylinder (as long as the rods) with outer diameter equals that of the holes, and thickness of, as an example about 1 mm, which is completely solid between the plates and is more than 80% open at the vicinity of the walls of the holes. Further, for each hole, two diaphragms, donut shape: each 0.05 wide and 0.05 thick, are optionally placed at the top and bottom of the holes to completely prevent the mixture of the cooling liquid with the electrolyte.

Optionally, a gas or liquid coolant is used for controlling an electrode array temperature. Useful gas coolants include air, hydrogen, inert gases such as nitrogen, helium or carbon dioxide or Sulfur hexafluoride or steam. Useful liquid coolants include oil, mineral oil, castor oil, water, deionized water, heavy water, liquefied neon, molten salts, NaF—NaBF$_4$, FLiBe, FLiNaK, liquid lead, liquid lead-bismuth alloy, silicone oils, fluorocarbon oils, Freons, Halomethanes, ammonia, sulfur dioxide, carbon dioxide, Polyalkylene glycol, or can be a solution of an organic chemical in water, such as betaine, ethylene glycol, diethylene glycol, propylene glycol. Useful coolants further include liquids such as liquid nitrogen, liquid helium, liquid hydrogen. The coolant is optionally a solid such as dry ice or water ice. Useful coolants also include nanofluids or semisolids comsisting of a carrier liquid such as water dispersed with tiny (10 nm to a few mm size) particles made of CuO, Aluminia, titanium dioxide, carbon nanotubes, carbon powders, silica, or metals such as copper or silver.

Optionally, each of the electrodes or electrolytes or dielectric materials are a heterogeneous material such as a layered composite, such as a first material with a second coating at least on one side of it.

The invention may be further understood by the following non-limiting examples.

EXAMPLE 1: Industrial Applications

Worldwide, there are ever-growing demands for electricity. At the same time, there is an increasing push to harness reusable sources of energy to help meet these increasing electricity demands and offset and/or replace traditional carbon-based generators which continue to deplete natural resources around the world.

Many solutions have been developed to collect and take advantage of reusable sources of energy, such as solar cells, solar mirror arrays, and wind turbines. Solar cells produce direct current energy from sunlight using semiconductor technology. Solar mirror arrays focus sunlight on a receiver pipe containing a heat transfer fluid which absorbs the sun's radiant heat energy. This heated transfer fluid is then pumped to a turbine which heats water to produce steam, thereby driving the turbine and generating electricity. Wind turbines use one or more airfoils to transfer wind energy into rotational energy which spins a rotor coupled to an electric generator, thereby producing electricity when the wind is blowing. All three solutions produce electricity when their associated reusable power source (sun or wind) is available, and many communities have benefited from these clean and reusable forms of power.

When the sun or wind is not available, such solutions are not producing any power then nonreusable energy solutions are often turned, some form of energy storage is needed to store excess energy from the reusable power sources during power generation times to support energy demands when the reusable power source is unavailable or unable to meet peak demands for energy. So far people have tried molten salt thermal storage as a candidate to store heat as a form of energy; however the technology is very costly.

This example describes an electrochemical energy storage apparatus. The electrochemical energy storage apparatus has at least a positive terminal and a negative terminal which are electrically insulated from each other. It also has a non-electro-conductive material, which can be solid or fluid or gas, between the two terminals. This medium is a conductor for some of the ions of materials used for the terminals. Electro conductive materials such as metals can be used on the outer surface of the terminals to facilitate the passage of the electrons. Related methods of constructing and controlling an electro chemical energy storage system are also disclosed. An electro chemical energy power system utilizing an electrochemical energy storage apparatus is further disclosed, as is a charge exchanger for the electrochemical energy storage system.

The medium between the terminals can be selected from the group consisting of a salt, a salt mixture, a eutectic salt mixture, lithium nitrate, potassium nitrate, sodium nitrate, sodium nitrite, calcium nitrate, lithium carbonate, potassium carbonate, sodium carbonate, rubidium carbonate, magnesium carbonate, lithium hydroxide, lithium fluoride, beryllium fluoride, potassium fluoride, sodium fluoride, calcium sulfate, barium sulfate, lithium sulfate, lithium chloride, potassium chloride, sodium chloride, iron chloride, tin chloride, and zinc chloride, sulphuric acid, water and any combination of these.

The terminals can have any shape and geometry, such as plates or tubes or cylinders or parts of them.

Optionally, the whole storage system is contained in a non-conductive container.

Optionally, non-conductive spacers can be used between the terminals especially when the medium is a fluid or gas to prevent short circuit through physical contact.

Optionally, the container comprise a conductive material or a non-conductive material such as a material selected from the group consisting of plastics, ceramics, firebrick, refractory material, castable refractories, refractory brick, mixtures of alumina ($Al_2O_3$), silica ($SiO_2$), magnesia (MgO), zirconia ($ZrO_2$), chromium oxide ($Cr_2O_3$), iron oxide ($Fe_2O_3$), calcium oxide (CaO), silicon carbide (SiC), carbon (C); metallic materials, plain carbon steels; alloy steels, manganese, silicon, silicon-manganese, nickel, nickel chromium, molybdenum, nickel-molybdenum, chromium, chromium-molybdenum, chromium molybdenum-cobalt, silicon-molybdenum, manganese-silicon-molybdenum, nickel-chromium molybdenum, silicon-chromium-molybdenum, manganese-chromium-molybdenum, manganese silicon-chromium-molybdenum, vanadium, chromium-vanadium, silicon-chromium-vanadium, manganese-silicon-chromium-vanadium, chromium-vanadium-molybdenum, manganese-silicon chromium-vanadium-molybdenum, chromium-tungsten, chromium-tungsten-molybdenum, chromium-tungsten-vanadium, chromium-vanadium-tungsten-molybdenum, chromium vanadium-tungsten-cobalt, chromium-vanadium-tungsten-molybdenum-cobalt; stainless steels, austenitic, ferritic, martensitic, duplex, precipitation-hardening, superaustenitic, superferritic; nickel alloys, nickel-chromium-iron, nickel-chromium-iron-aluminum, nickel-chromium-iron aluminum-titanium, nickel-chromium-iron-aluminum-titanium-niobium, nickel-chromium-iron cobalt-molybdenum, nickel-chromium-iron-niobium, nickel-chromium-iron-molybdenum niobium, nickel-chromium-iron-molybdenum-niobium-titanium-aluminum, nickel-chromium molybdenum-iron-tungsten, nickel-chromium-iron-molybdenum-copper-titanium, nickel chromium-iron-molybdenum-titanium, nickel-iron-cobalt-aluminum-titanium-niobium, nickel copper, nickel-copper-aluminum-titanium, nickel-molybdenum-chromium-iron, nickel chromium-molybdenum-copper, nickel-chromium-molybdenum-iron-tungsten-copper, and nickel-chromium-molybdenum.

The base for the storage system comprises a material selected from the group consisting of earth, firebrick, refractory material, concrete, castable refractories, refractory concrete, refractory cement, insulating refractories, gunning mixes, ramming mixes, refractory plastics, refractory brick, mixtures of alumina ($Al_2O_3$), silica ($SiO_2$), magnesia (MgO), zirconia ($ZrO_2$), chromium oxide ($Cr_2O_3$), iron oxide ($Fe_2O_3$), calcium oxide (CaO), silicon carbide (SiC), carbon (C); metallic materials, carbon steels; alloy steels, manganese, silicon, silicon-manganese, nickel, nickel-chromium, molybdenum, nickel-molybdenum, chromium, chromium-molybdenum, chromium-molybdenum-cobalt, silicon-molybdenum, manganese-silicon-molybdenum, nickel chromium-molybdenum, silicon-chromium-molybdenum, manganese-chromium-molybdenum, manganese-silicon-chromium-molybdenum, vanadium, chromium-vanadium, silicon-chromium vanadium, manganese-silicon-chromium-vanadium, chromium-vanadium-molybdenum, manganese-silicon-chromium-vanadium-molybdenum, chromium-tungsten, chromium-tungsten molybdenum, chromium-tungsten-vanadium, chromium-vanadium-tungsten-molybdenum, chromium-vanadium-tungsten-cobalt, chromium-vanadium-tungsten-molybdenum-cobalt; stainless steels, austenitic, ferritic, martensitic, duplex, precipitation-hardening, superaustenitic, superferritic; nickel alloys, nickel-chromium-iron, nickel-chromium-iron-aluminum, nickel chromium-iron-aluminum-titanium, nickel-chromium-iron-aluminum-titanium-niobium, nickel chromium-iron-cobalt-molybdenum, nickel-chromium-iron-niobium, nickel-chromium-iron molybdenum-niobium, nickel-chromium-iron-molybdenum-niobium-titanium-aluminum, nickel chromium-molybdenum-iron-tungsten, nickel-chromium-iron-molybdenum-copper-titanium, nickel-chromium-iron-molybdenum-titanium, nickel-iron-cobalt-aluminum-titanium-niobium, nickel-copper, nickel-copper-aluminum-titanium, nickel-molybdenum-chromium-iron, nickel chromium-molybdenum-copper, nickel-chromium-molybdenum-iron-tungsten-copper, and nickel-chromium-molybdenum.

In embodiments, an energy storage system can be positioned such that the terminals face vertical, such that the terminals face the ground, such that the terminals face horizontal, such that the terminals do not face the ground, for example, perpendicular to the ground.

Optionally, a group of terminals can be used in parallel or series configurations.

Optionally, the terminals comprise material selected from the group consisting of iron oxides; metals; lithium phosphates; sodium phosphates; plain carbon steels; graphite, lead metal, lead dioxide, alloy steels, manganese, silicon, silicon-manganese, nickel, nickel-chromium, molybdenum, nickel-molybdenum, chromium, chromium-molybdenum, chromium-molybdenum-cobalt, silicon-molybdenum, manganese-silicon-molybdenum, nickel-chromium-molybdenum, silicon-chromium-molybdenum, manganese-chromium-molybdenum, manganese-silicon-chromium molybdenum, vanadium, chromium-vanadium, silicon-chromium-vanadium, manganese-silicon chromium-vanadium, chromium-vanadium-molybdenum, manganese-silicon-chromium vanadium-molybdenum, chromium-tungsten, chromium-tungsten-molybdenum, chromium tungsten-vanadium, chromium-vanadium-tungsten-molybdenum, chromium-vanadium-tungsten cobalt, chromium-vanadium-tungsten-molybdenum-cobalt; stainless steels, austenitic, ferritic, martensitic, duplex, precipitation-hardening, superaustenitic, superferritic; nickel alloys, nickel chromium-iron, nickel-chromium-iron-aluminum, nickel-chromium-iron-aluminum-titanium, nickel-chromium-iron-aluminum-titanium-niobium, nickel-chromium-iron-cobalt-molybdenum, nickel-chromium-iron-niobium, nickel chromium-iron-molybdenum-niobium, nickel-chromium iron-molybdenum-niobium-titanium-aluminum, nickel chromium-molybdenum-iron-tungsten, nickel-chromium-iron-molybdenum-copper-titanium, nickel-chromium-iron molybdenum titanium, nickel-iron-cobalt-aluminum-titanium-niobium, nickel-copper, nickel-copper aluminum-titanium, nickel-molybdenum-chromium-iron, nickel-chromium-molybdenum-copper, nickel-chromium-molybdenum-iron-tungsten-copper, and nickel-chromium-molybdenum.

As an example the system used for a 400 MWh storage can be made of a plates of 35 m by 35 m with the thickness of a few centimeters as the terminals and medium of a few centimeters thickness between them. The plates can be parallel to each other and they can be either standing vertically in or above the ground or they can be parallel to the ground in or above the ground.

The materials used as an example can be an oxide such as lithium ion phosphate, and graphite as the plates with a medium of lithium salts, such as $LiPF_6$, $LiBF_4$, or $LiClO_4$, in an organic solvent, such as ether. Depending on the materials used, different operating temperatures are contemplated including room temperature.

Another example can be the same geometry as above but with the materials of lead metal (Pb) and lead (IV) dioxide ($PbO_2$) in a medium of about 33.5% v/v (6 Molar) sulphuric acid ($H_2SO_4$).

The electricity source from the energy source is connected to the two terminals. The electric energy makes one of the terminals to get reduced and the other one to get oxidized. This way the ions from one terminal leave the terminal and go the medium. The medium transfers the ions to the opposite terminal. This way the chemical energy is stored in the system. Then the electricity source is opened from the storage system.

When it is desired to use the stored energy, the two plates are connected to each other by a conductive material, with the user application between the two ends of the conductive material.

The chemistry used in the system can be any known chemistry of batteries such as Lead-Acid battery, NaS battery, Metal-Air battery, Li-ion battery, etc., however the electrode geometry is different. Optionally, it is in larger scales and it can be honey-comb geometry or any other porous geometry. Thin honey comb structures are optionally used, to minimum stresses due to shape changes in charge/discharge. Optionally, a sponge type matrix filled with the electrode material can be utilized. The thickness of the plates or the diameter of the cables/rods/wires can optionally be millimeters or centimeters. The width and length of the plates and the length of the cables/rods/wires can optionally be centimeters or meters. The plates and cables/rods/wires can be connected in any combination of parallel or series.

The system can be buried under the ground or can be put in a room to stay away from the environmental hazards including temperature changes. All the solid parts can be controlled at the boundaries such as by pulling the cables/rods/wires to minimize the risk of electrical shorts in the system.

EXAMPLE 2: Electrochemical Cells

Many scientists have been working on the chemistry of batteries. This example describes a new configuration for the electrodes that can be used for any chemistry, including anode, cathode and electrolyte, which can result in higher power/energy density batteries, faster batteries, lighter batteries, cheaper batteries, and more durable batteries.

In designing the most historically successful industrial batteries, the lead-acid battery configuration played a key role. Plante's and Faure's changes of the configurations resulted in the commercialization of lead-acid battery which has been the dominant battery for more than a century.

The new configuration described here can be used for primary and secondary batteries. It can transform primary batteries to secondary batteries and it can provide better cyclability and safety for secondary batteries. As an example, the new configuration can be used for primary and secondary lithium batteries. Lithium metal anode in Lithium based batteries has energy density an order of magnitude higher than currently used carbon anode. Though, due to the formation of dendrites on lithium anode during the recharging process, the cell may short circuit and explode. For this reason in rechargeable batteries, currently, carbon anode is the only option. In addition to lower energy density comparing to lithium metal, carbon anodes needs special electrolytes, which adds to the cost. The new configuration described herein solves the shorting problem in Li-metal anodes. This will result in much cheaper rechargeable batteries that can last longer than available lithium based batteries.

Currently, the active electrochemical materials compose only one third of the weight of a battery pack. The problem is that the prior art battery configurations limit the size of the battery. At the macro-scale one goal of the present systems is to remove the constraints on the size of the battery pack by changing the configuration. This makes the batteries more efficient, as there is less need of the supporting materials that do not play any electrochemical roles. It results in getting closer to ideal battery systems for electric vehicles. In addition, it results in lighter and cheaper batteries that can be used for large-scale energy storage systems needed for grid electricity storage and also renewable energy sources such as solar farms and wind farms.

The new configuration/geometry described herein can improve all battery chemistries including those with the Li-metal anode. In this novel 3-dimensional configuration, perforated anode (or cathode) plates are placed parallel to each other with electrolyte between them. Cathode (or anode) rods go through the plate holes to form a mesh. The radius of each rod is less than that of the holes to allow for the electrolyte passage between the rods and the holes. When using lithium metal plates, the wall of the holes can be covered with an inert material so that dendrites do not happen between the opposite electrodes but happen between the lithium plates.

Each plate can have different geometries such as rectangular plates, cylindrical plates or any other geometry. The thickness of each of the plates can be from 20 nm to 5 cm, as an example around 100 micrometers for lithium batteries and 2 mm for lead-acid batteries. The holes of the plates can have different geometries such as cylindrical or rectangular or any other geometry. The radius of the holes can be from 10 nm to 2 cm, as an example 50 micrometers for lithium batteries and 500 micrometers for lead-acid batteries. The rods can have different geometries similar to the holes with the radius smaller than the holes. The surface fraction of the holes is arbitrary. The distance between the holes can be a few nanometers to a few millimeters, as an example can be a few micrometers in lithium batteries and a few hundred micrometers in lead acid batteries. The plates can be from 20 nm to 20 meters long/wide, as an example 10 mm for lithium batteries and 10 cm for lead-acid batteries. The distance between any two plates can be from 10 nm to 5 cm, as an example 10 micrometers, as an example 1 micrometer for lithium batteries and 1 mm for lead acid batteries. The inert material, as shown in the picture, covers the walls of the holes. It can be made of any material that doesn't have any chemical or electrical reaction with the electrodes or electrolyte, such as rubber, plastic, or ceramics. Its thickness can be from a few nanometers to a few millimeters.

EXAMPLE 3: Lithium Batteries

This example focuses on lithium batteries. A great degree of attention has been devoted to rechargeable Lithium batteries in the past few years, but still there are many unknowns that should be scrutinized. Here, a new configuration of the electrodes is described. As an example a Li-metal anode is considered. Lithium metal used as an anode active material has a very high theoretical capacity of 3860 Ah/kg, which is the highest among metallic anode materials. In addition, the standard electrode potential of lithium is high (−3.045V vs SHE). This makes lithium metal a very attractive anode material.

Because of safety problems, a safer lithium cell, the lithium ion cell, was developed and is now commercially available. Currently Li-metal anodes are only used in primary lithium batteries. They can't be used in rechargeable cells due to the lithium dendrites that form on the lithium metal anode in the recharging process. The dendrites make shorts between the opposite electrodes and cause fire and explosion of the cell.

However, the high energy density of lithium metals cells is still very attractive, if the safety problem can be overcome. The conductivity of the nonaqueous electrolyte used in the AA-size lithium metal anode prototype cells is one order of magnitude lower than that of an aqueous system. Thus, if one can solve the safety problem, the rate of charging of the battery will improve a lot.

The new configuration/geometry described herein improves all battery chemistries including those with the Li-metal anode. In this novel 3-dimensional configuration, perforated anode plates are placed parallel to each other with electrolyte between them. The cathode rods go through the plate holes to form a mesh. The radius of each rod is less than that of the holes to allow for the electrolyte passage between the rods and the holes. When using lithium metal plates, the wall of the holes can be covered with an inert material so that dendrites do not happen between the opposite electrodes but happen between the lithium plates. Each plate can have different geometries such as rectangular plates, cylindrical plates or any other geometry. The thickness of each of the plates can be from 20 nm to 5 cm, as an example around 100 micrometers. The holes of the plates can have different geometries such as cylindrical or rectangular or any other geometry. The radius of the holes can be from 10 nm to 2 cm, as an example 50 micrometers. The rods can have different geometries similar to the holes with the radius smaller than the holes. The plates can be from 20 nm to 20 meters long/wide. The distance between any two plates can be from 10 nm to 5 cm, as an example 10 micrometers.

There are many possible choices for the cathode. The most popular are lithium manganese dioxide, lithium cobalt, and $FeS_2$. The suggested configuration/geometry works for any chemistry of batteries including the lithium-air chemistry.

The temperature of the cell also plays an important role on the safety and cyclability of the battery. A novel approach is suggested here. If current collectors are needed the cathode current collector is in the core of the rods; the anode current collector, if needed, can be formed of a grid in the plate. As each current collector runs in the entire cell, by using the current collectors as heat conductive material we can set the cell temperature very cheap and effectively.

EXAMPLE 4: Lead-Acid Batteries

The lead acid cell can be demonstrated using sheet lead plates for the two electrodes. However such a construction produces only around one ampere for roughly postcard sized plates, and for only a few minutes. The plate dimensions are typically about 50×50×1.5 mm. Since the capacity of a lead-acid battery is proportional to the surface area of the electrodes that is exposed to the electrolyte, various schemes are employed to increase the surface area of the electrodes per unit volume or weight. Plates are grooved or perforated to increase their surface area. Faure pasted-plate construction is typical of automotive batteries. Each plate consists of a rectangular lead grid alloyed with antimony or calcium to improve the mechanical characteristics. Each plate consists of a rectangular lead grid alloyed with antimony or calcium to improve the mechanical characteristics.

The holes of the grid are filled with a paste of red lead and 33% dilute sulfuric acid. (Different manufacturers vary the mixture). The paste is pressed into the holes in the grid which are slightly tapered on both sides to better retain the paste. This porous paste allows the acid to react with the lead inside the plate, increasing the surface area many fold. At this stage the positive and negative plates are similar; however expanders and additives vary their internal chemistry to assist in operation.

The present design results in higher energy densities and also less problems with the volume changes of the electrodes. The present design results in more cyclability due to more homogeneous cell design and by putting the positive electrodes parallel to each other and the ground, the active material just transfers from the top layers to the bottom layers but will not be lost. This also adds to the safety of the cell by reducing the likelihood of shorts.

As an example construction consisting of: Positive electrode: 20 plates of 400×400×5 mm as the grid with holes of 5.5 mm diameter with a distance between the holes of 5 mm, wall to wall; Negative electrodes: rods with diameter of 5 mm. The rods can be placed horizontally; optionally a metal such as steel core is used to support the rods mechanically.

EXAMPLE 5: Sample Electrochemical Cell

This example describes the use of a $LiMn_2O_4$ cathode (0.2 mm thick two sided with an aluminum current collector 15 micrometers in between) and a graphite anode (0.2 mm thick two sided with the copper current collector 15 micrometers in between) with 1-molar $LiClO_4$—PC electrolyte in the new design as follows.

This design has the same amount of active materials (cathode and anode) comparable to a conventional two parallel plates of anode and cathode; each 48.5 mm×48.5 mm=2350 $mm^2$ surface area with 0.1 mm thickness, one sided. This gives 235 $mm^3$ active material volume. In summary, the surface area is 2350 $mm^2$ and the volume is 235 $mm^3$.

This sample electrochemical cell is in the form of a cube with 1 $cm^3$ volume. Materials: 40 perforated plates, each 10 mm×10 mm with an array of 10×10 holes evenly distributed, of $LiMn_2O_4$ cathode. Rods of graphite 10 mm length and 0.1 mm thick (inner shell) around copper wire of 0.65 mm diameter (core). The rods also have a 0.05 mm thick, outer shell, separator, for example PP or PE from Celgard, around them.

The holes in the plates are each 0.95 mm diameter. The distance between the holes, wall to wall, is then 0.05 mm.

The active surface area of the $LiMn_2O_4$ cathode here then includes: 2350 $mm^2$ on the surface between the holes (40 two sided perforated plates) AND 2390 $mm^2$ on the walls of the holes. This shows that the new design has 4740 $mm^2$ surface area which is about 2 times more surface area comparing to the conventional to parallel plate design with the same amount of cathode material.

The active surface area of the graphite anode is 2665 $mm^2$ which is still slightly higher than the conventional design.

This shows that half the material is used for the cathode plate, saving money on the most expensive part of the battery, and still reaching the same energy density from the storage system. As this is only an illustrative example, the following parameters and geometry can be optimized: number of the holes, number of the plates, and size of the holes.

Also note that alternatively this example could utilize graphite perforated plates and $LiMn_2O_4$ rods.

EXAMPLE 6: Metal-Air Batteries

Optionally methods are used to accelerate the air flow inside the cell, such as by using pumps. Optionally, the space between the parallel plates is filled by perforated plates, at least on the very top and very bottom layer. For example, this is made of desiccants such as silica gel, activated charcoal, calcium sulfate, calcium chloride, montmorillonite clay, and molecular sieves materials. The material can be covered in a very thin inert coating such as 0.01 mm PTFE. This helps to increase the safety, performance and life of Li batteries, especially in Li-air batteries. The desiccant layers can be removed and replaced after they are saturated with water.

Useful battery chemistries for this design include: alkaline battery, Zn—MnO2 primary, Zn—$MnO_2$ secondary, Zn-Air, Zn—AgO, Ni—Zn, Cd—AgO, Zn—HgO, Cd—HgO Ni—Cd, Ni-Metal Hydride, or Ni—$H_2$ battery.

Optionally, when using different electrolytes, one between each rod and the corresponding wall of the holes of the plates and another between the perforated plates, a thin membrane is useful. For example about tens of micrometers thick, between the two electrolyte systems to separate them, for example when they are both fluid such as liquid, as an example similar to a thin O-ring. Optionally the membrane is used to remove unwanted products from the cell or to add assisting materials to the cell. Examples of removing unwanted products from the cell include some gas phases that happen as the product of the chemistry cell reactions, such as hydrogen gas as for example it happens in Flow batteries or in Lead Acid batteries, especially in flooded lead-acid batteries. The membranes used here optionally are inert materials such as PTFE or PE or other membrane products with desired pore sizes or chemistry or surface behavior.

EXAMPLE 7: Zn-Air Battery

This example describes a Zn-Air battery embodiment. Each rod is: a (Ni-mesh carbon-layers) tube comprising a manganese-based catalyzed carbon layer on a screen of Ni. Electrolyte is KOH, for example, 5M in water. The anode is a zinc metal, for example with a rough surface such as from applying sand paper on it, as the perforated plates. The air cathode contains a hydrophobic Teflon layer (inner part of the tube, for example porous to allow oxygen but stop vapor), a thin Nickel mesh layer acting as a current collector and providing a structural support (middle layer of the tube), and a carbon catalyst layer (outer part of the tube).

The manganese-based catalyzed carbon layer is, for example 0.5 mm thick. The tube inner radius is, for example, 1 mm. There is a 0.02 mm separator between each rod and the associated hole. The separator can be, for example, PVA. The thickness of the Zn plates is, for example, 2 mm. The dimensions of the cell are, for example, 1 cm diameter cylinder with the height of 1 cm.

In this example, there are 4 parallel Zn plates. The distance between the Zn plates is optionally partially filled with electrolyte, here with KOH solution in water and partially with 0.2 mm perforated steel plates, and partially filled with air. A space partially filled with liquid electrolyte and air helps with the life of the battery.

Optionally, zero space is used between Zn plates and have 5 parallel Zn plates, each 2 mm, to resemble one Zn plate of 1 cm thick.

The entire cell is inside a case made of steel and covered by a skin made of PTFE. The case has openings on two parallel sides, say top and bottom, to allow the air flow. A benefit of the new design is that the tubes are open from both ends so the cell can get more air.

EXAMPLE 8: Zn-Air Battery with Assisted Flow

This example describes a Zn-Air battery with assisted flow. Each rod is: a (Ni-mesh carbon-layers) tube comprising a manganese-based catalyzed carbon layer on a screen of Ni. The electrolyte is KOH. The anode is a zinc metal, for example, with a rough surface, such as from applying sand paper on it, as the perforated plates. The air cathode contains a hydrophobic Teflon layer (inner part of the tube, for example, porous to allow oxygen but stop vapor), a thin Nickel mesh layer acting as a current collector and providing a structural support (middle layer of the tube), and a carbon catalyst layer (outer part of the tube).

Here the holes in the plates of metal electrode, for example Zn perforated plates, have the same size for each plate but have a different size for different plates.

The manganese-based catalyzed carbon layer is 0.5 mm thick. The tube inner radius is variable, for example linearly varying from 0.5 mm from one side to 2 mm on the other side. The size of the holes-inner radius can be optimized, using fluid mechanics principles based on the density and temperature and viscosity and other parameters of the flow, for efficient flow of the cathode electrode, here air, through them. Further assisted flow can be applied by using pumps, for example, at the two ends of the cell where there is access to air to facilitate the flow of the cathode materials, here air.

There is a 0.02 mm separator between each rod and the associated hole. The separator can be for example PVA. The thickness of the Zn plates is, for example, 2 mm. The dimensions of the cell are, for example, 1 cm diameter cylinder with the height of 1 cm.

In this example, there are 4 parallel Zn plates. The distance between the Zn plates is optionally partially filled with electrolyte, here with KOH solution in water and partially with 0.2 mm perforated steel plates, and partially filled with air. A space partially filled with liquid electrolyte and air helps with the life of the battery.

Optionally, zero space is used between Zn plates and have 5 parallel Zn plates, each 2 mm, to resemble one Zn plate of 1 cm thick.

The entire cell is inside a case made of steel and covered by a skin made of PTFE. The case has openings on two parallel sides, for example, top and bottom, to allow the air flow.

EXAMPLE 9: Li-Air Battery

This example describes a Li-Air battery. The setup of the cells comprises metallic lithium as the anode, three membrane laminates (two PC layers and one LAGP layer), and a cathode. The membrane is PC(BN)/LAGP/PC(BN) with the thickness of 1.5 mm, where each layer of pC is about 200-300 micrometers thick. The plates are 20 mm×20 mm×0.4 mm. The cathode is 25% C*+75% LAGP on Ni mesh tube. The cathode tube has an inner opening of 1 mm diameter. Its thickness is 0.5 mm. C* is 60% PWA activated carbon+40% Ketjen carbon black.

The air cathode contains a hydrophobic Teflon layer, on the inner size, say 0.01 thick (inner part of the tube is, for example, porous to allow oxygen but stop vapor), a thin Nickel mesh layer acting as a current collector and providing a structural support (middle layer of the tube), and a carbon catalyst layer (outer part of the tube).

The cell comprises 4 parallel Li perforated plates. The distance between the plates is optionally partially filled with liquid nonaquous electrolyte, for example, 1M LiPFe/PC/EC/DMC (1:1:3) and partially with 0.2 mm perforated steel plates, and partially can be filled with dry oxygen.

Optionally, zero space is used between plates and there are 5 parallel plates, each 0.4 mm, to resemble one plate of 1 mm thick.

The entire cell can is inside a case made of steel and covered by a skin made of PTFE. The case has openings on two parallel sides, top and bottom, to allow the air flow.

As a note, the concepts of assisted flow, varying hole-sizes and pumps, as described in the flow assisted Zn-Air battery in the above example, are useful with Li-Air batteries of this example as well.

EXAMPLE 10: Flow Batteries

This example describes flow batteries. Useful electrodes for flow batteries include, but are not limited to: Vanadium, Bromine, Iron, $H_2$-Zinc, Cerium, $B_2$, Chromium, Polysulfide and any combination of these.

Two electrolytes are used, one surrounding the anode and one surrounding the cathode. Useful electrolytes include, but are not limited to, $H_2SO_4$, $VCl_3$—HCl, NaBr—HCl, $NaS_2$, NaBr, HCL, Polymer Electrolyte Membrane-HBR, $ZnBr_2$, $CH_3SO_3H$ and any combination of these.

A redox flow battery with a stack of perforated cells and a group of rods (arbitrary aspect ratio; from one that is a circle cross section to a very large number that is a rectangular cross section; the cross-section itself can vary for example in size), with anolyte and catholyte compartments divided from each other by an ionically selective and conductive separator and having respective electrodes. The battery has anolyte and catholyte tanks, with respective pumps and a pipework. In use, the pumps circulate the electrolytes to and from the tanks, to the compartments and back to the tanks. Electricity flows to a load. The electrolyte lines are provided with tappings via which fresh electrolyte can be added and further tappings via which spent electrolyte can be withdrawn, the respective tappings being for anolyte and catholyte. On recharging, typically via a coupling for lines to all the tappings, a remote pump pumps fresh anolyte and fresh catholyte from remote storages and draws spent electrolyte to other remote storages.

In an embodiment, the cell comprises: an anode in a catholyte compartment, a cathode in an anolyte compartment and, an ion selective membrane separator between the compartments, a pair of electrolyte reservoirs, one for anolyte and the other for catholyte, and electrolyte supply means for circulating anolyte from its reservoir, to the anolyte compartment in the cell and back to its reservoir and like circulating means for catholyte; the battery comprising: connections to its electrolyte reservoirs and/or its electrolyte supply means so that the battery can be recharged by withdrawing spent electrolyte and replacing it with fresh electrolyte, In this design, the electrolyte divider or membrane is optionally a diaphragm between each rod and the walls of the corresponding holes. It optionally is a thin tube shape that the inner and outer radii are chosen to fit between the rod and the corresponding wall and is as long as each of the rods or it can be a thin tube shape as long as the thickness of each of the perforated plates.

EXAMPLE 11: Flow Battery First Example

This example describes a flow battery embodiment. Electrolyte 1 and 2 are the same in this example: between rods and walls of the holes and between the plates: 2M $VOSO_4$ in 2M $H_2SO_4$. Temperature: 25 Celsius.

Negative Electrode: Graphite rods, 100 mm long, 1 mm thick on a copper wire of 1 mm diameter. The wires are held in tension from the top and bottom outside of the cell, so that they stay straight. Electrolyte) runs from the outside of the cell into the cell from one end, from the holes between the rods and the walls of the holes in plates; and exits from the opposite end. A pumping system is optionally used to flow the electrolyte 1.

Positive Electrode: 10 Platinized titanium Perforated Plates which are 100×100×3-mm. The holes are periodic in the plane, 5 mm diameter, and 5 mm wall to wall. There is a 5 mm distance between the perforated plates. The Electrolyte 2 flows from outside of the cell into the cell through this space and exits from the opposite end. A pumping system is optionally used to flow the electrolyte 2.

The membrane is CMV polystryne sulphoric acid cation-selective type membrane and is placed next-to the walls of the plates. It is in the form of a thin tube with outer radius of 5 mm and thickness of 0.02 mm.

EXAMPLE 12: Flow Battery Second Example

This example describes a flow battery embodiment.

Electrolyte 1 and 2 are: between rods and walls of the holes. The positive electrolyte 0.8 mol dm-3 Ce(III) methanesulfonate in 4.0 mol dm-3 methanesulfonic acid. The negative electrolyte compartment contains 1.5 mol dm-3 Zn(II) methanesulfonate in 1.0 mol dm-3 methanesulfonic acid.

The electrolytes are circulated through the cell at 4 cm/s using two peristaltic pumps with high-pressure tubings (Cole-Parmer, 6 mm inner diameter) on one face of the cell.

The electrolytes (200 $cm^3$ each) are contained in separate tanks.

Carbon polyvinyl-ester composite is used as the negative electrode.

Platinised titanium mesh (70 g $Pt/m^2$ loading) is used as the positive electrode.

Negative Electrodes are 3 mm diameter rods 100 mm long: 1 mm thick negative electrode material (here Carbon polyvinyl-ester) shell on a copper wire of 1 mm diameter. The wires are held in tension from the top and bottom, outside of the cell, so that they stay straight.

Positive Electrode: 10 Platinized titanium Perforated Plates which are 100×100×4 mm. The holes are periodic in the plane, 10 mm diameter, and 10 mm wall to wall. 5% of the space between each two parallel plates is filled with spacers, the same material as the plates, 5 mm thick and a few millimeters surface area with an arbitrary shape such as cube or cylinder, and in a periodic arrangement. The rest is filled with negative electrolyte.

The membrane is CMV polystryne sulphoric acid cation-selective type membrane and is placed next-to the walls of the plates. It is in the form of a thin tube with outer radius of 5 mm and thickness of 0.02 mm. The membrane is also 100 mm long.

Positive electrolyte enters from one face of the cell, flows in the holes between the rods and the walls of the holes in plates; and exits from the opposite end. Positive electrolyte enters from one face of the cell, runs parallel to the plane of the plates, and exits from the opposite face. The rods and the walls of the holes are separated by the membrane sandwiched between two silicone gaskets. Gaskets are tubes each 100 mm long, each about 1 mm thick. The inner gaskets have an inner diameter of 6 mm (that is a 1.5 mm thick shell is left for the flow of the positive electrolyte). The outer gaskets have an outer diameter of 10 mm. Inner gaskets have large openings in vicinity of the walls of the plates-holes their cylindrical cross section has at least 80% opening, but has less opening between the parallel plates. Outer gaskets have large openings, at least 80%, everywhere.

From outer to inner, the construction of the rod is as follows: Silicone gasket (8.04 mm inner diameter, 10 mm outer diameter) (separator): Membrane (8 mm inner diameter, 8.04 mm outer diameter): Silicone gasket (6 mm inner diameter, 8 mm outer) (separator): Negative electrode rod (Carbon polyvinyl-ester 1 mm thick) and Copper wire (3 mm diameter): Copper wire (1 mm diameter)(current collector).

EXAMPLE 13: Fuel Cells

The three dimensional electrode design is applied to alkaline fuel cell (AFC), polymeric-electrolyte-membrane fuel cell (PEMFC) and phosphoric-acid fuel cell (PAFC) and molten-carbonate fuel cells (MCFCs) and solid-oxide fuel cells (SOFCs).

In some fuel cells or metal air batteries, a major advantage of the new design is the ease of $CO_2$ recirculation from the anode exhaust to the cathode input, especially as needed in molten-carbonate fuel cells. This is achieved by using a specific membrane between the two spaces: the space between the rods and the walls of the holes and the space between the parallel plates.

In some fuel cells or metal air batteries, another advantage is the removal of adsorbed CO species, especially in polymeric-electrolyte-membrane fuel cell and more specifically for reformate electrodes as well as for methanol oxidation. This is achieved by using a specific membrane between the two spaces: the space between the rods and the walls of the holes and the space between the parallel plates.

An advantage of the new design is that bipolar plates that are a must in conventional fuel cells (and have corrosion problems if not made of expensive materials) are optionally omitted from the new design. In the new design, due to the truly 3 dimensional design, the bipolar plates are optionally placed on the faces of the cell, not inside the cell. This helps with the life and cost of the fuel cell, providing a major advantage as in the new design the current collectors can be in the middle of the plates and rods, thus they are not in contact with the electrolyte. The current collectors also optionally give the desired structural strength to the cell; this is in addition to the structural integrity due to the packed system of tight contacts between the rods and the walls of the holes.

A major benefit of the new design is that it can handle the thermal shocks, especially those in Fuel cells, much better compared to the conventional systems. This adds to the life of the system.

Besides hydrogen, it is also able to run on biogas (which delivers the most energy per hectare of crops), natural gas, propane, ethanol, diesel or biodiesel. This is because of the ability of the added ability of fuel dissociation in the cell due to the new design.

In a typical planar fuel cell design, if an individual cell plate fails, replacement of the cell plate is difficult due to permanent nature of the interconnections between the cells and the bipolar interconnects within the stack. Therefore an entire substack consisting of a multiplicity of cell plates and associated non-cell components must normally be replaced. A fuel cell stack design wherein the cell-containing packets themselves could be replaced, with only a minimum exchange of non-cell components, would offer a significant economic advantage.

One advantage of the new design is that the gas and liquid phases of the products of the reaction are separable by adding membranes (permeable to gas but not to liquid; for example, using PP or PE or other inert materials with desired pore sizes) between the rods and the plates at the levels of beginning and end of the plates. That is the distance between the membranes is equal to the thickness of the perforated plates and the membrane can be like a thin donut of say 0.01 mm thick and width of about a few micrometer to a few millimeters (to fill the space between the rods and the plates). This is very useful as an example for hydrogen and bromine flow battery in which removing the bromine gas in conventional design is difficult. In the new design the gas diffuses to the space between the plates, where it can be solved in a liquid or partially mixed with another gas and be removed from the cell, wither by diffusing out of the system or by assisted flow, say by a pump.

The electrolyte is optionally Aqueous alkaline solution or Aqueous alkaline solution, Polymer membrane (ionomer), Polymer membrane or humic acid, Molten phosphoric acid ($H3PO4$) or Molten alkaline carbonate or O2-conducting ceramic oxide or salt water or H+-conducting ceramic oxide or yttria-stabilized zirconia (YSZ) or lithium potassium carbonate salt or Ceria.

In general, the electrolyte sheets employed for the construction of compliant multi-cell-sheet structures are maintained below 45 microns in thickness, preferably below 30 microns in thickness, and most preferably in the range of 5-20 microns in thickness. Flexible polycrystalline ceramic electrolyte sheets enhance both thermal shock resistance and electrochemical performance; examples of such sheets are disclosed in U.S. Pat. No. 5,089,455 to Ketcham et al., hereby incorporated by reference. Examples of suitable compositions for such electrolytes include partially stabilized zirconias or stabilized zirconias doped with a stabilizing additive selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, and W and mixtures thereof.

Among the electrode materials useful in combination with pre-sintered electrolytes are cermet materials such as nickel/yttria stabilized zirconia cermets, noble metal/yttria stabilized zirconia cermets, these being particularly useful, but not being limited to use, as anode materials. Useful cathode materials include such ceramic and cermet materials as strontium-doped lanthanum manganite, other alkaline earth-doped cobaltites and manganites as well as noble metal/yttria stabilized zirconia cermets. Of course the foregoing examples are merely illustrative of the various electrode and interconnect materials which are useful and are not intended as limiting.

Cathode and anode materials useful for fuel cell construction preferably comprise highly conductive but relatively refractory metal alloys, such as noble metals and alloys amongst and between the noble metals, e.g., silver alloys.

Examples of specific alloy electrode compositions of this type include silver alloys selected from the group consisting of silver palladium, silver-platinum, silver-gold and silver-nickel, with the most preferred alloy being a silver-palladium alloy. Alternative electrode materials include cermet electrodes formed of blends of these metals or metal alloys with a polycrystalline ceramic filler phase. Preferred polycrystalline ceramic fillers for this use include stabilized zirconia, partially stabilized zirconia, stabilized hafnia, partially stabilized hafnia, mixtures of zirconia and hafnia, ceria with zirconia, bismuth with zirconia, gadolinium, and germamum. In addition, Graphene is optionally used as either of the electrodes.

The three most common electrolyte materials in SOFCs are: doped ceria (CeO2), doped lanthanum gallate (LaGaO3) (both are oxygen ion conductors) and doped barium zirconate (BaZrO3) (a proton conductor).

In fuel cells the anode is usually hydrogen or hydrocarbon fuels, including diesel, methanol and chemical hydrides.

The membrane is optionally Nafion or Polyarylenes or polybenzimidazole (PBI) with phosphoric acid.

Conventional fuel cells in general have slow reaction rates, leading to low currents and power. The new design makes the reaction rate much faster by increasing the active surface area and also by better management of the flow of the reaction products, and also by making the cell more homogeneous.

EXAMPLE 14: SOFC Fuel Cell

This example describes a single oxide fuel cell operating at a temperature of up to 700 degrees Celsius. Geometry: Here rods are hollow and have a square cross section. Each rod is 100 mm long, and has an outer size of 14.95 mm×14.95 mm. The outer layer of each rod is cathode active material (Doped $LaMnO_3$) 0.2 mm thick with low porosity and small mean pore diameter (1 μm or less). The inner layer is a 1 mm thick support material with higher porosity and larger mean pore diameter (2 μm or more).

Electrolyte is solid thin tubes, 100 m long, with 0.05 mm thickness. The rods are coated with the electrolyte which fills the space between the rods and the walls of the holes of the plates. The Electrolyte material is YSZ.

The plates are 2 mm thick. They have a 1.8 mm steel in the center with 0.1 mm thick coating on each side made of the anode material (Ni/YSZ). They are 100 mm×100 mm wide-long. They have square holes of 15 mm×15 mm size. The holes are distributed periodically. The least distance between the holes is 10 mm wall to wall. The distance between parallel plates is 10 mm.

The fuel flows in the space between the plates. The oxidizing fluid, such as oxygen gas, flows in the inner space of the hollow rods.

EXAMPLE 15: Supercapacitor, First Example

This example describes an electrochemical supercapacitor. The geometry of the device is a box of 1×1×1 cm. In this example, the rod electrodes are 0.02 mm diameter and are 10 mm long. There are 10 parallel plate electrodes, each 10×10×0.02 mm. The plate electrodes have periodic holes of 0.03 mm diameter and the distance between the holes is 0.02 mm wall to wall. The distance between parallel plates is 0.08 mm. The space between the parallel plates and between each rod and the corresponding walls of the holes is filled with the electrolyte.

All rods have a 0.01 mm diameter copper core. The active material is the shell such that: half of the rods are made of $MnO_2$, the other half are made of activated Carbon. They are assembled next to each other: each $MnO_2$ rod has four nearest neighbors of Carbon; and each carbon has four nearest neighbors of MnO2.

All plates have a 0.01 mm thick copper core. The active material is the shell such that: half of the plates are made of activated Carbon. The other half are made of $MnO_2$. Each Carbon plate has two $MnO_2$ neighbors (top and bottom), and each $MnO_2$ plate has two carbon plate neighbors.

The electrolyte is 0.5M $H_2SO_4$ in water. The rods are positively charged and the plates are negatively charged.

A fuel flows in the space between the plates. The oxidizing fluid, such as an oxygen containing gas, flows in an inner space of the hollow ode electrodes.

EXAMPLE 16: Supercapacitor, Second Example

This example describes a supercapacitor. The geometry is a box of 1×1×1 cm. In this example, the rods electrodes are 0.02 mm diameter and are 10 mm long. The plate electrodes are 10×10×0.02 mm, and have periodic holes of 0.03 mm diameter. The distance between the holes is 0.02 mm wall to wall. The distance between parallel plates is 0.08 mm. There are 10 parallel plates. The space between the parallel plates and between each rod and the corresponding walls of the holes is filled with the electrolyte. In this example, the electrolyte is 1 M $LiClO_4$ in Propylene Carbonate.

All rods have a 0.01 mm diameter copper core. The active material is the shell such that: half of the rods are made of $MnO_2$, the other half are made of activated Carbon. They are assembled next to each other: each $MnO_2$ rod has four nearest neighbors of Carbon; and each carbon has four nearest neighbors of $MnO_2$.

All plates have a 0.01 mm thick copper core. The active material is the shell such that: half of the plates are made of activated Carbon. The other half are made of $MnO_2$. Each Carbon plate has two $MnO_2$ neighbors (top and bottom), and each $MnO_2$ plate has two carbon plate neighbors.

The $MnO_2$ rods and plates are positively charged and the Carbon rods and relates are negatively charged.

The $MnO_2$ rods and plates are positively charged from bottom and left of the cell and the Carbon rods and plates are negatively charged from top and right side of the cell.

EXAMPLE 17: Supercapacitor, Third Example

This example describes a small design supercapacitor. The geometry of the device is a box of 0.1×0.1×0.1 mm inside size. The rod electrodes are 0.01 mm diameter. They are 0.1 mm long. The plates electrodes are 0.1×0.1×0.005 mm, and have periodic holes of 0.015 mm diameter, the distance between the holes is 0.01 mm wall to wall. The distance between parallel plates is 0.005 mm. There are 10 parallel plates. The space between the parallel plates and between each rod and the corresponding walls of the holes is filled with the electrolyte. The electrolyte in this example is 1 M $LiClO_4$ in Propylene Carbonate.

Half of the rods are made of $MnO_2$, the other half are made of activated Carbon. They are assembled next to each other: each $MnO_2$ rod has four nearest neighbors of Carbon; and each carbon has four nearest neighbors of $MnO_2$.

Half of the plates are made of activated Carbon. The other half are made of $MnO_2$. Each Carbon plate has two $MnO_2$ neighbors (top and bottom), and each $MnO_2$ plate has two carbon plate neighbors.

The MnO$_2$ rods and plates are positively charged and the Carbon rods and plates are negatively charged.

EXAMPLE 18: Half Semi-Solid Battery

This example describes a semi-solid battery. The geometry of the device is a box of 100×100×100 mm inside size. The rod electrodes are 5 mm in diameter and are 100 mm long. The plate electrodes are 100×100×2 mm, and have periodic holes of 6 mm diameter; the distance between the holes is 2 mm wall to wall. The distance between parallel plates is 0.5 mm. There are 40 parallel plates in this example.

The space between the parallel plates and between each rod and the corresponding walls of the holes is filled with the electrolyte and cathode particles. Electrolyte and cathode particles enter from outside of the cell though the open spaces between the rods and the walls of the holes in the plates and also between the plates. One or several pumps can be used for this purpose.

Cathode particles are LiCoO$_2$ powder (nanometer size to micrometer size) mixed with carbon black powders (nanometer size to micrometer size), 90% to 10% weight. The electrolyte is 1 M LiPF$_6$ in alkyl carbonate blend.

The rods are made of copper. The plates are made of three silicon (anode) layers that are separated by two perforated copper plates, 0.010 mm thick. The distance between the copper plates is 1 mm.

The surfaces, including edges of the walls of the holes, of the plates are covered with an inert micro-porous material as a coating, here 0.1 mm PE separator.

EXAMPLE 19: Full Semi-Solid Battery

This example describes a semi-solid battery. The geometry of the device is a box of 100×100×100 mm inside size. The rod electrodes are 5 mm in diameter and are 100 mm long.

Plates are 100×100×2 mm, and have periodic holes of 6 mm diameter; the distance between the holes is 2 mm wall to wall. The distance between parallel plates is 0.5 mm. There are 40 parallel plates in this example.

The space between the parallel plates and between each rod and the corresponding walls of the holes is filled with the electrolyte and cathode particles.

Electrolyte 1 and cathode particles enter from outside of the cell though the open spaces between the rods and the walls of the holes in the plates.

Electrolyte 2 and anode particles enter from outside of the cell though the open spaces between the plates. One or several pumps can be used for this purpose.

Cathode particles are LiFePO$_4$ powder (nanometer size to micrometer size) mixed with carbon black powders (nanometer size to micrometer size), 90% to 10% weight.

Electrolyte 1 is 1 M LiPF$_6$ in alkyl carbonate blend.

Anode particles are Li$_4$Ti$_5$O$_{12}$ powder (nanometer size to micrometer size) mixed with carbon black powders (nanometer size to micrometer size), 90% to 10% weight.

Electrolyte 2 is 70:30 (weight) 1,3-dioxolane and LiBETl.

The rods are made of copper and the plates are made of copper.

Between each of the rods and the walls of the holes of the plates there is a tube of PE separator, 0.05 mm thick, same length as the rods, 100 mm, with external diameter of 6 mm.

To construct an electrode array of this design, the tubes are placed after all the plates are aligned and before the rods are placed through the holes. Then the tubes are inflated by introducing a fluid, such as hexane or the cathode electrolyte, into them through both ends (or from one end while the other end is kept closed) while the tube is in tension from both ends from the outside.) Optionally, a balloon can be placed inside the tube to help with the inflation, this works as by inflating the balloon the tube is sealed to the walls of the holes of the plates. The balloon is removed after the inert tube is fit with the walls of the holes. Optionally, all the plates are attached to each other first, then the tube is inflated and the distance between the plates is adjusted while still inflating the tubes with either of the above methods.

EXAMPLE 20: Small Semi-Solid Battery

This example describes a small/nano scale battery. The geometry of the device is a box of 0.01×0.01×0.01 mm inside size. The rod electrodes are 0.001 mm in diameter and are 0.01 mm long. The plate electrodes are 0.01×0.01×0.0005 mm, and have periodic holes 0.0015 mm in diameter, where the distance between the holes is 0.001 mm wall to wall. The distance between parallel plates is 0.0005 mm. There are 10 parallel plates in this example.

The space between the parallel plates and between each rod and the corresponding walls of the holes is filled with the electrolyte. Here, the electrolyte is 1 M LiClO$_4$ in Propylene Carbonate.

The rods are made of LiCoO$_2$ and the plates are made of silicon.

EXAMPLE 21: Composite Rod Electrode

This example describes a rod electrode that is a composite electrode itself. For example, in reference to the embodiment shown in FIG. 14, a rod electrode has a core of current collector material such as aluminum. Surrounding the current collector is a layer of LiCoO$_2$, for example, 0.1 mm thick. Surrounding the LiCoO$_2$ layer, then there is a layer of PE or PP or Celgard, for example 0.2 mm thick. Surrounding this layer is a layer of Si, for example, 0.10 mm thick. Surrounding the Si layer is a second current collector, a layer of, for example, 0.01 mm copper. Surrounding the second current collector is a layer of Si, for example, 0.01 mm thick.

In this example, a three-dimensional electrode array comprises 30 parallel plates of LiCoO$_2$, each 0.2 mm thick (optionally having a 0.01 mm thick Al current collector in the middle), and 7.5 mm×7.5 mm long and wide.

The footprint area of this example is more than 41 times smaller than a conventional design, which makes it an ideal case for small electronic, MEMS, and biomedical devices.

The volume of the design in this example is about 0.67 of that of the conventional design, much smaller than the conventional design.

The surface areas of the plate and rod electrodes are respectively, 1.52 and 1.02 times increased from the conventional design.

REFERENCES

U.S. Pat. Nos. 7,553,584, 528,647, 3,168,458, 4,346,152, 4,871,428, 4,981,672, 6,781,817, 7,618,748, 5,089,455, 5,510,209, 4,786,567, 4,041,211.

US Patent Application Publications US 2011/0171518, US 2003/0099884, US 2005/0095504, US 2002/0160263, US 2004/0018431, US 2004/0175626, US 2004/0241540, US 2005/0074671, US 2007/0059584, US 2008/0153000, US 2009/0035664, US 2009/0087730, US 2009/0197170, US 2009/0214956, US 2011/0104521, US 2003/0096147, US 2007/0117000, US 2010/0047671.

International Patent Application Publications WO 2008/019398, WO 2010/0057579, WO 1997/006569, WO 2008/049040, WO 2008/153749, WO 2010/062391.

http://www.liquicel.com/uploads/documents/Membrane%20Contactors%20-%20An%20Introduction%20To%20The%20Technology.pdf Journal of The Electrochemical Society, 157, 1, A50-A54 (2010).

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed-herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A three-dimensional electrode array comprising:
a plurality of plate electrodes, wherein each plate electrode independently comprises a current collector, and wherein each plate electrode includes an array of apertures, wherein the plate electrodes are arranged in a substantially parallel orientation such that each aperture of an individual plate electrode is aligned along an alignment axis passing through an aperture of each of all other plate electrodes, and
a plurality of rod electrodes, wherein the plurality of rod electrodes are not in physical contact with the plurality of plate electrodes, and wherein the plurality of rod electrodes are arranged such that each rod electrode extends a length along an alignment axis passing through an aperture of each plate electrode, such that each rod electrode individually extends through the plurality of plate electrodes; and
wherein a first surface area includes a cumulative surface area of the plurality of plate electrodes, wherein a second surface area includes a cumulative surface area of each aperture array and wherein a third surface area includes a cumulative surface area of each of the plurality of rod electrodes; and
wherein each of the plurality of plate electrodes has one or more lateral dimensions selected over the range of 20 nm to 20 m and a thickness dimension selected over the range of 20 nm to 5 cm; wherein a distance between each of the plurality of plate electrodes is selected over the range of 10 nm to 5 cm;
wherein each of the plurality of rod electrodes has a length selected over the range of 50 nm to 20 m and a diameter or a lateral dimension selected over the range of 9 nm to 20 cm; and wherein each aperture has a diameter or a lateral dimension selected over the range of 10 nm to 20 cm;

wherein the electrode array further comprises an electrolyte separating each of the plate electrodes from other plate electrodes and from the rod electrodes.

2. The three-dimensional electrode array of claim 1, wherein the plurality of rod electrodes are not in electrical contact with the plurality of plate electrodes.

3. The three-dimensional electrode array of claim 1, wherein the three-dimensional electrode array is a component of a device selected from the group consisting of: a primary electrochemical cell, a secondary electrochemical cell, a fuel cell, a capacitor, a supercapacitor, a flow battery, a metal-air battery and a semi-solid battery.

4. The three-dimensional electrode array of claim 1, wherein a ratio of the second surface area to the first surface area is selected over the range of 1 to 5.

5. The three-dimensional electrode array of claim 1, wherein a ratio of the second surface area to the third surface area is selected over the range of 0.2 to 5.

6. The three-dimensional electrode array of claim 1, comprising 5 or more plate electrodes and 50 or more rod electrodes.

7. The three-dimensional electrode array of claim 1, wherein the three-dimensional electrode array is a component of an electrochemical cell and wherein the electrochemical cell is selected from the group consisting of: a primary cell, a secondary cell, a lead-acid cell, a lithium cell, a lithium ion cell, a zinc-carbon cell, an alkaline cell, a nickel-cadmium cell, a nickel metal hydride cell, a silver oxide cell, a sodium sulfur cell, a solid electrochemical cell a fluid electrochemical cell, a flow battery, a fuel cell, a semi-solid battery and a metal-air battery.

8. The three-dimensional electrode array of claim 1, wherein the three-dimensional electrode array is a component of a capacitor or a supercapacitor, and wherein the three-dimensional electrode array further comprises a dielectric material positioned between each of the plurality of plate electrodes and each of the plurality of rod electrodes.

9. The three-dimensional electrode array of claim 1, wherein each of the plurality of rod electrodes comprises a current collector.

10. The three-dimensional electrode array of claim 9, wherein one or more current collectors are positioned in thermal communication with a heat sink or a heat source.

11. The three-dimensional electrode array of claim 9, wherein each current collector comprises a heat pipe.

12. The three-dimensional electrode array of claim 9, wherein each current collector is a structural element of the three-dimensional electrode array or provides structural support to the three-dimensional electrode array.

13. The three-dimensional electrode array of claim 9, wherein each of the plurality of plate electrodes comprises an internal current collector.

14. The three-dimensional electrode array of claim 1, further comprising one or more heat transfer rods arranged such that each heat transfer rod extends a length along an alignment axis passing through an aperture of each plate electrode and wherein at least one of the one or more heat transfer rods are positioned in thermal communication with a heat sink or a heat source.

15. The three-dimensional electrode array of claim 1, further comprising an inert coating on a surface of each aperture, thereby preventing an oxidation reaction or a reduction reaction from occurring at plate electrode apertures at positions covered by the inert coating.

16. The three-dimensional electrode array of claim 1, wherein at least one rod electrode comprises a composite rod electrode comprising a rod electrode inner core and a rod electrode outer shell surrounding the rod electrode inner core and wherein the rod electrode inner core comprises a first electrode material, and wherein the rod electrode outer shell comprises a second electrode material different from the first electrode material, and wherein at least one plate electrode comprises the first electrode material.

17. The three-dimensional electrode array of claim 1, wherein at least one plate electrode comprises a composite plate electrode comprising a plate electrode inner layer and a plate electrode outer shell surrounding the plate electrode inner layer and wherein the plate electrode inner layer comprises a first electrode material, and wherein the plate electrode outer shell comprises a second electrode material different from the first electrode material, and wherein at least one rod electrode comprises the first electrode material.

18. The three-dimensional electrode array of claim 1, wherein at least one rod electrode comprises a group of rod electrodes, wherein the group of rod electrodes is arranged such that the group of rod electrodes extends a length along an alignment axis passing through an aperture of each plate electrode.

19. The three-dimensional electrode array of claim 1, wherein the three-dimensional electrode array comprises a component of a fuel cell and wherein the three-dimensional electrode array further comprises a fuel fluid positioned in contact with one or more plate electrodes, one or more rod electrodes or both one or more plate electrodes and one or more rod electrodes and wherein the three-dimensional electrode array further comprises an oxygen containing fluid positioned in contact with one or more plate electrodes, one or more rod electrodes or both one or more plate electrodes and one or more rod electrodes.

20. The three-dimensional electrode array of claim 1, wherein the three-dimensional electrode array comprises a component of a metal-air battery and wherein at least one rod electrode comprises a metal or at least one plate electrode comprises a metal or both at least one rod electrode and at least one plate electrode comprise a metal, and wherein the three-dimensional electrode array further comprises an oxygen containing fluid positioned in contact with one or more plate electrodes, one or more rod electrodes or both one or more plate electrodes and one or more rod electrodes.

21. The three-dimensional electrode array of claim 1, wherein at least one rod electrode comprises a porous rod or wherein at least one rod electrode comprises a hollow rod electrode with porous walls.

22. The three-dimensional electrode array of claim 1, wherein the three-dimensional electrode array comprises a component of a flow battery and wherein the three-dimensional electrode array further comprises a plurality of tubes, wherein the plurality of tubes are arranged such that each tube extends a length along an alignment axis passing through an aperture of each plate electrode and wherein at least one rod electrode is positioned within each tube.

23. The three-dimensional electrode array of claim 22, wherein a space within each tube between an inner wall of the tube and a surface of a rod electrode is filled with a fluid, an electrolyte, an aqueous solution or a gas.

24. The three-dimensional electrode array of claim 23, wherein the fluid, electrolyte, aqueous solution or gas flows along an alignment axis passing through an aperture of each plate electrode.

25. The three-dimensional electrode array of claim 22, wherein a space between an outer wall of each tube and wall of one or more apertures is filled with a fluid, an electrolyte, an aqueous solution or a gas.

26. The three-dimensional electrode array of claim 25, wherein the fluid, electrolyte, aqueous solution or gas flows along an alignment axis passing through an aperture of each plate electrode.

27. A method of making an electrode array, the method comprising the steps of:
   providing a plurality of plate electrodes, wherein each plate electrode independently comprises a current collector, and wherein each plate electrode includes an array of apertures;
   arranging the plurality of plate electrodes in a substantially parallel orientation such that the each aperture of an individual plate electrode is aligned along an alignment axis passing through an aperture of each of all other plate electrodes;
   providing a plurality of rod electrodes;
   and arranging the plurality of rod electrodes such that the plurality of rod electrode are not in physical contact with the plurality of plate electrodes and such that each rod electrode extends a length along an alignment axis passing through an aperture of each plate electrode and such that each rod electrode individually extends through the plurality of plate electrodes.

28. The three-dimensional electrode array of claim 1, wherein the plurality of plate electrodes comprise one of a cathode material or an anode material and the plurality of rod electrodes comprise the other of a cathode material or an anode material.

29. The three-dimensional electrode array of claim 1, wherein at least one of the rod electrodes comprises a first active material and at least one of the rod electrodes comprises a second active material different from the first active material.

30. The three-dimensional electrode array of claim 1, wherein at least one of the plate electrodes comprises a first active material and at least one of the plate electrodes comprises a second active material different from the first active material.

* * * * *